(12) United States Patent
Omi et al.

(10) Patent No.: US 10,996,002 B2
(45) Date of Patent: May 4, 2021

(54) EVAPORATOR

(71) Applicant: DENSO CORPORATION, Kariya (JP)

(72) Inventors: Yasumitsu Omi, Kariya (JP); Takeshi Yoshinori, Kariya (JP); Masayuki Takeuchi, Kariya (JP); Koji Miura, Kariya (JP)

(73) Assignee: DENSO CORPORATION, Aichi-pref. (JP)

( * ) Notice: Subject to any disclaimer, the term of this patent is extended or adjusted under 35 U.S.C. 154(b) by 85 days.

(21) Appl. No.: 16/371,195

(22) Filed: Apr. 1, 2019

(65) Prior Publication Data

US 2020/0096260 A1   Mar. 26, 2020

Related U.S. Application Data

(63) Continuation of application No. PCT/JP2017/030422, filed on Aug. 24, 2017.

(30) Foreign Application Priority Data

Oct. 12, 2016   (JP) .............................. JP2016-201130
Apr. 19, 2017   (JP) .............................. JP2017-082917

(51) Int. Cl.
  *F28D 15/02*   (2006.01)
  *F28F 9/02*    (2006.01)
  *H01M 10/6557* (2014.01)

(52) U.S. Cl.
  CPC .......... *F28D 15/0266* (2013.01); *F28F 9/028* (2013.01); *F28F 9/0221* (2013.01);
  (Continued)

(58) Field of Classification Search
  CPC .......... F28D 15/0266; H01M 10/6552; H01M 10/6557; F28F 9/0221; F28F 9/0265; F28F 9/028; F28F 9/0278
  See application file for complete search history.

(56) References Cited

U.S. PATENT DOCUMENTS

2008/0149311 A1 *  6/2008  Liu ....................... F25B 39/028
                                                      165/115
2010/0282445 A1    11/2010  Mabuchi et al.
                        (Continued)

FOREIGN PATENT DOCUMENTS

EP   0757221 A1 *   2/1997  ............ F28F 9/0265
JP   01305275 A *  12/1989  ........... F28D 1/0341
                        (Continued)

OTHER PUBLICATIONS

Japan Society of Refrigerating and Air Conditioning Engineers, "106. Loop type thermosiphon-type heat pipe", https://www.jsrae.or.jp/annai/yougo/106.html.

*Primary Examiner* — Devon Russell
(74) *Attorney, Agent, or Firm* — Harness, Dickey & Pierce, P.L.C.

(57) ABSTRACT

An evaporator evaporates a working fluid by heat from a battery. The evaporator includes at least one evaporation channel connected to the battery in a thermally conductive manner. The evaporator includes a supply channel connected to an upstream end of the evaporation channel, and supplies the working fluid in liquid phase from the supply channel to the evaporation channel. The evaporator includes an outflow channel connected with a downstream end of the evaporation channel, and discharges the working fluid. The outflow channel is disposed above the supply channel, and the supply channel is disposed at a position more insulated from the heat of the battery than the evaporation channel is.

19 Claims, 49 Drawing Sheets

(52) U.S. Cl.
CPC .......... *F28F 9/0265* (2013.01); *F28F 9/0278* (2013.01); *H01M 10/6557* (2015.04); *F28D 15/025* (2013.01)

(56) References Cited

U.S. PATENT DOCUMENTS

| | | | | |
|---|---|---|---|---|
| 2012/0009455 | A1* | 1/2012 | Yoon | H01M 10/6556 429/120 |
| 2012/0270075 | A1* | 10/2012 | Fujimura | H01M 10/6555 429/7 |
| 2016/0040942 | A1* | 2/2016 | Dziubinschi | F28F 9/028 165/135 |
| 2016/0204488 | A1* | 7/2016 | Arai | H01M 10/613 429/62 |

FOREIGN PATENT DOCUMENTS

| | | | |
|---|---|---|---|
| JP | 2009127903 | A | 6/2009 |
| JP | 2009222254 | A | 10/2009 |
| JP | 2010192207 | A | 9/2010 |
| JP | 2011049137 | A | 3/2011 |
| JP | 2012018915 | A | 1/2012 |
| JP | 2013040702 | A | 2/2013 |
| JP | 2014029232 | A | 2/2014 |
| JP | 5942943 | B2 | 6/2016 |
| WO | WO-2010050011 | A1 | 5/2010 |
| WO | WO-2018070116 | A1 | 4/2018 |

\* cited by examiner ial, and an assembled battery according to the first embodiment.
EVAPORATOR

CROSS REFERENCE TO RELATED APPLICATIONS

The present application is a continuation application of International Patent Application No. PCT/JP2017/030422 filed on Aug. 24, 2017, which designated the United States and claims the benefit of priority from Japanese Patent Application No. 2016-201130 filed on Oct. 12, 2016, and Japanese Patent Application No. 2017-082917 filed on Apr. 19, 2017. The entire disclosures of all of the above applications are incorporated herein by reference.

TECHNICAL FIELD

The present disclosure relates to an evaporator included in a thermosiphon heat pipe.

BACKGROUND

As a device provided with an evaporator of this type, for example, a battery temperature adjusting device has been conventionally known. The battery temperature adjusting device is a thermosiphon cooling device, for example. The battery temperature adjusting device includes a heat medium cooling unit as a condenser, and a temperature adjusting unit as an evaporator. The heat medium cooling unit and the temperature adjusting unit are connected to each other in a circuit by piping, and the battery temperature adjusting device is configured such that a heat medium (that is, a working fluid) circulates between the heat medium cooling unit and the temperature adjusting unit.

The temperature adjusting unit is disposed so as to be in contact with lateral surfaces of multiple battery cells constituting an assembled battery, and cools the assembled battery by evaporation of a heat medium.

SUMMARY

According to an aspect of the present disclosure, an evaporator constitutes a part of a thermosiphon heat pipe in which a working fluid circulates and evaporates by absorbing heat from a battery having at least one battery cell. The evaporator includes a fluid evaporation portion, a liquid supply portion and a fluid outflow portion. The fluid evaporation portion includes at least one evaporation channel having an upstream end and a downstream end. The fluid evaporation portion is connected to the battery in a thermally conductive manner and evaporates the working fluid flowing in the at least one evaporation channel by heat of the battery. The liquid supply portion includes a supply channel connected to the upstream end of the at least one evaporation channel. The liquid supply portion supplies the working fluid in liquid phase from the supply channel to the at least one evaporation channel. The fluid outflow portion includes an outflow channel connected to the downstream end of the at least one evaporation channel. The fluid outflow portion discharges the working fluid which has flowed from the at least one evaporation channel into the outflow channel.

The working fluid flows from the upstream end to the downstream end in the evaporation channel. The fluid outflow portion is disposed above the liquid supply portion. The liquid supply portion is disposed at a position more insulated from the heat of the battery than the fluid evaporation portion is.

DETAILED DESCRIPTION

Figure 1:
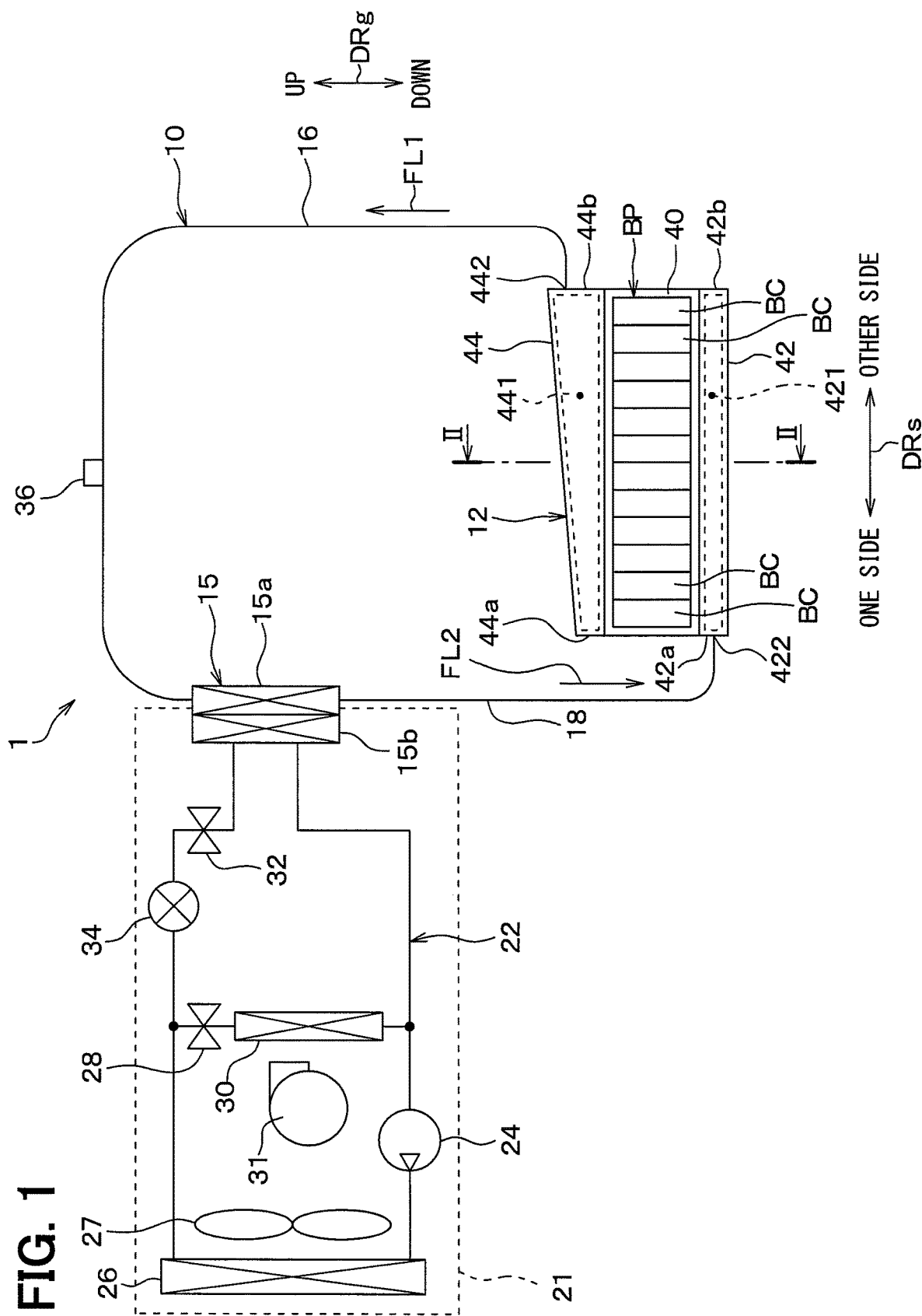
FIG. 1 is a schematic diagram showing a schematic configuration of a device temperature control device according to a first embodiment.

Embodiments will be described below with reference to the drawings. In the following embodiments, the same or equivalent parts are denoted by the same reference numerals in the drawings.

First Embodiment a device temperature control device 1 according to the present embodiment shown in FIG. 1 regulates a battery temperature of an assembled battery BP as equipment to be regulated in temperature by cooling an assembled battery BP mounted on a vehicle. In short, the device temperature control device 1 is a battery cooling device that cools the assembled battery BP. As a vehicle on which the device temperature control device 1 is mounted, an electric vehicle or a hybrid vehicle, which can be driven by a traveling electric motor (not shown) using the assembled battery BP as a power supply, is assumed.

The assembled battery BP has multiple battery cells BC having a rectangular parallelepiped shape. The assembled battery BP is formed of a stacked body in which the multiple battery cells BC are stacked and placed. More specifically, the multiple battery cells BC are stacked in a predetermined stacking direction DRs. Therefore, the entire assembled battery BP also has a substantially rectangular parallelepiped shape. The assembled battery BP has, as a part of a surface of the assembled battery BP, a battery lower surface BPa (refer to FIG. 2) which is a battery bottom surface BPa facing downward, and a battery lateral surface BPb (refer to FIG. 2) which extends along a vehicle vertical direction DRg (that is, a gravitational direction DRg). In the present embodiment, the stacking direction DRs of the battery cells BC is a direction intersecting with the vehicle vertical direction DRg, or strictly speaking, a direction orthogonal to the vehicle vertical direction DRg. The stacking direction DRs of the battery cells BC is referred to as a cell stacking direction DRs.

The multiple battery cells BC configuring the assembled battery BP are electrically connected in series with one another. Each battery cell BC configuring the assembled battery BP is formed of a chargeable and dischargeable secondary battery (for example, a lithium ion battery or a lead-acid battery) capable of charging and discharging. The battery cell BC is not limited to a rectangular parallelepiped shape, and may have another shape such as a cylindrical shape. The assembled battery BP may include battery cells BC electrically connected in parallel to one another.

The assembled battery BP is connected to a power conversion device and a motor generator (not shown). The power conversion device is, for example, a device that converts a direct current supplied from an assembled battery into an alternating current, and supplies (that is, discharges) the converted AC current to various electric loads such as a traveling electric motor. In addition, the motor generator is a device that inverts a traveling energy of the vehicle into an electric energy during regeneration of the vehicle, and supplies the inverted electric energy as a regenerative electric power to the assembled battery BP through an inverter or the like.

Since the assembled battery BP per se generates heat when supplying an electric power or the like while the vehicle is traveling, it is assumed that the assembled battery BP becomes excessively high temperature due to self heat generation if the assembled battery BP is not cooled. When the assembled battery BP becomes excessively high temperature, not only an input and output characteristic of the assembled battery BP deteriorate, but also the deterioration of the battery cell BC is accelerated, so that a cooling device for maintaining the assembled battery BP at a predetermined temperature or lower is required.

In addition, an electric storage device including the assembled battery BP is often disposed under a floor of the vehicle or under a trunk room, and a battery temperature of the assembled battery BP gradually rises not only during the traveling of the vehicle but also during parking in summer, and the battery temperature may become excessively high. When the assembled battery BP is left in a high-temperature environment, the battery life is greatly reduced by a progress of the deterioration, so that it is desired to maintain the battery temperature of the assembled battery BP at a predetermined temperature or lower even while the vehicle is parked.

Furthermore, although the assembled battery BP is configured by the multiple battery cells BC, if there is a variation in the temperature of each battery cell BC, a deviation occurs in the degree of progress of the deterioration of each battery cell, and the input and output characteristics of the entire assembled battery BP are deteriorated. This is because, since the assembled battery BP includes a series connection body of the battery cells BC, the input and output characteristics of the entire assembled battery BP are determined in accordance with the battery characteristics of the battery cell BC whose deterioration has progressed most among the battery cells BC. For that reason, in order for the assembled battery BP to exhibit a desired performance for a long period of time, it is important to equalize the temperatures of the respective battery cells BC so as to reduce temperature variations.

As a cooling device for cooling the assembled battery BP, an air-cooled cooler using a blower or the like is generally used.

However, since the air-cooled cooler using the blower only blows an air in a vehicle interior or the like to the assembled battery BP, there are cases in which a cooling capacity to sufficiently cool the assembled battery BP cannot be obtained. Therefore, in the device temperature control device 1 according to the present embodiment, a thermosiphon system is employed in which the assembled battery BP is cooled by natural circulation accompanied by a phase change of the working fluid.

The device temperature control device 1 includes a working fluid circuit 10 in which a working fluid is circulated. As the working fluid circulating in the working fluid circuit 10, a refrigerant (for example, R134a or R1234yf) used in a vapor compression type refrigeration cycle is employed.

The working fluid circuit 10 is a heat pipe that performs a heat transfer by evaporation and condensation of the working fluid, and is configured to be of a thermosiphon in which the working fluid is naturally circulated by gravity. Further, the working fluid circuit 10 is configured to be of a loop type in which a channel through which a gas-phase working fluid flows and a channel through which a liquid-phase working fluid flows are separated from each other. That is, the working fluid circuit 10 configures a loop type thermosiphon heat pipe.

As shown in FIG. 1, the working fluid circuit 10 includes an evaporator 12, a condenser 15, a gas path 16, and a liquid path 18. Specifically, the working fluid circuit 10 is configured by connecting the evaporator 12, the gas path 16, the condenser 15, and the liquid path 18 in a stated order in an annular manner. In short, the working fluid circuit 10 is a closed annular fluid circuit. A predetermined amount of working fluid is enclosed within the working fluid circuit 10, and an inside of the working fluid circuit 10 is filled with the working fluid.

The evaporator 12 is a heat exchanger for exchanging heat between the working fluid flowing through the evaporator 12 and the assembled battery BP. In other words, the evaporator 12 causes the liquid-phase working fluid to absorb heat from the assembled battery BP as the working fluid circulates in the working fluid circuit 10, thereby evaporating the working fluid in the liquid phase. The evaporator 12 according to the present embodiment is connected to a side of the assembled battery BP so as to be thermally conductive.

The evaporator 12 is disposed below the condenser 15. As a result, the liquid-phase working fluid accumulates in a lower portion of the working fluid circuit 10 including the evaporator 12 by gravity. The detailed structure of the evaporator 12 will be described later.

The condenser 15 is a heat exchanger for condensing the gas-phase working fluid evaporated in the evaporator 12. The condenser 15 radiates heat from the working fluid by exchanging the heat with a refrigerant of an air conditioning refrigeration cycle device 21 mounted on the vehicle, thereby condensing the working fluid. The refrigeration cycle device 21 configures a part of a vehicle air conditioner. The refrigeration cycle device 21 includes a refrigerant circuit 22 in which the refrigerant circulates and flows.

The condenser 15 has a working fluid side heat exchanging unit 15a through which the working fluid of the working fluid circuit 10 flows, and a refrigerant side heat exchanging unit 15b through which the refrigerant of the refrigerant circuit 22 flows. The working fluid side heat exchanging unit 15a and the refrigerant side heat exchanging unit 15b are thermally connected to each other so as to be able to perform the heat exchange between the working fluid and the refrigerant.

The refrigerant circuit 22 configures a vapor compression type refrigeration cycle. Specifically, the refrigerant circuit 22 is formed by connecting a compressor 24, an air-conditioning condenser 26, a first expansion valve 28, an air-conditioning evaporator 30, and the like by piping. The refrigeration cycle device 21 includes a blower 27 for sending an air to the air-conditioning condenser 26, and a blower 31 for forming an air flow toward a vehicle interior space. For example, the air-conditioning condenser 26 and the blower 27 are provided in a vehicle exterior, and the blower 27 sends an outside air, which is air in the vehicle exterior, to the air-conditioning condenser 26.

The compressor 24 compresses and discharges the refrigerant. The air-conditioning condenser 26 is a radiator for radiating and condensing the refrigerant flowing out of the compressor 24 by heat exchange with air. The first expansion valve 28 decompresses the refrigerant flowing out of the air-conditioning condenser 26. The air-conditioning evaporator 30 evaporates the refrigerant flowing out of the first expansion valve 28 by heat exchange with the air directed to the vehicle interior space, and cools the air directed to the vehicle interior space.

Further, the refrigerant circuit 22 includes a second expansion valve 32 and a refrigerant side heat exchanging unit 15b connected in parallel with the first expansion valve 28 and the air-conditioning evaporator 30 in a refrigerant flow. The second expansion valve 32 decompresses the refrigerant flowing out of the air-conditioning condenser 26. The refrigerant side heat exchanging unit 15b is a refrigerant evaporation portion that evaporates the refrigerant by heat exchange with the working fluid flowing through the working fluid side heat exchanging unit 15a.

The refrigerant circuit 22 has an opening and closing valve 34 that opens and closes a refrigerant channel through which the refrigerant flows toward the refrigerant side heat exchanging unit 15b. The opening and closing valve 34 is closed to form a first refrigerant circuit in which the refrigerant flows in the order of the compressor 24, the air-conditioning condenser 26, the first expansion valve 28, and the air-conditioning evaporator 30. In addition to the first refrigerant circuit, the opening and closing valve 34 is opened to form a second refrigerant circuit in which the refrigerant flows in the order of the compressor 24, the air-conditioning condenser 26, the second expansion valve 32, and the refrigerant side heat exchanging unit 15b.

The opening and closing valve 34 is appropriately opened and closed in accordance with predetermined conditions depending on, for example, the necessity of cooling the assembled battery BP. When the opening and closing valve 34 is opened, at least the compressor 24 and the blower 27 operate. As a result, the working fluid is cooled and condensed by heat exchange with the refrigerant flowing through the refrigerant side heat exchanging unit 15b in the working fluid side heat exchanging unit 15a of the condenser 15.

The gas path 16 guides the gas-phase working fluid evaporated in the evaporator 12 to the condenser 15. The gas path 16 is formed of, for example, a piping member, and a gas path is defined in the gas path 16 so that the working fluid flows from the evaporator 12 toward the condenser 15. A lower end portion of the gas path 16 is connected to the evaporator 12, and an upper end portion of the gas path 16 is connected to the working fluid side heat exchanging unit 15a of the condenser 15.

The gas path 16 is provided with a filling port 36 for filling the working fluid in the working fluid circuit 10. The filling port 36 may be provided in a portion of the working fluid circuit 10 other than the gas path 16. However, it is preferable that the filling port 36 is provided at a portion of the inside of the working fluid circuit 10 where the gas-phase working fluid exists.

The liquid path 18 guides the liquid-phase working fluid condensed by the condenser 15 to the evaporator 12. The liquid path 18 is formed of, for example, a piping member, and a liquid passage is defined in the liquid path 18 so that the working fluid flows from the condenser 15 toward the evaporator 12. A lower end portion of the liquid path 18 is connected to the evaporator 12, and an upper end portion of the liquid path 18 is connected to the working fluid side heat exchanging unit 15a of the condenser 15.

Next, the basic operation of the device temperature control device 1 according to the present embodiment will be described with reference to FIG. 1.

In the device temperature control device 1, when a battery temperature of the assembled battery BP rises due to self-heat generation or the like during the traveling of the vehicle, the heat of the assembled battery BP moves to the evaporator 12. In the evaporator 12, part of the liquid-phase working fluid is evaporated by absorbing the heat from the assembled battery BP. The assembled battery BP is cooled by the latent heat of evaporation of the working fluid existing inside the evaporator 12, and a temperature of the assembled battery BP is lowered.

The working fluid evaporated in the evaporator 12 flows out of the evaporator 12 to the gas path 16, and moves to the condenser 15 through the gas path 16 as indicated by an arrow FL1 in FIG. 1.

In the condenser 15, the gas-phase working fluid is condensed by radiating the heat from the gas-phase working fluid. The condensed liquid-phase working fluid drops by gravity. As a result, the liquid-phase working fluid condensed in the condenser 15 flows out of the condenser 15 to the liquid path 18, and moves to the evaporator 12 through the liquid path 18 as indicated by an arrow FL2 in FIG. 1. Then, in the evaporator 12, a part of the liquid-phase working fluid flowing in the evaporator 12 absorbs the heat from the assembled battery BP to evaporate.

As described above, in the device temperature control device 1, the working fluid circulates between the evaporator 12 and the condenser 15 while changing the phase between a gas state and a liquid state, and heat is transported from the evaporator 12 to the condenser 15. As a result, the assembled battery BP to be cooled is cooled.

The device temperature control device 1 has a configuration in which the working fluid naturally circulates inside the working fluid circuit 10 even if there is no driving force required for the circulation of the working fluid by a compressor or the like. For that reason, the device temperature control device 1 can realize efficient cooling of the assembled battery BP in which both power consumption and noise are reduced.

Figure 2:
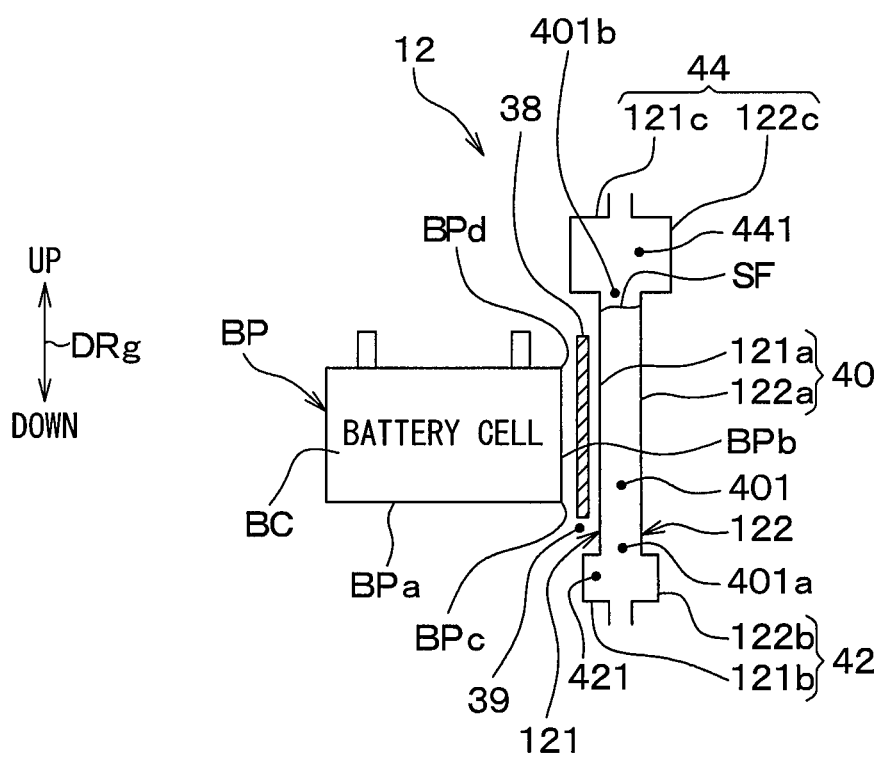
FIG. 2 is a cross-sectional view schematically showing a II-II cross section of FIG. 1, which shows a positional relationship between an evaporator, a heat conduction material, and an assembled battery according to the first embodiment.

Next, a structure of the evaporator 12 will be described. As shown in FIGS. 1 and 2, the evaporator 12 includes a fluid evaporation portion 40, a liquid supply portion 42 connected to the lower end of the fluid evaporation portion 40, and a fluid outflow portion 44 connected to an upper end of the fluid evaporation portion 40. The fluid outflow portion 44 is disposed above the liquid supply portion 42 and the fluid evaporation portion 40, and the liquid supply portion 42 is disposed below the fluid outflow portion 44 and the fluid evaporation portion 40. In FIG. 2, in order to clearly illustrate the placement of the respective components, the respective components are illustrated with gaps between the components. The same also applies to FIG. 5, FIG. 10, FIG. 15, FIG. 22, FIG. 23, FIG. 30, FIG. 35, and FIGS. 37 to 47 which will be described later.

The fluid evaporation portion 40 is connected to the battery lateral surface BPb which is the vertical surface BPb of the assembled battery BP so as to be thermally conductive. In other words, the fluid evaporation portion 40 is thermally connected to the assembled battery BP. Specifically, the fluid evaporation portion 40 is connected to the assembled battery BP so as to be thermally conductive by contacting a heat conduction material 38 interposed between the fluid evaporation portion 40 and the assembled battery BP. For example, in order to enhance a thermal conductivity between the fluid evaporation portion 40 and the assembled battery BP, the fluid evaporation portion 40 is held in a state of being pressed against the assembled battery BP.

The heat conduction material 38 has an electrical insulation property and a high thermal conductivity, and is sandwiched between the fluid evaporation portion 40 and the assembled battery BP in order to enhance the thermal conductivity between the fluid evaporation portion 40 and the assembled battery BP. For example, grease or a sheet-like material is employed as the heat conduction material 38. If the electrical insulation property and the thermal conductivity between the fluid evaporation portion 40 and the assembled battery BP are sufficiently ensured, the fluid evaporation portion 40 may be in direct contact with the assembled battery BP without providing the heat conduction material 38.

Figure 3:
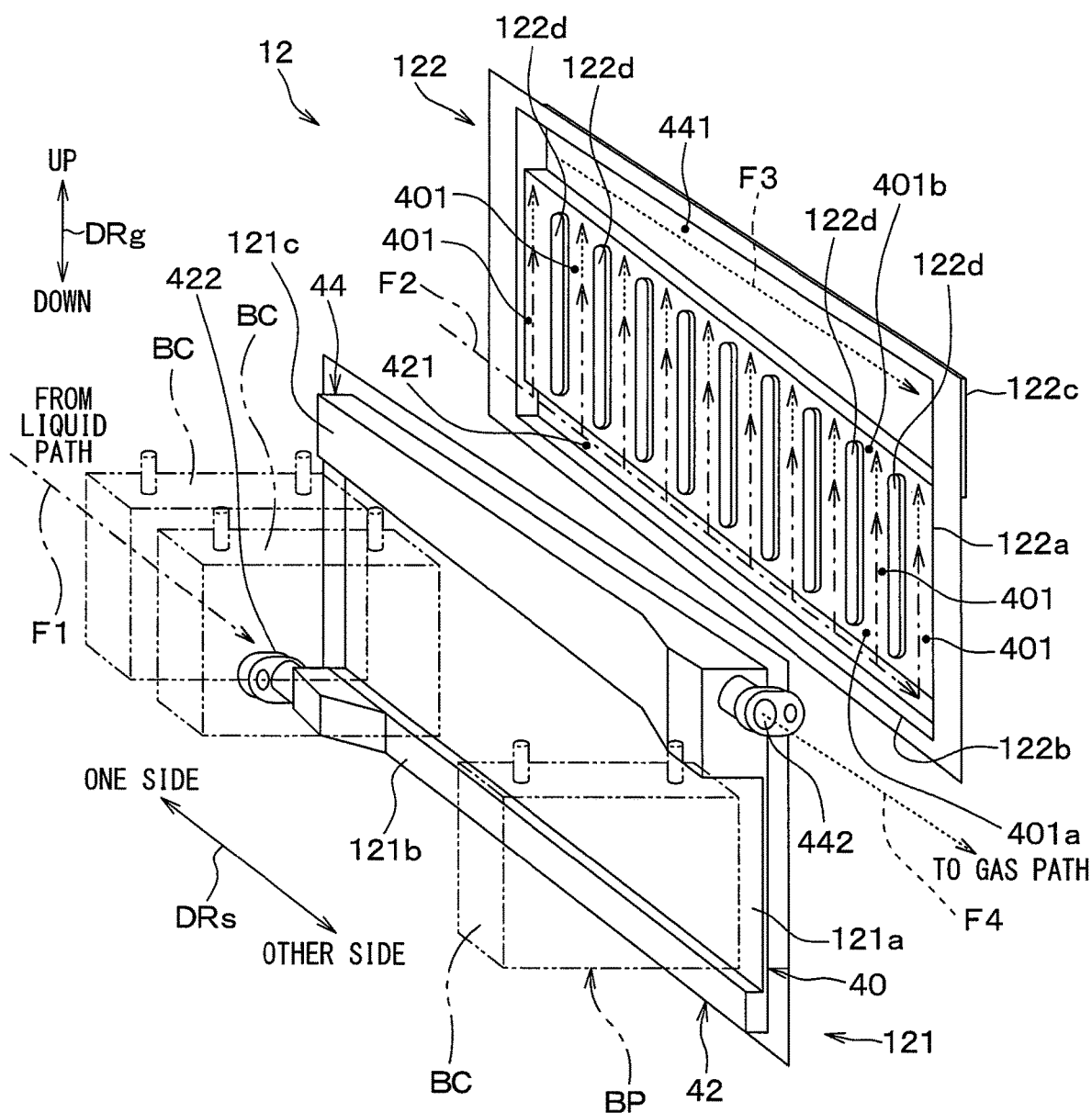
FIG. 3 is an exploded perspective view showing a schematic configuration of the evaporator according to the first embodiment.

As shown in FIGS. 2 and 3, multiple evaporation channels 401 extending in the vehicle vertical direction DRg are defined in the fluid evaporation portion 40. In other words, each of the multiple evaporation channels 401 extends along the battery lateral surface BPb from the lateral-surface lower end BPc side of the battery lateral surface BPb to the lateral-surface upper end BPd side of the battery lateral surface BPb.

The fluid evaporation portion 40 evaporates the working fluid flowing in the multiple evaporation channels 401 by the heat of the assembled battery BP. In other words, the liquid-phase working fluid flowing into the evaporation channel 401 boils and vaporizes in the evaporation channel 401 while flowing through the evaporation channel 401. FIG. 2 shows a liquid surface SF of the working fluid. In FIG. 3, the battery cell BC is illustrated by a dashed-two dotted line for easy-to-see illustration, and the illustration of the heat conduction material 38 and some of the multiple battery cells BC included in the assembled battery BP are omitted. The same also applies to FIGS. 4, 6 to 9, 12, 14, and 16 to 20 to be described later.

A supply channel 421 extending in the cell stacking direction DRs is defined inside the liquid supply portion 42. An outflow channel 441 extending in the cell stacking direction DRs is defined inside the fluid outflow portion 44.

Focusing on the components of the evaporator 12, the evaporator 12 has a plate stacked structure. For that reason, the evaporator 12 has a first plate member 121 and a second plate member 122. The evaporator 12 is formed by stacking the pair of plate members 121 and 122 and joining those plate members 121 and 122 to each other at peripheral portions of the plate members 121 and 122. Each of the first plate member 121 and the second plate member 122 is made of a metal such as an aluminum alloy having high thermal conductivity, and is a molded product formed by press working or the like. The plate members 121 and 122 are joined together by brazing or the like, for example.

More specifically, the first plate member 121 includes a first evaporation forming portion 121a included in the fluid evaporation portion 40, a first supply forming portion 121b included in the liquid supply portion 42, and a first outflow forming portion 121c included in the fluid outflow portion 44. The second plate member 122 has a second evaporation forming portion 122a included in the fluid evaporation portion 40, a second supply forming portion 122b included in the liquid supply portion 42, and a second outflow forming portion 122c included in the fluid outflow portion 44.

The channels 401, 421, and 441 of the evaporator 12 are defined as internal spaces of the evaporator 12 by mutual joining of the plate members 121 and 122. That is, the first plate member 121 is stacked and joined to the second plate member 122, whereby the multiple evaporation channels 401 are defined between the first evaporation forming portion 121a and the second evaporation forming portion 122a. The supply channel 421 is defined between the first supply forming portion 121b and the second supply forming portion 122b by the joining of the plate members 121 and 122. Further, the outflow channel 441 is defined between the first outflow forming portion 121c and the second outflow forming portion 122c by the joining of the plate members 121 and 122.

The first evaporation forming portion 121a is disposed between the second evaporation forming portion 122a and the assembled battery BP. Accordingly, the fluid evaporation portion 40 comes in contact with the heat conduction material 38 at the first evaporation forming portion 121a.

The second evaporation forming portion 122a of the second plate member 122 has multiple protrusion portions 122d protruding toward the first evaporation forming portion 121a of the first plate member 121. Each of the multiple protrusion portions 122d is formed to extend in the vehicle vertical direction DRg. In other words, each of the multiple protrusion portions 122d is formed so as to extend from one end of the fluid evaporation portion 40 on the liquid supply portion 42 side to the other end of the fluid outflow portion 44 side.

The multiple protrusion portions 122d are in contact with and joined to the first evaporation forming portion 121a. The joining is performed, for example, by brazing or the like. The protrusion portion 122d abuts against and is joined to the first evaporation forming portion 121a, thereby separating the multiple evaporation channels 401 from each other.

Further, since the multiple protrusion portions 122d are disposed side by side with a mutual interval in the cell stacking direction DRs, the multiple evaporation channels 401 are disposed side by side in the cell stacking direction DRs. More specifically, the protrusion portions 122d and the evaporation channels 401 are alternately disposed in the cell stacking direction DRs. For example, the evaporation channels 401 are provided in the same number as the battery cells BC, and are disposed so that one evaporation channel 401 is allocated to each battery cell BC.

Each of the channel cross-sections of the multiple evaporation channels 401 has a flattened cross-sectional shape extending in the cell stacking direction DRs. In other words, in the cross section orthogonal to the direction in which the evaporation channels 401 extend (that is, the vertical direction DRg of the vehicle in the present embodiment), a cross-sectional shape of the evaporation channels 401 has a flattened shape with the cell stacking direction DRs as the longitudinal direction.

In addition, each evaporation channel 401 has a lower end of the evaporation channel 401 as an upstream end 401a, and an upper end of the evaporation channel 401 as a downstream end 401b. In the evaporation channel 401, the working fluid flows from the upstream end 401a to the downstream end 401b, as indicated by dashed-dotted arrows and dashed arrows in FIG. 3. That is, in the evaporation channel 401, the working fluid flows from the lower side to the upper side.

The upstream ends 401a of the multiple evaporation channels 401 are connected to the supply channel 421. Accordingly, the liquid supply portion 42 distributes and supplies the liquid-phase working fluid flowing into the supply channel 421 to each of the multiple evaporation channels 401.

On the other hand, the downstream ends 401b of the multiple evaporation channels 401 are connected to the outflow channel 441. Therefore, the working fluid flows into the outflow channel 441 from each of the multiple evaporation channels 401. The fluid outflow portion 44 causes the working fluid that has flowed into the outflow channel 441 to flow out to the gas path 16.

As shown in FIGS. 1 and 3, since the liquid supply portion 42 is formed to extend in the cell stacking direction DRs, one end portion 42a is provided on one side in the cell stacking direction DRs and the other end portion 42b is provided on the other side in the cell stacking direction DRs. A fluid inlet 422 to which the liquid path 18 is connected is defined in one end 42a of the liquid supply portion 42. The fluid inlet 422 is opened to the supply channel 421. On the other hand, the other end portion 42b of the liquid supply portion 42 forms the other end of the supply channel 421 in the cell stacking direction DRs, and closes the other end.

Since the fluid outflow portion 44 is formed to extend in the cell stacking direction DRs, one end portion 44a is provided on one side in the cell stacking direction DRs, and the other end portion 44b is provided on the other side in the cell stacking direction DRs. At the other end portion 44b of the fluid outflow portion 44, a fluid outlet 442 connected to the gas path 16 is provided. The fluid outlet 442 is opened to the outflow channel 441. On the other hand, one end 44a of the fluid outflow portion 44 forms one end of the outflow channel 441 in the cell stacking direction DRs, and closes one end side.

Further, the fluid outlet 442 is disposed upward of the other end portion 44b of the fluid outflow portion 44. For that reason, the gas-phase working fluid out of the gas-phase and liquid-phase working fluids in the outflow channel 441 flows out exclusively from the fluid outlet 442 to the gas path 16. In other words, the fluid outflow portion 44 performs gas-liquid separation of a bubble flow in which the evaporated working fluid gas blows up together with the liquid-phase working fluid, and the outflow channel 441 is a channel for discharging the separated working fluid gas. In short, the fluid outflow portion 44 has a gas-liquid separation function.

As shown in FIGS. 1 and 2, the fluid evaporation portion 40 is in contact with the heat conduction material 38, but the liquid supply portion 42 is disposed apart from both the assembled battery BP and the heat conduction material 38. In other words, an air interposed between the liquid supply portion 42, the assembled battery BP, and the heat conduction material 38 functions as a heat insulating portion 39 which prevents heat transfer between those components. The liquid supply portion 42 is not thermally connected to the assembled battery BP because the heat insulating portion 39 is interposed between the liquid supply portion 42 and the assembled battery BP and the heat conduction material 38.

In other words, an area of a surface of the liquid supply portion 42 which comes in contact with the assembled battery BP or the heat conduction material 38 is zero. In other words, the liquid supply portion 42 is disposed so that a surface area of the liquid supply portion 42 which comes in contact with the assembled battery BP or the heat conduction material 38 is smaller than that of the fluid evaporation portion 40.

In short, the liquid supply portion 42 is disposed at a position more insulated from the heat of the assembled battery BP than the fluid evaporation portion 40. In other words, in the comparison between the fluid evaporation portion 40 and the liquid supply portion 42, the liquid supply portion 42 is thermally separated from the assembled battery BP farther than the fluid evaporation portion 40. In the present embodiment, the fluid outflow portion 44 is also disposed apart from both the assembled battery BP and the heat conduction material 38.

Figure 4:
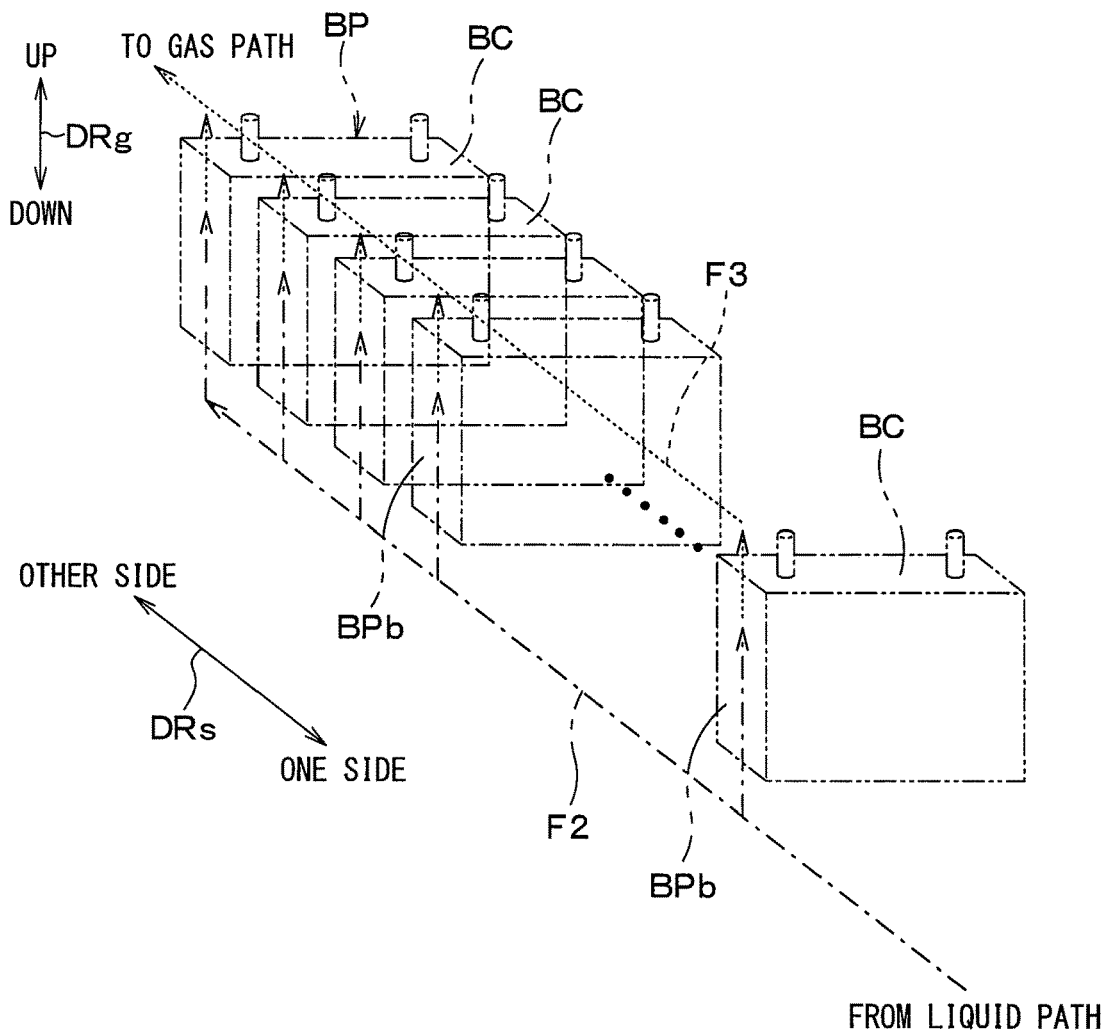
FIG. 4 is a perspective view schematically showing a positional relationship between a working fluid flow in the evaporator and the assembled battery according to the first embodiment.

Since the channels 401, 421, and 441 of the evaporator 12 communicate with each other as described above, the working fluid flows through the evaporator 12 as indicated by the dashed-dotted arrows and dashed arrows shown in FIGS. 3 and 4. The dashed-dotted arrows indicate a flow of the liquid-phase working fluid in the evaporator 12, and the dashed arrows indicate a flow of the gas-phase working fluid in the evaporator 12. The same also applies to FIGS. 6 to 9, 11 to 14, and 16 to 20 to be described later.

Specifically, the liquid-phase working fluid from the liquid path 18 flows from the fluid inlet 422 into the supply channel 421 as indicated by an arrow F1. The inflow working fluid flows from one side in the cell stacking direction DRs to the other side in the supply channel 421, as indicated by an arrow F2. The working fluid is distributed from the supply channel 421 to each of the multiple evaporation channels 401. At this time, since the liquid supply portion 42 is less susceptible to the heat of the assembled battery BP, the working fluid flows into the evaporation channel 401 in the liquid phase. In other words, the liquid-phase working fluid supplied from the condenser 15 is supplied to the vicinity of the lower side of each battery cell BC in the liquid phase without boiling and without becoming a bubble stream through the supply channel 421.

In the evaporation channel 401, the working fluid flows from the lower side to the upper side and is boiled by the heat of the assembled battery BP. In other words, the working fluid removes the heat from each battery cell BC and evaporates while flowing through the evaporation channel 401. For that reason, in each of the evaporation channels 401, the working fluid flows into the outflow channel 441 only in the gas phase or in the gas-liquid two-phase.

The working fluid flowing into the outflow channel 441 is gas-liquid separated, and flows from one side to the other side in the cell stacking direction DRs in the outflow channel 441 as indicated by arrow F3. At that time, a flow rate of the working fluid that joins the working fluid flow in the outflow channel 441 from each evaporation channel 401 is accumulated more toward the other side in the cell stacking direction DRs. For that reason, as shown in FIG. 1 and FIG. 3, the outflow channel 441 is provided so that a channel cross-sectional area of the outflow channel 441 becomes larger on the downstream side of the working fluid flow (that is, on the other side in the cell stacking direction DRs).

The gas-phase working fluid flowing to the other end of the cell stacking direction DRs in the outflow channel 441 flows out from the fluid outlet 442 to the gas path 16 as indicated by an arrow F4.

The channel cross-sectional area of the outflow channel 441 is a cross-sectional area of the channel 441 in a cross section whose direction of the working fluid flow is the normal direction (specifically, in the outflow channel 441, the cross section in which the cell stacking direction DRs is the normal direction). The channel cross-sectional area of the evaporation channel 401 and the channel cross-sectional area of the supply channel 421, which will be described later, are also defined in the same manner as that of the channel cross-sectional area of the outflow channel 441.

As described above, according to the present embodiment, as shown in FIGS. 1 to 3, the upstream ends 401a of the multiple evaporation channels 401 are connected to the supply channel 421 of the liquid supply portion 42, and the downstream ends 401b of the multiple evaporation channels 401 are connected to the outflow channel 441 of the fluid outflow portion 44. The liquid supply portion 42 is disposed at a position more insulated from the heat of the assembled battery BP than the fluid evaporation portion 40 in which the multiple evaporation channels 401 are provided. The liquid supply portion 42 is disposed at a position of being more insulated from the heat of the assembled battery BP than the fluid evaporation portion 40 is in a manner such, for example, that the liquid supply portion 42 is disposed so that an area of the surface which comes in contact with the assembled battery BP or the heat conduction material 38 is smaller than that of the fluid evaporation portion 40 in the liquid supply portion 42. Further, the liquid supply portion 42 is disposed at a position of being more insulated from the heat of the assembled battery BP than the fluid evaporation portion 40 is in a manner such that the heat insulating portion 39 is interposed between the liquid supply portion 42 and the assembled battery BP.

Therefore, while maintaining the liquid-phase working fluid in the supply channel 421 in a state of being more insulated from the heat from the assembled battery BP, the liquid-phase working fluid can be supplied to each of the multiple evaporation channels 401, and the supplied working fluid can be evaporated in each of the multiple evaporation channels 401.

As a result, a phenomenon that the working fluid flows while being sequentially heated by the multiple stacked battery cells BC is avoided, and therefore, the occurrence of partial dryout can be reduced. Since a situation in which some of the battery cells BC of the assembled battery BP are hardly cooled due to the effect of the dryout can be avoided, a temperature variation among the multiple battery cells BC can be reduced.

Since multiple evaporation channels 401 are connected in parallel to the supply channel 421, the liquid-phase working fluid for cooling the battery cells BC is supplied from the supply channel 421 for each battery cell BC. Therefore, even if a dryout occurs, the dryout occurs uniformly in each evaporation channel 401, thereby making it difficult to expand the temperature variation among the multiple battery cells BC.

For example, it is assumed that there is a battery cell BC having a higher temperature than that of the other battery cells BC, and the working fluid is heavily boiled in a part of the evaporation channel 401 by the high temperature battery cell BC. In that case as well, since the working fluid flows in the liquid phase in the supply channel 421, the liquid-phase working fluid continues to be uniformly supplied to each of the evaporation channels 401 including the evaporation channel 401 in which the working fluid heavily boils as needed. For that reason, a phenomenon that the entire portion of the fluid evaporation portion 40 adjacent to a specific battery cell BC loses the cooling capacity due to dryout is less likely to occur. As a result, the expansion of the temperature variation among the battery cells BC can be reduced.

A space in the fluid evaporation portion 40 in which the working fluid is evaporated is subdivided into multiple evaporation channels 401 in the cell stacking direction DRs, and the liquid-phase working fluid is supplied to the multiple evaporation channels 401 in parallel. This makes it possible to reduce the amount of the working fluid in the working fluid circuit 10 while achieving the object of uniformly cooling the multiple battery cells BC. Further, if the amount of the working fluid to be sealed is reduced, the temperature responsiveness of each part to the transient capacity variation of the working fluid circuit 10 is improved correspondingly.

Further, according to the present embodiment, the multiple evaporation channels 401 are aligned side by side in the cell stacking direction DRs, and the working fluid flows in parallel. Therefore, each evaporation channel 401 can be shortened. This makes it possible to prematurely separate the bubbles from the flow of the working fluid containing the bubbles which induce dryout. In other words, a length of the path through which the working fluid flows from the generation of the bubble due to boiling to the separation of the bubble can be shortened. In short, in the evaporator 12 of the present embodiment, the gas-liquid separation property of the working fluid is improved as compared with the structure disclosed in Patent Literature 1.

In this example, if the gas-liquid separation property in the evaporator 12 is poor, when the working fluid boils violently, the liquid-phase working fluid is lifted by the bubble, and the bubble rises along with the bubble, but the working fluid in the liquid phase tends to move downward. As a result, the liquid surface of the working fluid fluctuates drastically as indicated by arrows A3 and A4 in FIG. 58. Further, the bubbles may flow back to the liquid path 18. On the other hand, in the evaporator 12 of the present embodiment, since the gas-liquid separation property of the working fluid is improved, such a situation can be avoided.

Further, in the evaporator 12 of the present embodiment, the mass flow rate of the working fluid circulating in the working fluid circuit 10 (that is, the evaporation amount of the working fluid) by changing the phase between the gas phase and the liquid phase is increased by improving the gas-liquid separation property of the working fluid. This makes it possible to improve the cooling capacity for cooling the assembled battery BP.

In addition, since a length of the path through which the working fluid flows from the generation of the bubble by boiling to the separation of the bubble can be shortened, the generation of abnormal noise caused by the bubble flow can be reduced.

In addition, according to the present embodiment, since the liquid supply portion 42 is disposed below the other portions 40 and 44 of the evaporator 12, the air bubbles (that is, steam), which cause dryout can be inhibited from stagnating in the supply channel 421.

According to the present embodiment, the working fluid flows from the lower side to the upper side in the evaporation channel 401. Therefore, the bubbles generated in the evaporation channel 401 are easily guided to the outflow channel 441.

According to the present embodiment, the supply channel 421 extends in the cell stacking direction DRs. This makes it possible to uniformly distribute the working fluid to each of the multiple evaporation channels 401 disposed in the cell stacking direction DRs.

According to the present embodiment, the outflow channel 441 extends in the cell stacking direction DRs. This makes it possible to collect the working fluid flowing out from each of the multiple evaporation channels 401 disposed in the cell stacking direction DRs, and then to flow out of the evaporator 12.

Further, according to the present embodiment, the outflow channel 441 is provided so that the channel cross-sectional area of the outflow channel 441 becomes larger toward the downstream side of the working fluid flow. This makes it possible to cope with the expansion of the gas volume due to the evaporation of the working fluid without unnecessarily expanding the volume of the outflow channel 441.

According to the present embodiment, each of the multiple evaporation channels 401 extends from the lateral-surface lower end BPc side to the lateral-surface upper end BPd side along the battery lateral surface BPb. This makes it possible to dispose the fluid evaporation portion 40 so that the working fluid gas evaporated in the evaporation channel 401 (that is, the gas-phase working fluid) can easily escape to the outflow channel 441.

According to the present embodiment, each of the multiple evaporation channels 401 has a flattened cross-sectional shape extending in the cell stacking direction DRs. Therefore, as compared with the case where a large number of the evaporation channels 401 are subdivided, the working fluid can flow into the evaporation channel 401 so as to reduce an increase in a flow resistance of the working fluid and make the working fluid susceptible to the heat of the assembled battery BP.

Further, according to the present embodiment, the first plate member 121 is stacked and joined to the second plate member 122, as a result of which the multiple evaporation channels 401 are provided between the first evaporation forming portion 121a and the second evaporation forming portion 122a. At the same time, the supply channel 421 is provided between the first supply forming portion 121b and the second supply forming portion 122b, and the outflow channel 441 is provided between the first outflow forming portion 121c and the second outflow forming portion 122c. The first evaporation forming portion 121a is disposed between the second evaporation forming portion 122a and the assembled battery BP. The second evaporation forming portion 122a has multiple protrusion portions 122d protruding toward the first evaporation forming portion 121a of the first plate member 121. The protrusion portions 122d abut against the first evaporation forming portion 121a to partition the multiple evaporation channels 401 from one another. This makes it possible to configure the evaporator 12 with a small number of components.

Second Embodiment

Next, a second embodiment will be described. In the present embodiment, differences from the first embodiment will be mainly described. In addition, the same or equivalent parts as those of the above-described embodiment will be omitted or simplified for description. The same also applies to the third embodiment and the subsequent embodiments to be described later.

Figure 5:
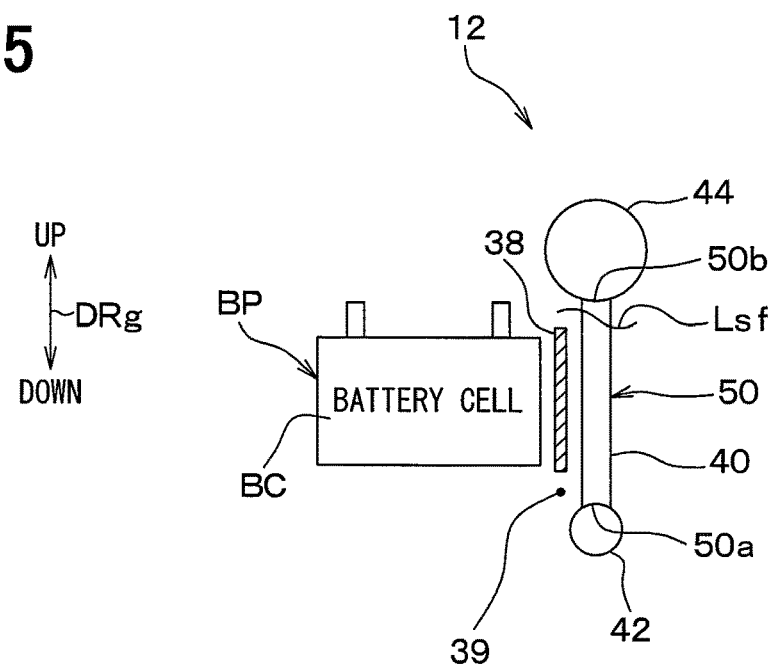
FIG. 5 is a cross-sectional view schematically showing a cross section taken along a line II-II in FIG. 1 according to a second embodiment, which corresponds to FIG. 2 in the first embodiment.
Figure 6:
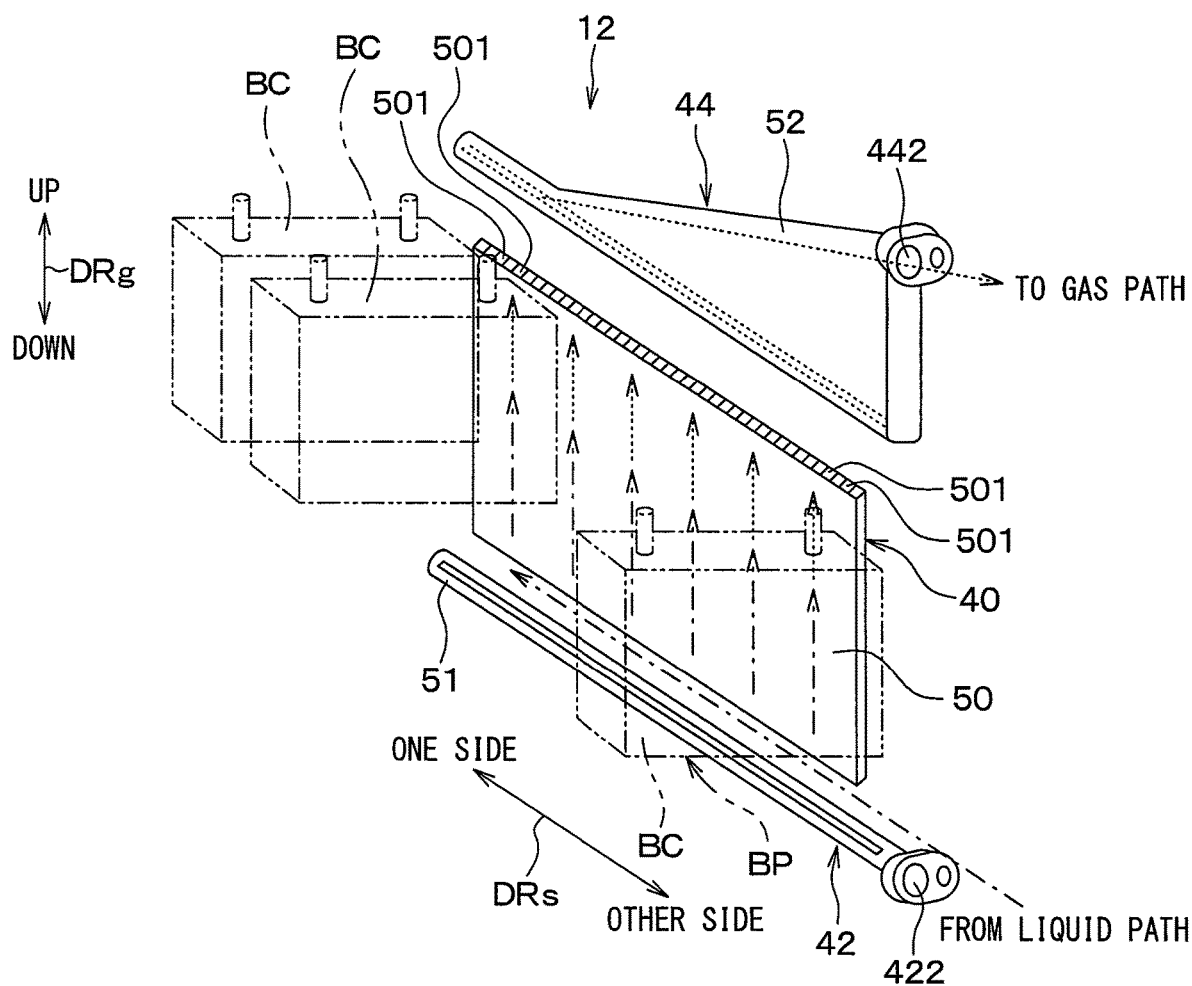
FIG. 6 is an exploded perspective view showing a schematic configuration of an evaporator according to the second embodiment, which corresponds to FIG. 3 in the first embodiment.

As shown in FIGS. 5 and 6, a placement relationship of an assembled battery BP, a fluid evaporation portion 40, a liquid supply portion 42, and a fluid outflow portion 44 in the present embodiment is the same as that in the first embodiment. In other words, also in the present embodiment, the fluid evaporation portion 40 is connected to a battery lateral surface BPb of the assembled battery BP so as to be thermally conductive. The liquid supply portion 42 is disposed apart from both the assembled battery BP and the heat conduction material 38.

However, the evaporator 12 of the present embodiment includes a multi-hole pipe 50 and two piping members 51 and 52, and those members 50, 51, and 52 are joined to one another by brazing or the like. In that respect, the present embodiment is different from the first embodiment. A solid line Lsf in FIG. 5 indicates a liquid surface position of a working fluid.

More specifically, in the evaporator 12, the fluid evaporation portion 40 is configured by the multi-hole pipe 50, the liquid supply portion 42 is configured by the upstream side piping member 51, and the fluid outflow portion 44 is configured by the downstream side piping member 52. The multi-hole pipe 50, the upstream side piping member 51 and the downstream side piping member 52 are made of metal such as aluminum alloy, for example.

The multi-hole pipe 50 is a flattened multi-hole pipe formed by extrusion or the like. The multi-hole pipe 50 is formed so as to extend in a plane shape in the vehicle vertical direction DRg and the cell stacking direction DRs, and has one end 50a as a lower end and the other end 50b as an upper end. Multiple communication holes 501 are defined inside the multi-hole pipe 50. The multiple communication holes 501 are provided as multiple evaporation channels 401. The number of the communication holes 501 as the evaporation channels 401 is larger than the number of the battery cells BC included in the assembled battery BP.

The multiple communication holes 501 are stacked in the cell stacking direction DRs while being separated from one another. Each of the multiple communication holes 501 communicates from one end 50a to the other end 50b of the multi-hole pipe 50, and is opened at each of the one end 50a and the other end 50b. In short, the multiple communication holes 501 are through holes extending from one end 50a to the other end 50b of the multi-hole pipe 50.

An upstream side piping member 51 and a downstream side piping member 52 are formed to extend in the cell stacking direction DRs. An internal space is defined in each of the upstream side piping member 51 and the downstream side piping member 52.

The internal space of the upstream side piping member 51 serves as a supply channel 421, and the internal space of the downstream side piping member 52 serves as an outflow channel 441. One end 50a of the multi-hole pipe 50 is joined to the upstream side piping member 51, as a result of which the communication holes 501 as the evaporation channels 401 communicate with the supply channel 421. The other end 50b of the multi-hole pipe 50 is joined to the downstream side piping member 52, as a result of which the communication holes 501 communicate with the outflow channel 441.

The fluid inlet 422 is provided not on one side but on the other side of the cell stacking direction DRs in the liquid supply portion 42.

Except for what has been described above, the present embodiment is the same as the first embodiment. The present embodiment can obtain the same effects as those of the first embodiment, which are obtained from the same configuration as that of the first embodiment.

Further, according to the present embodiment, the fluid evaporation portion 40 is formed of the multi-hole pipe 50. The multi-hole pipe 50 is formed with multiple communication holes 501 communicating from one end 50a to the other end 50b of the multi-hole pipe 50 and opened at the one end 50a and the other end 50b. The multiple communication holes 501 are provided as multiple evaporation channels 401. Therefore, multiple evaporation channels 401 can be easily provided.

Third Embodiment

Next, a third embodiment will be described. In the present embodiment, differences from the second embodiment will be mainly described.

Figure 7:
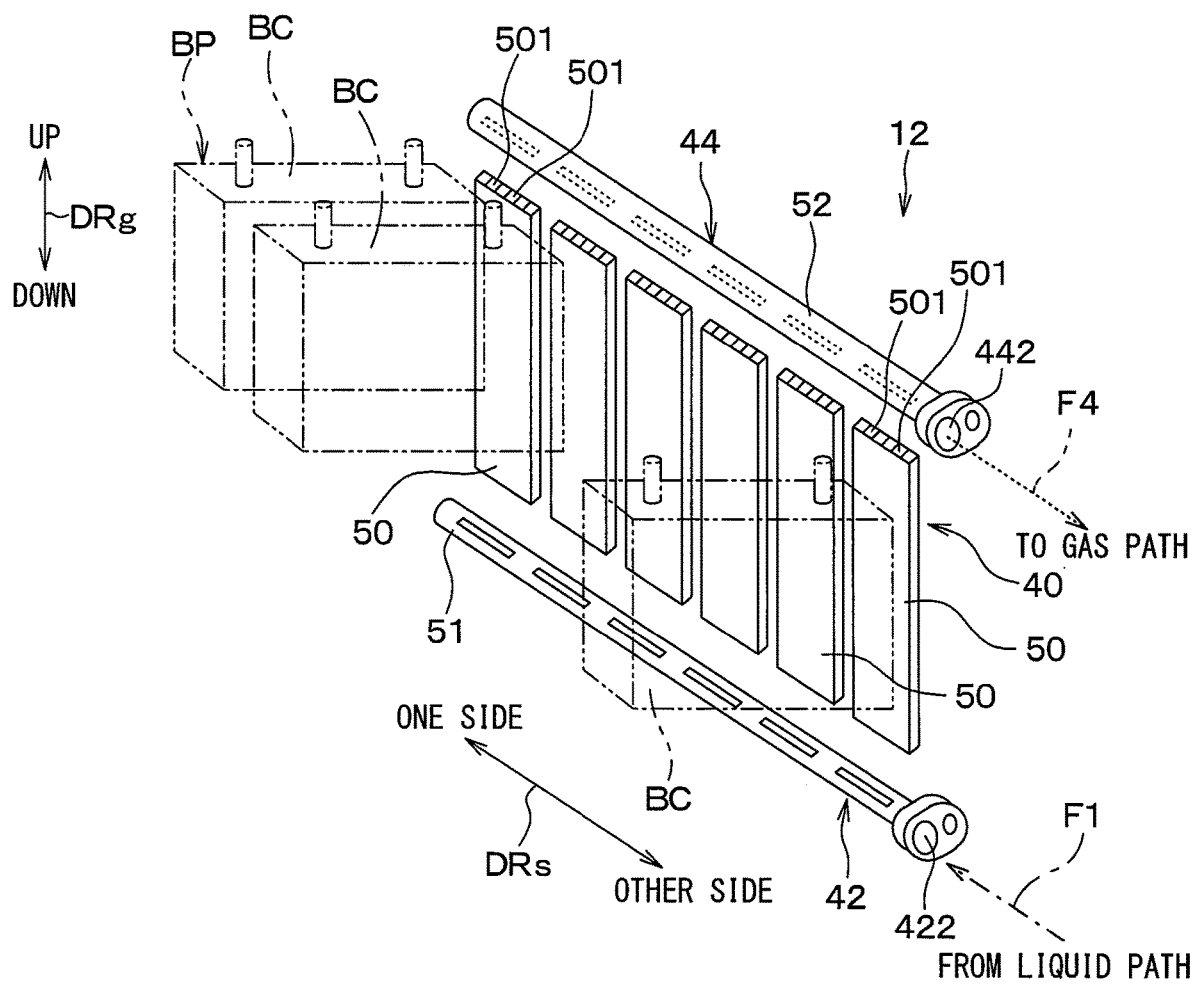
FIG. 7 is an exploded perspective view showing a schematic configuration of an evaporator according to a third embodiment, which corresponds to FIG. 6 in the second embodiment.

As shown in FIG. 7, in the present embodiment, unlike the second embodiment, an evaporator 12 has multiple multi-hole pipes 50, and a fluid evaporation portion 40 is configured by the multiple multi-hole pipes 50. The multiple multi-hole pipes 50 are aligned side by side in the cell stacking direction DRs, and are connected to an upstream side piping member 51 and a downstream side piping member 52 in parallel with each other.

The multi-hole pipes 50 according to the present embodiment are also flattened multi-hole pipes, but each of the multi-hole pipes 50 according to the present embodiment has a flattened cross-sectional longitudinal width smaller than that of the multi-hole pipe 50 of the second embodiment.

In the present embodiment, for example, the multiple multi-hole pipes 50 are provided in the same number as the battery cells BC, and are disposed so that one multi-hole pipe 50 is allocated to each battery cell BC.

Except for what has been described above, the present embodiment is the same as the second embodiment. The present embodiment can obtain the same effects as those of the second embodiment, which are obtained from the same configuration as that of the second embodiment.

Further, according to the present embodiment, a fluid evaporation portion 40 is formed of the multiple multi-hole pipes 50. Accordingly, the fluid evaporation portion 40 can be pushed against a battery lateral surface BPb by following irregularities of the battery side BPb due to the micro-misalignment of each battery cell BC, and so on. In short, an adhesion of the fluid evaporation portion 40 to a heat conduction material 38 (refer to FIG. 5) can be improved.

Fourth Embodiment

Next, a fourth embodiment will be described. In the present embodiment, differences from the first embodiment will be mainly described.

Figure 8:
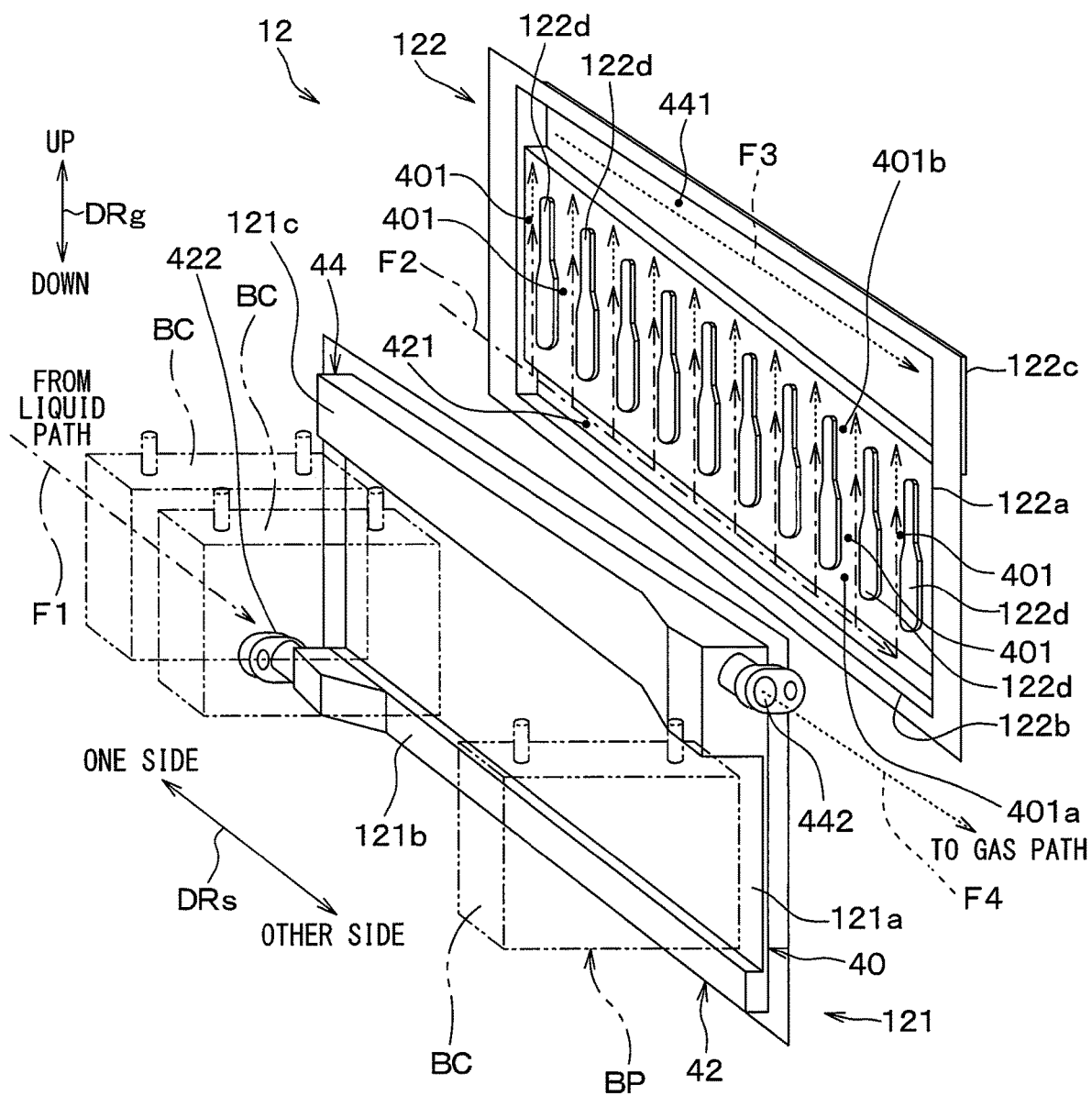
FIG. 8 is an exploded perspective view showing a schematic configuration of an evaporator according to a fourth embodiment, which corresponds to FIG. 3 in the first embodiment.

As shown in FIG. 8, in the present embodiment, a shape of evaporation channels 401 and a shape of protrusion portions 122d of a second plate member 122 are different from those of the first embodiment.

More specifically, a width of the protrusion portions 122d in a cell stacking direction DRs becomes narrower as the protrusion portions 122d are closer to downstream ends 401b of the evaporation channels 401. For that reason, the multiple evaporation channels 401 are provided so that a channel cross-sectional area of the evaporation channels 401 becomes larger toward the downstream side of the working fluid flow. The channel cross-sectional area of the evaporation channels 401 is a cross-sectional area of the evaporation channels 401 in a cross section in which a direction of the working fluid flow is a normal direction, specifically, in which a vertical direction DRg of the vehicle is a normal direction.

Except for what has been described above, the present embodiment is the same as the first embodiment. The present embodiment can obtain the same effects as those of the first embodiment, which are obtained from the same configuration as that of the first embodiment.

Further, according to the present embodiment, each of the multiple evaporation channels 401 of the fluid evaporation portion 40 is provided so that a channel cross-sectional area of the evaporation channels 401 becomes larger toward the downstream side of the working fluid flow. Therefore, as a volume ratio of the gas phase increases due to evaporation of the working fluid in the evaporation channel 401, the channel cross-sectional area of the evaporation channel 401 increases. For that reason, the gas-liquid separation property and the gas discharge property of the working fluid in the evaporation channels 401 are improved without unnecessarily enlarging the volume of each evaporation channel 401.

In the present embodiment, in all of the multiple evaporation channels 401, the channel cross-sectional area of the evaporation channels 401 is increased more toward the working fluid flow downstream side, but there is no need to be so large in all of the evaporation channels 401. In other words, in any one of the multiple evaporation channels 401, the channel cross-sectional area of the evaporation channel 401 may be increased toward the downstream side of the working fluid flow.

Although the present embodiment is a modification based on the first embodiment, the present embodiment can be combined with the second embodiment or the third embodiment described above.

Fifth Embodiment

Next, a fifth embodiment will be described. In the present embodiment, differences from the first embodiment will be mainly described.

Figure 9:
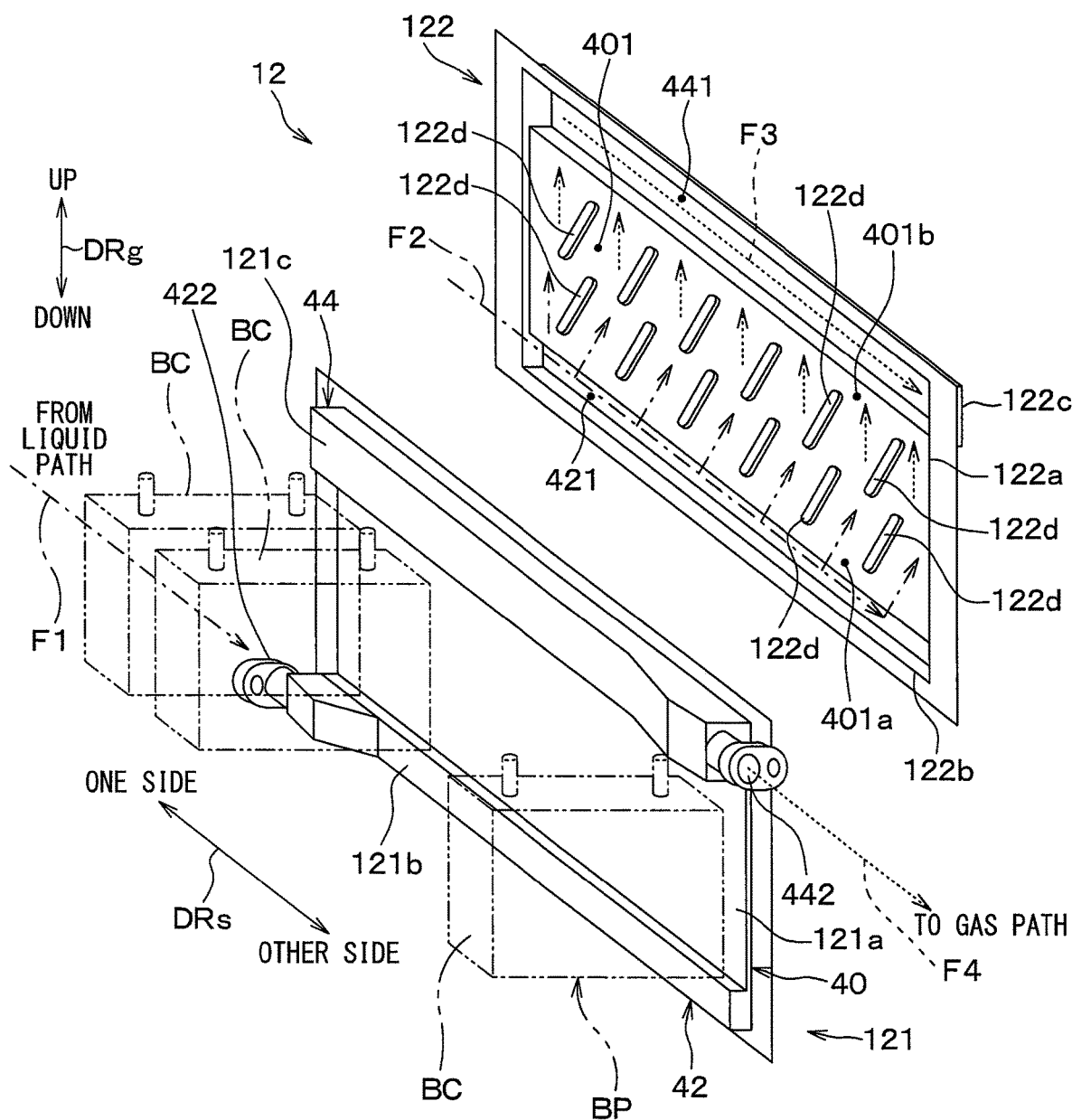
FIG. 9 is an exploded perspective view showing a schematic configuration of an evaporator according to a fifth embodiment, which corresponds to FIG. 3 in the first embodiment.

As shown in FIG. 9, in the present embodiment, a shape of evaporation channels 401 and a shape of protrusion portions 122d of a second plate member 122 are different from those of the first embodiment.

Specifically, each protrusion portion 122d does not extend over an entire length from an upstream end 401a to a downstream end 401b of the evaporation channels 401. The multiple protrusion portions 122d are disposed at intervals in the cell stacking direction DRs, and two rows of the protrusion portions 122d in the cell stacking direction DRs are provided. An alignment of the protrusion portions 122d of one of the two rows is disposed above an alignment of the protrusion portions 122d of the other row. Further, a space is also provided between the protrusion portions 122d configuring one alignment and the protrusion portions 122d configuring the other alignment.

Therefore, the multiple evaporation channels 401 of the fluid evaporation portion 40 communicate with one another in the middle of the evaporation channel 401. In other words, if attention is paid to a certain evaporation channel 401 (in other words, one evaporation channel 401) among the multiple evaporation channels 401, it is conceivable that one evaporation channel 401 communicates with an evaporation channel 401 adjacent to the one evaporation channel 401 in the middle of the one certain evaporation channel 401.

In the present embodiment, each of the multiple protrusion portions 122d of the second plate member 122 extends from a liquid supply portion 42 toward a fluid outflow portion 44. In that respect, the present embodiment is the same as the first embodiment. However, unlike the first embodiment, each of the multiple protrusion portions 122d according to the present embodiment extends in a direction oblique to the cell stacking direction DRs. Therefore, according to the present embodiment, each of the multiple evaporation channels 401 also extends in a direction inclined with respect to the cell stacking direction DRs.

In the outflow channel 441 of the present embodiment, the channel cross-sectional area of the outflow channel 441 is the same at any point in the cell stacking direction DRs, but as in the first embodiment, the channel cross-sectional area of the outflow channel 441 may be increased more toward the downstream side of the working fluid flow.

Except for what has been described above, the present embodiment is the same as the first embodiment. The present embodiment can obtain the same effects as those of the first embodiment, which are obtained from the same configuration as that of the first embodiment.

According to the present embodiment, one evaporation channel 401 of the multiple evaporation channels 401 communicates with another evaporation channel 401 adjacent to the one evaporation channel 401 in the middle of the one evaporation channel 401. This makes it possible to keep an internal pressure uniform between the one evaporation channel 401 and another evaporation channel 401 adjacent to the one evaporation channel 401. In other words, a pressure loss of the working fluid can be appropriately adjusted.

Further, if an internal pressure is maintained evenly in the multiple evaporation channels 401, an increase in the internal pressure of only a portion of the evaporation channels 401 can be avoided, thereby being capable of avoiding an increase in a flow velocity of the working fluid due to the increase in the pressure. This makes it possible to prevent the gas-liquid separation property from being impaired due to an increase in the flow velocity of the working fluid in some of the evaporation channels 401.

Further, according to the present embodiment, each of the multiple evaporation channels 401 extends in a direction oblique to the cell stacking direction DRs. As a result, there is an advantage that the bending strength of the fluid evaporation portion 40 can be easily secured.

Further, an orientation of inclination of the evaporation channels 401 will be described in detail. The evaporation channels 401 are inclined with respect to the cell stacking direction DRs so as to be positioned to the other side in the cell stacking direction DRs toward the working fluid flow downstream side of the evaporation channel 401. The working fluid flow downstream side in the supply channel 421 is the other side in the cell stacking direction DRs. Accordingly, a flow resistance as the working fluid enters the evaporation channel 401 from the supply channel 421 can be reduced compared to, for example, a case in which the evaporation channel 401 is coupled perpendicular to the supply stream 421.

Although the present embodiment is a modification based on the first embodiment, the present embodiment can be combined with any of the above-mentioned second to fourth embodiments.

Sixth Embodiment

Next, a sixth embodiment will be described. In the present embodiment, differences from the second embodiment will be mainly described.

Figure 10:
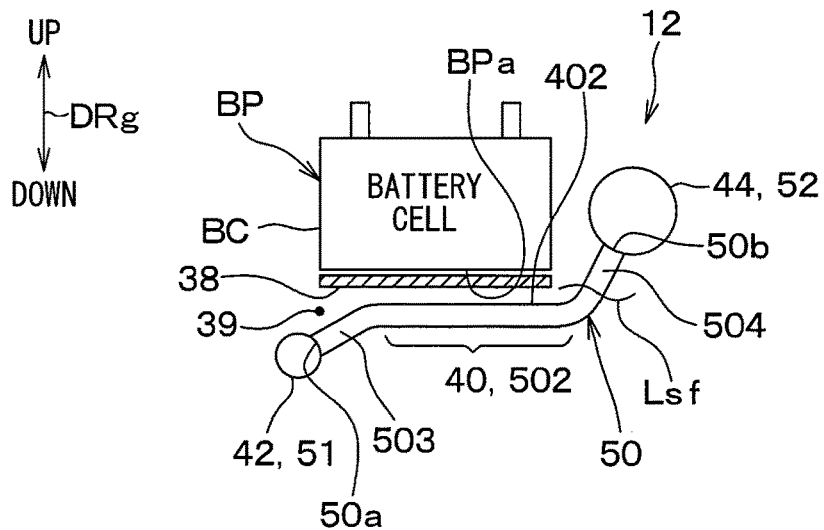
FIG. 10 is a cross-sectional view schematically showing a cross section taken along a line II-II in FIG. 1 according to a sixth embodiment, which corresponds to FIG. 5 in the second embodiment.
Figure 11:
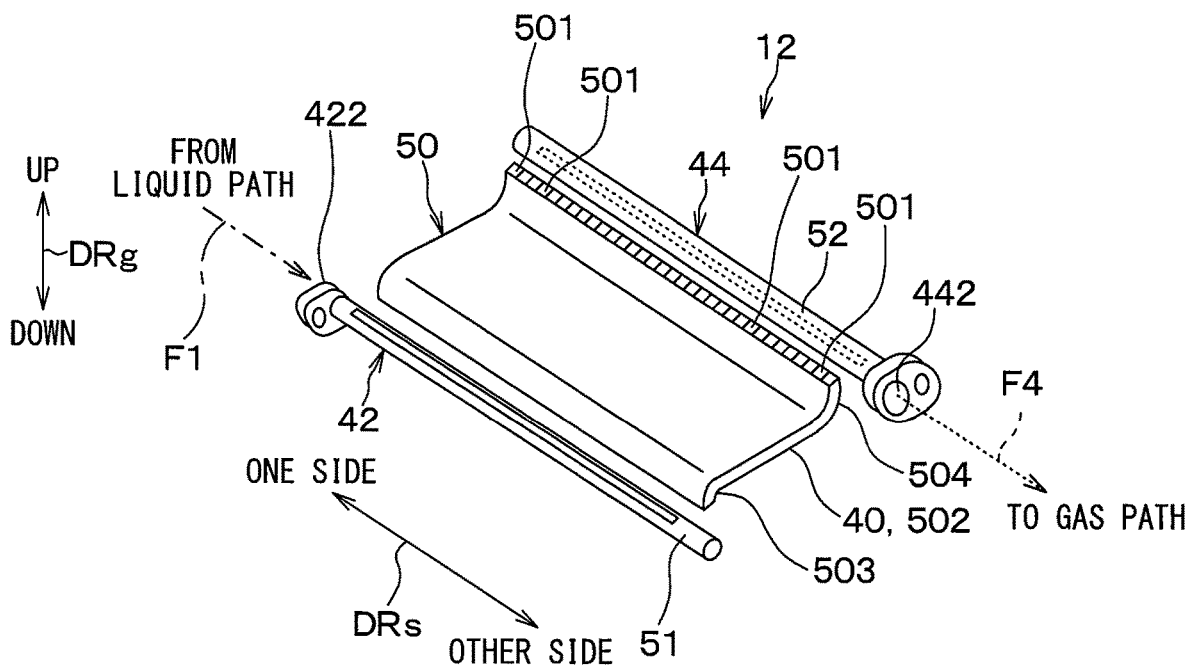
FIG. 11 is an exploded perspective view showing a schematic configuration of an evaporator according to the sixth embodiment, which corresponds to FIG. 6 in the second embodiment.
Figure 12:
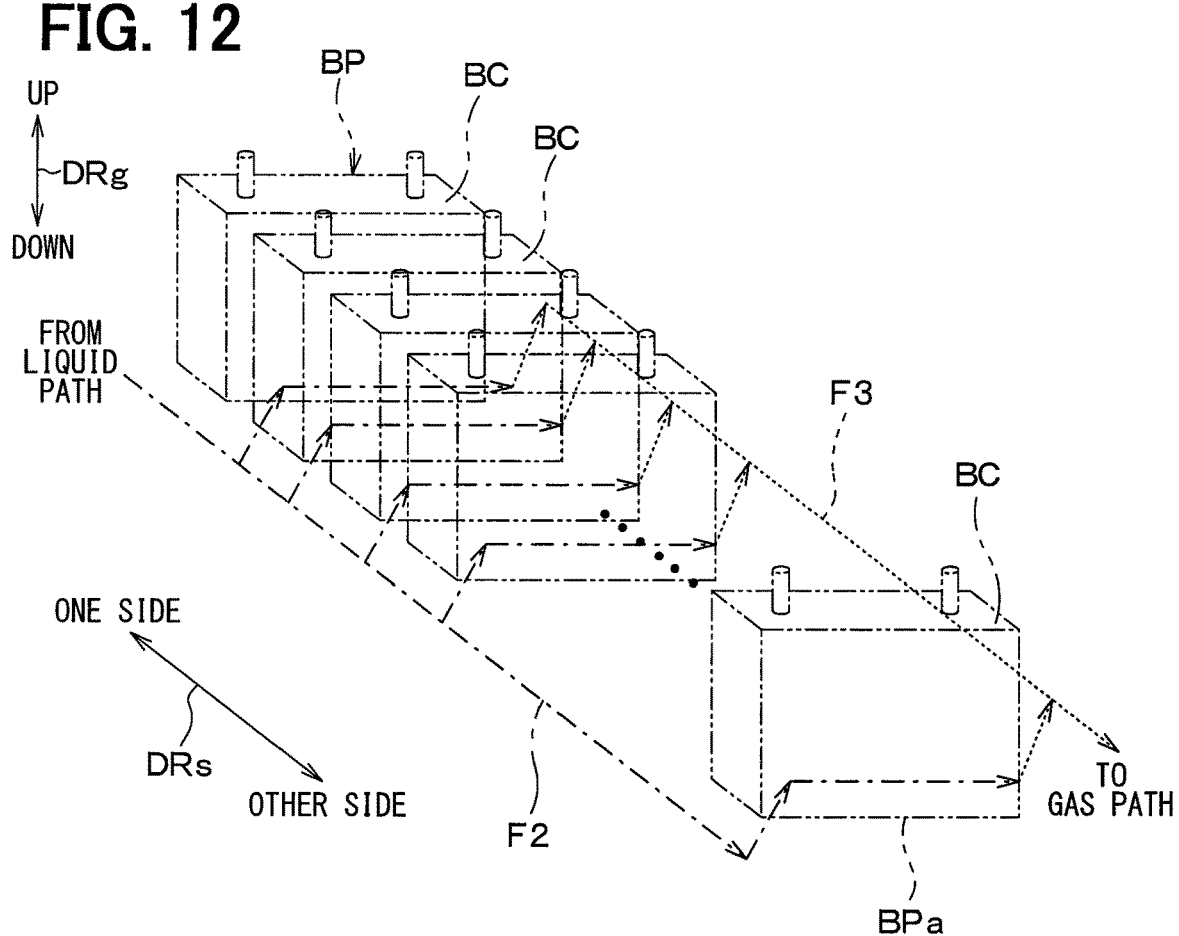
FIG. 12 is a perspective view schematically showing a positional relationship between a working fluid flow in an evaporator and an assembled battery according to the sixth embodiment, which corresponds to FIG. 4 in the first embodiment.

As shown in FIGS. 10 and 11, in the present embodiment, a fluid evaporation portion 40 is connected to a battery lower surface BPa of an assembled battery BP so as to be thermally conductive, not to a battery lateral surface BPb. In this respect, the present embodiment is different from the second embodiment. FIG. 11 shows an evaporator 12 alone, and the same also applies to FIG. 13 to be described later.

More specifically, a multi-hole pipe 50 according to the present embodiment includes a supply side relay portion 503 and an outflow side relay portion 504 in addition to an evaporation configuration portion 502 configuring the fluid evaporation portion 40. Each communication hole 501 of the multi-hole pipe 50 penetrates through the whole of the supply side relay portion 503, the evaporation configuration portion 502, and the outflow side relay portion 504. For example, a portion of the communication holes 501 of the multi-hole pipe 50 which is included in the evaporation configuration portion 502 forms evaporation channels 401 (refer to FIG. 3) of a fluid evaporation portion 40.

The fluid evaporation portion 40 is disposed such that an upper surface 402 of the fluid evaporation portion 40 faces upward. The fluid evaporation portion 40 is pressed against the battery lower surface BPa of the assembled battery BP across a heat conduction material 38. In other words, the fluid evaporation portion 40 is connected to the battery lower surface BPa of the assembled battery BP in a thermally conductive manner at the upper surface 402 of the fluid evaporation portion 40. The communication holes 501 serving as the multiple evaporation channels 401 of the fluid evaporation portion 40 extend in a direction along the battery lower surface BPa of the assembled battery BP.

The supply side relay portion 503 of the multi-hole pipe 50 is disposed between an upstream side piping member 51 and the evaporation configuration portion 502, and connects the upstream side piping member 51 and the evaporation configuration portion 502. The supply side relay portion 503 extends from the evaporation configuration portion 502 to the upstream side of the working fluid flow in the communication holes 501, that is, to the upstream side piping member 51. The supply side relay portion 503 is connected to the upstream side piping member 51 at one end 50a of the multi-hole pipe 50 which is a tip of the supply side relay portion 503.

Further, the supply side relay portion 503 extends so as to be inclined with respect to a vehicle vertical direction DRg so as to be positioned downward toward the upstream side piping member 51 side. Therefore, also in the present embodiment, the liquid supply portion 42 is disposed apart from both the assembled battery BP and the heat conduction material 38.

The outflow side relay portion 504 of the multi-hole pipe 50 is disposed between the downstream side piping member 52 and the evaporation configuration portion 502, and connects the downstream side piping member 52 and the evaporation configuration portion 502. The outflow side relay portion 504 extends from the evaporation configuration portion 502 to the downstream side of the working fluid flow in the communication hole 501, that is, to the downstream side piping member 52. The outflow side relay portion 504 is connected to the downstream side piping member 52 at the other end 50b of the multi-hole pipe 50 which is a tip of the outflow side relay portion 504. The downstream side piping member 52 is disposed on the side of the assembled battery BP away from the assembled battery BP.

The outflow side relay portion 504 extends to be inclined with respect to the vehicle vertical direction DRg so as to be positioned upward toward the downstream side piping member 52 side. Therefore, also in the present embodiment, the fluid outflow portion 44 is disposed above the liquid supply portion 42 and the fluid evaporation portion 40, and the liquid supply portion 42 is disposed below the fluid outflow portion 44 and the fluid evaporation portion 40.

In the present embodiment, a channel cross-sectional area of an outflow channel 441 (refer to FIG. 3), which is an internal space of the downstream side piping member 52, is the same at any point in the cell stacking direction DRs. In this regard, the channel cross-sectional area of the outflow channel 441 may be increased more toward the downstream side of the working fluid flow as in the second embodiment.

A fluid inlet 422 is provided on one side of the liquid supply portion 42, not on the other side in the cell stacking direction DRs. Accordingly, in the supply channel 421 (refer to FIG. 3) of the liquid supply portion 42 of the present embodiment, the working fluid flows from one side to the other side in the cell stacking direction DRs.

In the evaporator 12 configured as described above, as shown in FIGS. 11 and 12, a liquid-phase working fluid from a liquid path 18 (refer to FIG. 1) flows from the fluid inlet 422 into the supply channel 421 as indicated by an arrow F1. The inflow working fluid flows in a supply channel 421 (refer to FIG. 3) as indicated by an arrow F2, and is distributed from the supply channel 421 to the multiple communication holes 501 of the multi-hole pipe 50. In other words, the working fluid is distributed to each of the multiple evaporation channels 401 (refer to FIG. 3) configured by the communication holes 501. The working fluid in the evaporation channel 401 draws a heat from each battery cell BC, flows while evaporating, and flows into the outflow channel 441 (refer to FIG. 3) through the outflow side relay portion 504 of the multi-hole pipe 50.

The working fluid flowing into the outflow channel 441 is gas-liquid separated, flows from one side to the other side in the cell stacking direction DRs in the outflow channel 441 as indicated by an arrow F3, and the gas-phase working fluid flows out from the fluid outlet 442 to the gas path 16 (refer to FIG. 1) as indicated by an arrow F4.

Except for what has been described above, the present embodiment is the same as the second embodiment. The present embodiment can obtain the same effects as those of the second embodiment, which are obtained from the same configuration as that of the second embodiment.

According to the present embodiment, the fluid evaporation portion 40 is connected to the battery lower surface BPa of the assembled battery BP so as to be thermally conductive. The communication holes 501 serving as the multiple evaporation channels 401 extend in a direction along the battery lower surface BPa of the battery. This makes it possible to secure a contact load for enhancing the thermal conductivity between the assembled battery BP and the fluid evaporation portion 40 by leveraging the weight of the assembled battery BP.

Seventh Embodiment

Next, a seventh embodiment will be described. In the present embodiment, differences from the sixth embodiment will be mainly described.

Figure 13:
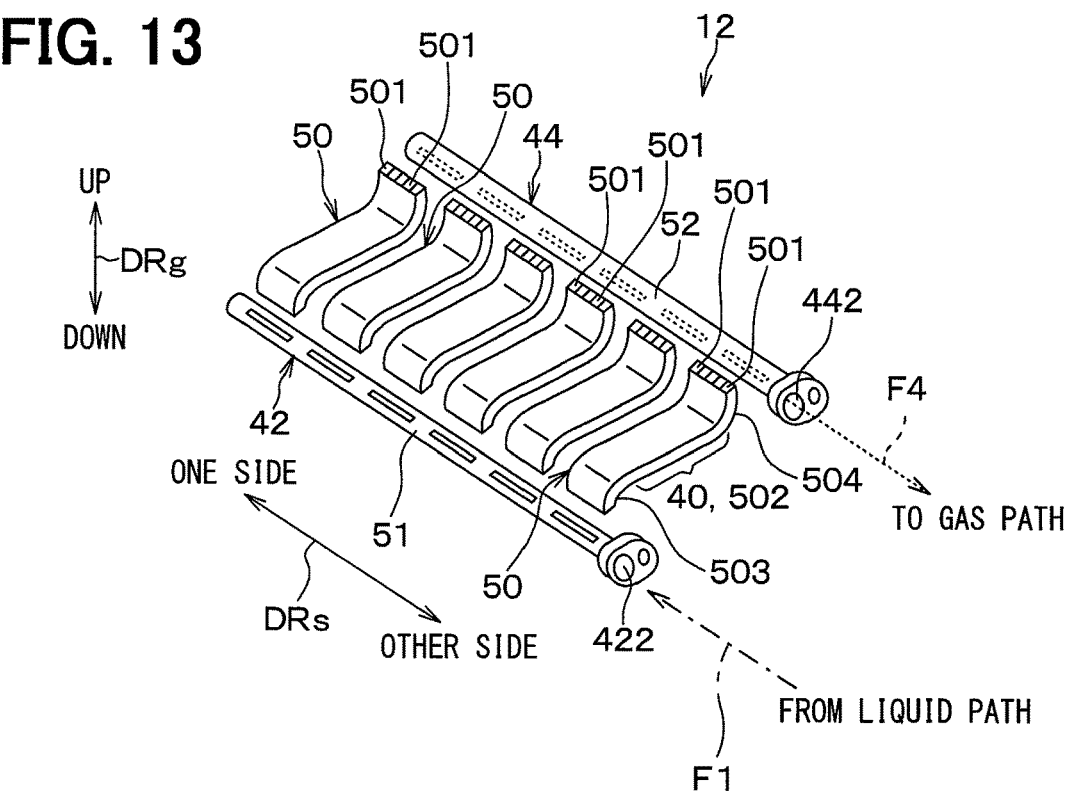
FIG. 13 is an exploded perspective view showing a schematic configuration of an evaporator according to a seventh embodiment, which corresponds to FIG. 11 in the sixth embodiment.

As shown in FIG. 13, in the present embodiment, unlike the sixth embodiment, the evaporator 12 has multiple multi-hole pipes 50. Each of the multi-hole pipes 50 has an evaporation configuration portion 502, a supply side relay portion 503, and an outflow side relay portion 504. Accordingly, the fluid evaporation portion 40 is configured by the evaporation configuration portion 502 of the multiple multi-hole pipes 50.

The multiple multi-hole pipes 50 are aligned side by side in the cell stacking direction DRs, and are connected to an upstream side piping member 51 and a downstream side piping member 52 in parallel with each other.

In the present embodiment, for example, the multiple multi-hole pipes 50 are provided in the same number as the battery cells BC, and are disposed so that one multi-hole pipe 50 is allocated to each battery cell BC.

Figure 14:
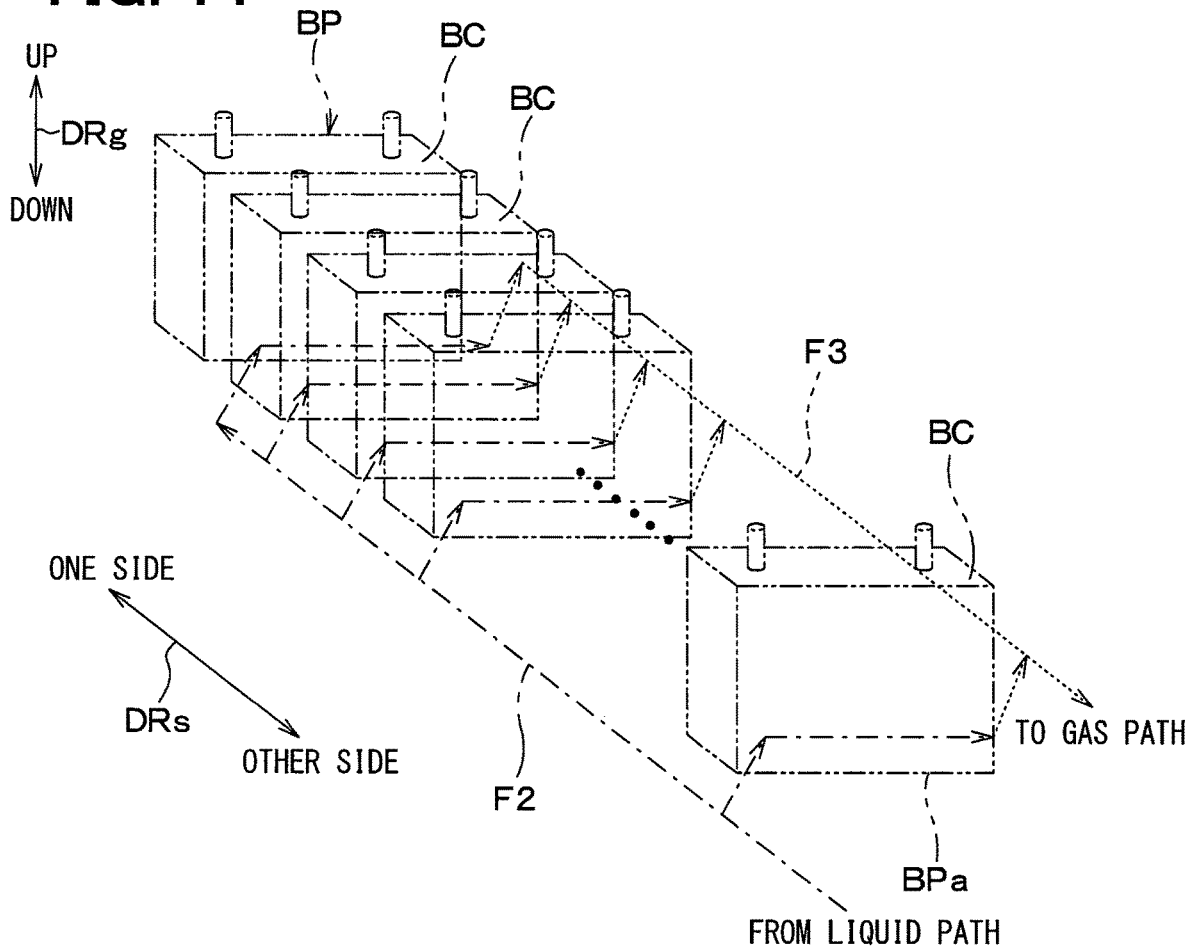
FIG. 14 is a perspective view schematically showing a positional relationship between a working fluid flow in the evaporator and an assembled battery according to the seventh embodiment, which corresponds to FIG. 12 of the sixth embodiment.

In the evaporator 12 configured as described above, as indicated by dashed-dotted arrows and dashed arrows in FIGS. 13 and 14, the liquid-phase working fluid from the liquid path 18 (refer to FIG. 1) flows basically in the same manner as in the sixth embodiment.

However, the fluid inlet 422 of the present embodiment is provided not on one side but on the other side of the liquid supply portion 42 in the cell stacking direction DRs. Accordingly, in the supply channel 421 (refer to FIG. 3) of the liquid supply portion 42 according to the present embodiment, the working fluid flows from one side to the other side in the cell stacking direction DRs, as indicated by an arrow F2.

Except for what has been described above, the present embodiment is the same as the sixth embodiment. The present embodiment can obtain the same effects as those in the sixth embodiment by the configuration common to the sixth embodiment.

Further, according to the present embodiment, since the fluid evaporation portion 40 is formed of multiple multi-hole pipes 50, the effects of the configuration can be obtained in the same manner as in the third embodiment having the common configuration.

Eighth Embodiment

Next, an eighth embodiment will be described. In the present embodiment, differences from the first embodiment will be mainly described.

Figure 15:
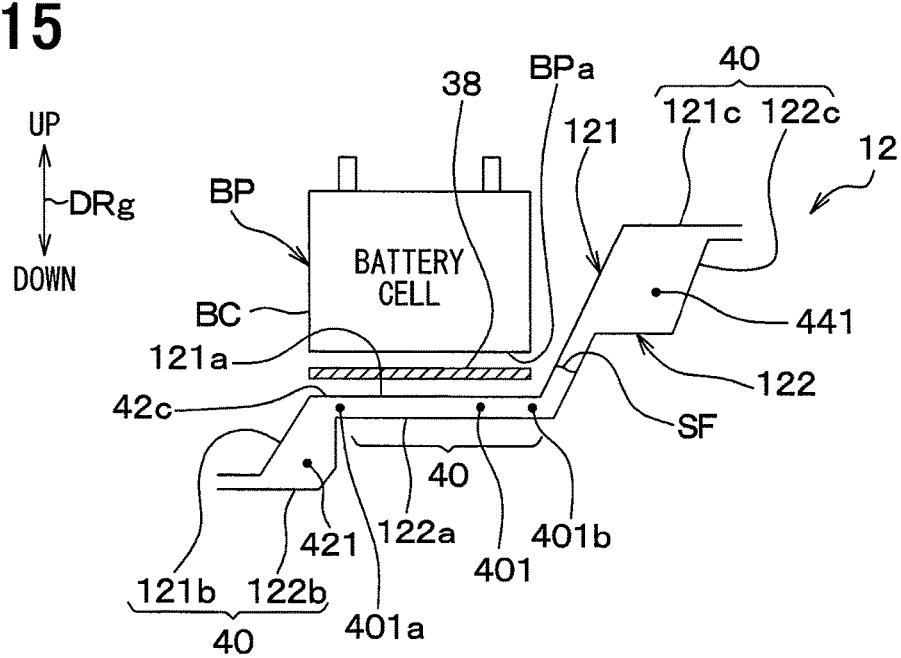
FIG. 15 is a cross-sectional view schematically showing a cross section taken along a line II-II of FIG. 1 in the eighth embodiment, and corresponds to FIG. 2 in the first embodiment.
Figure 16:
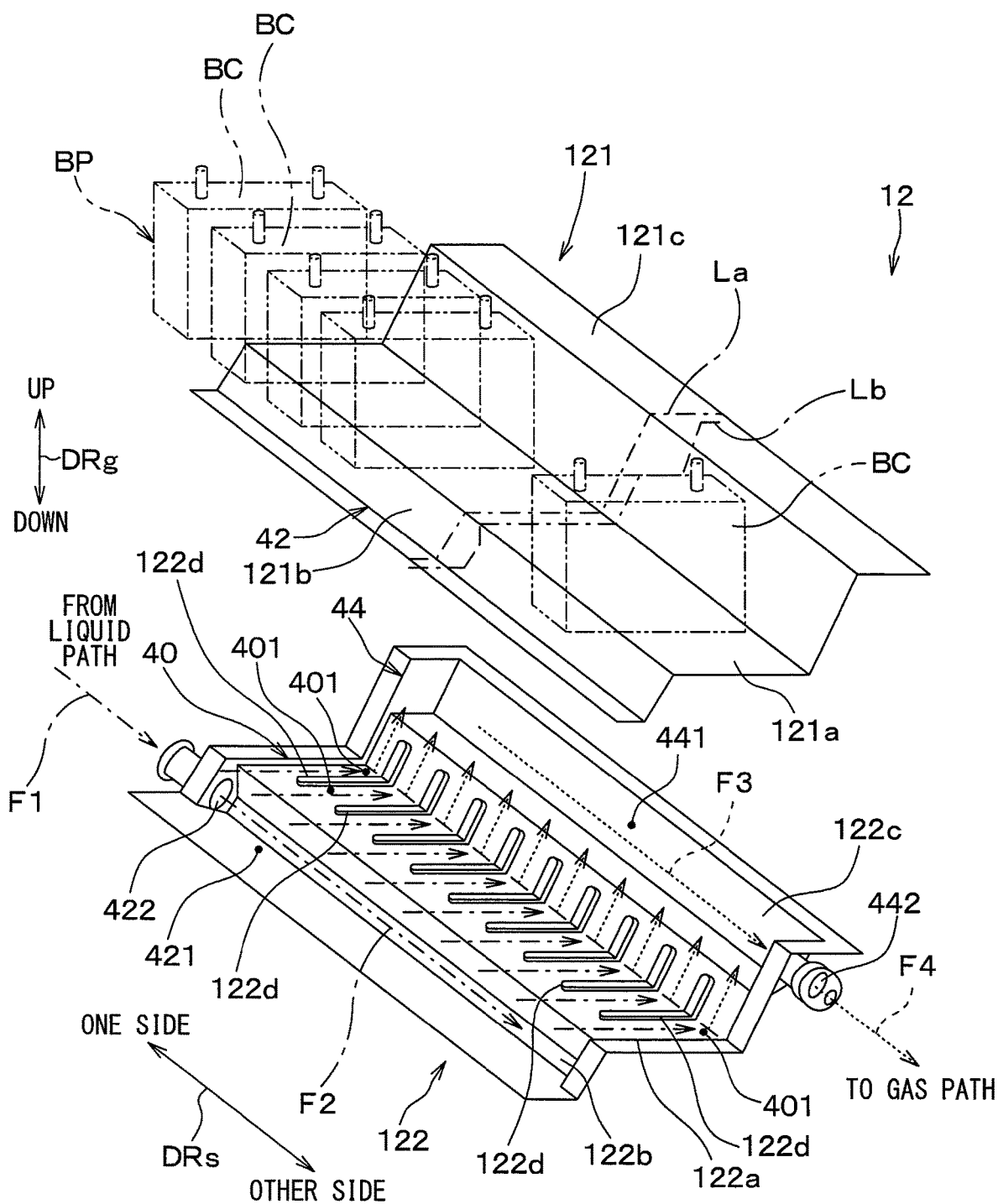
FIG. 16 is an exploded perspective view showing a schematic configuration of an evaporator according to an eighth embodiment, which corresponds to FIG. 3 in the first embodiment.

As shown in FIGS. 15 and 16, in the present embodiment, unlike the first embodiment, a fluid evaporation portion 40 is connected to a battery lower surface BPa of an assembled battery BP so as to be thermally conductive, not to a battery lateral surface BPb.

In the present embodiment, a liquid supply portion 42 comes in contact with a heat conduction material 38 at an edge 42*c* of the liquid supply portion 42 on a side of the fluid evaporation portion 40. However, a contact area of an edge 42*c* with the heat conduction material 38 is small. Therefore, also in the present embodiment, the liquid supply portion 42 is disposed so that the surface area of the liquid supply portion 42 in contact with the assembled battery BP or the heat conduction material 38 is smaller than that of the fluid evaporation portion 40. In short, the liquid supply portion 42 is disposed at a position more insulated from the heat of the assembled battery BP than the fluid evaporation portion 40.

Dashed-dotted lines La and Lb in FIG. 16 represent cross-sectional shapes in a state in which the first plate member 121 and the second plate member 122 are joined to each other, a dashed-dotted line La corresponds to the first plate member 121, and a dashed-dotted line Lb corresponds to the second plate member 122. The dashed-dotted lines La and Lb are intentionally shown at intervals for easy-to-see illustration.

Except for what has been described above, the present embodiment is the same as the first embodiment. The present embodiment can obtain the same effects as those of the first embodiment, which are obtained from the same configuration as that of the first embodiment.

According to the present embodiment, the fluid evaporation portion 40 is connected to the battery lower surface BPa of the assembled battery BP so as to be thermally conductive. This is the same as the sixth embodiment described above. Therefore, in the present embodiment, the effects obtained from the configuration common to the sixth embodiment can be obtained in the same manner as in the sixth embodiment.

Ninth Embodiment

Next, a ninth embodiment will be described. In the present embodiment, differences from the eighth embodiment will be mainly described.

Figure 17:
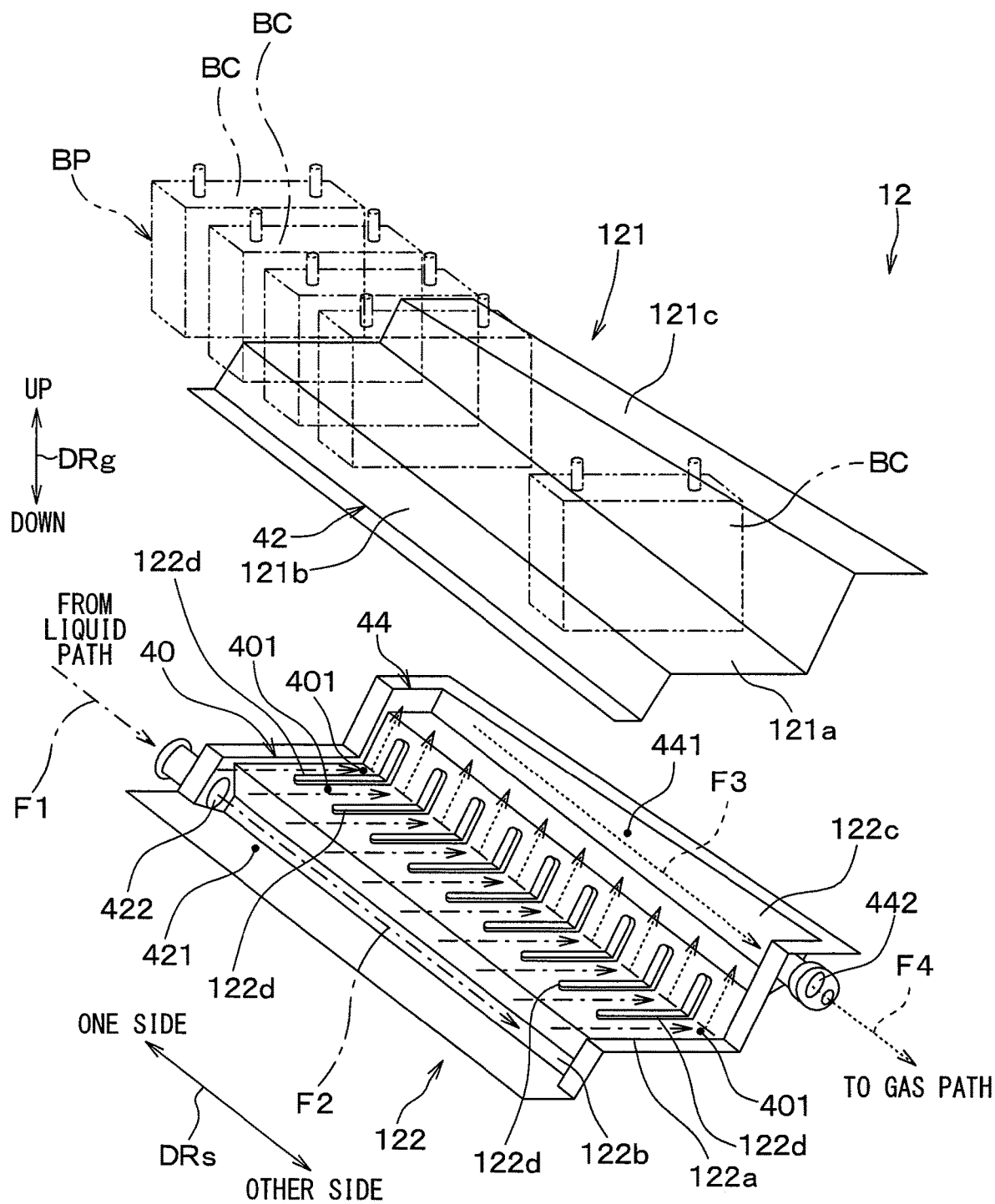
FIG. 17 is an exploded perspective view showing a schematic configuration of an evaporator according to a ninth embodiment, which corresponds to FIG. 16 in the eighth embodiment.

As shown in FIG. 17, an outflow channel 441 according to the present embodiment is configured so that a channel cross-sectional area of an outflow channel 441 becomes larger toward a downstream side of a working fluid flow. Except for the above configuration, the present embodiment is the same as the eighth embodiment. The present embodiment can obtain the effects obtained from the configuration common to the eighth embodiment as in the eighth embodiment.

As described above, in the present embodiment, the outflow channel 441 is configured so that the channel cross-sectional area of the outflow channel 441 becomes larger toward the downstream side of the working fluid flow. This is the same as the first embodiment described above. The present embodiment can obtain the effects obtained from the configuration common to the first embodiment as in the first embodiment.

Tenth Embodiment

Next, a tenth embodiment will be described. In the present embodiment, differences from the ninth embodiment will be mainly described.

Figure 18:
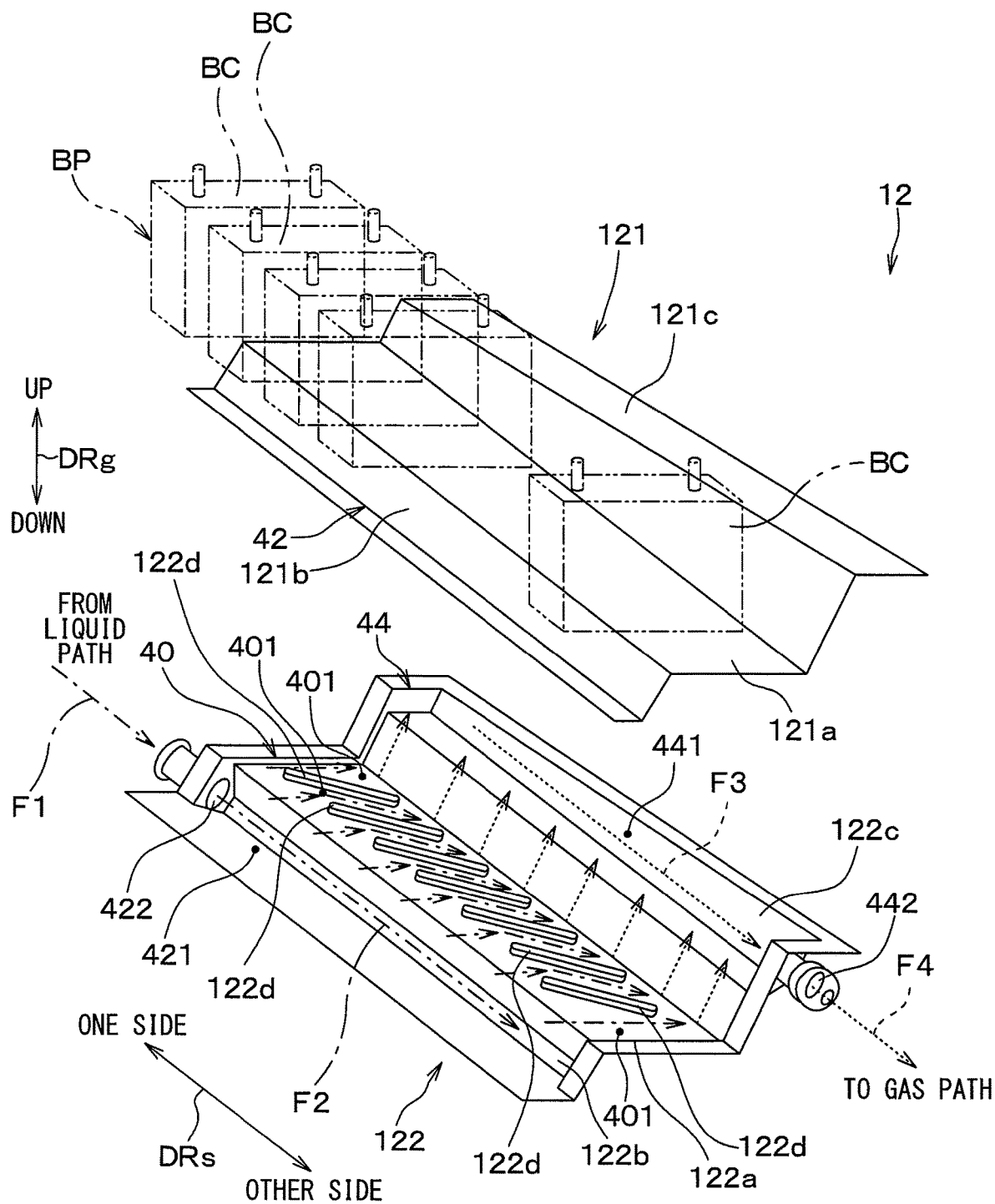
FIG. 18 is an exploded perspective view showing a schematic configuration of an evaporator according to a tenth embodiment, which corresponds to FIG. 17 in the ninth embodiment.

As shown in FIG. 18, each of multiple protrusion portions 122*d* according to the present embodiment extends in a direction oblique to a cell stacking direction DRs. Therefore, according to the present embodiment, each of the multiple evaporation channels 401 also extends in a direction oblique to the cell stacking direction DRs. Except for the above configuration, the present embodiment is the same as the ninth embodiment. The present embodiment can obtain the effects obtained from a configuration common to the ninth embodiment as in the ninth embodiment.

As described above, in the present embodiment, each of the multiple evaporation channels 401 extends in a direction oblique to the cell stacking direction DRs. This is the same as the fifth embodiment described above. Therefore, in the present embodiment, the effects obtained from the configuration common to the above-mentioned fifth embodiment can be obtained in the same manner as in the fifth embodiment.

Eleventh Embodiment

Next, an eleventh embodiment will be described. In the present embodiment, differences from the ninth embodiment will be mainly described.

Figure 19:
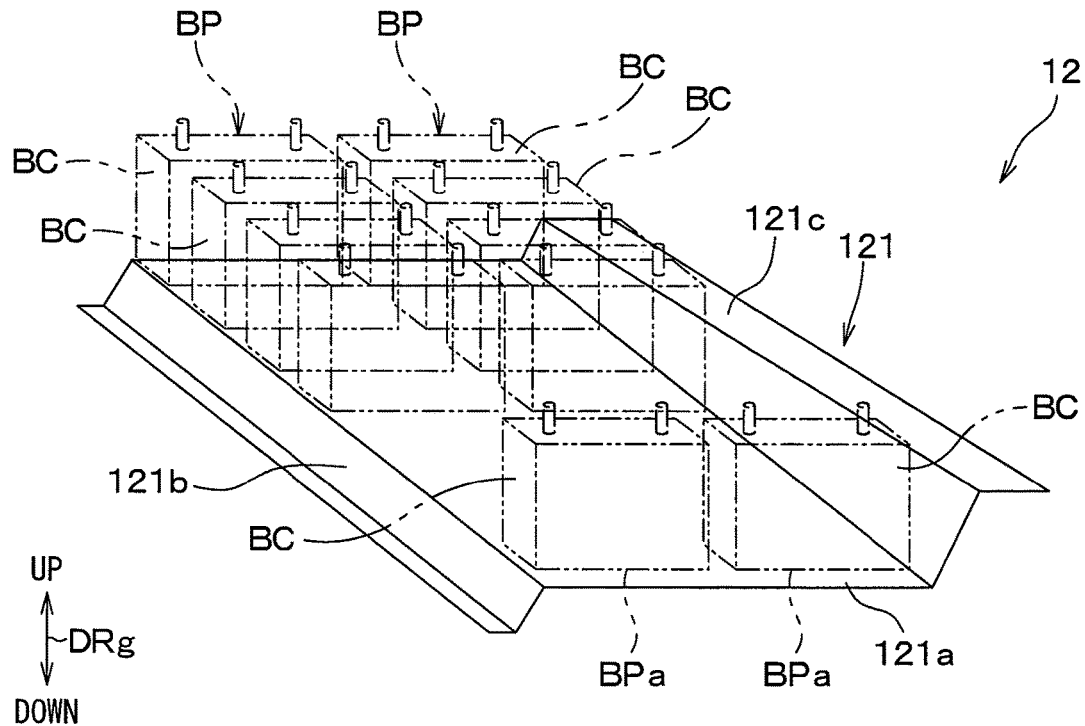
FIG. 19 is an exploded perspective view showing a schematic configuration of an evaporator according to an eleventh embodiment, which corresponds to FIG. 17 in the ninth embodiment.
Figure 19:
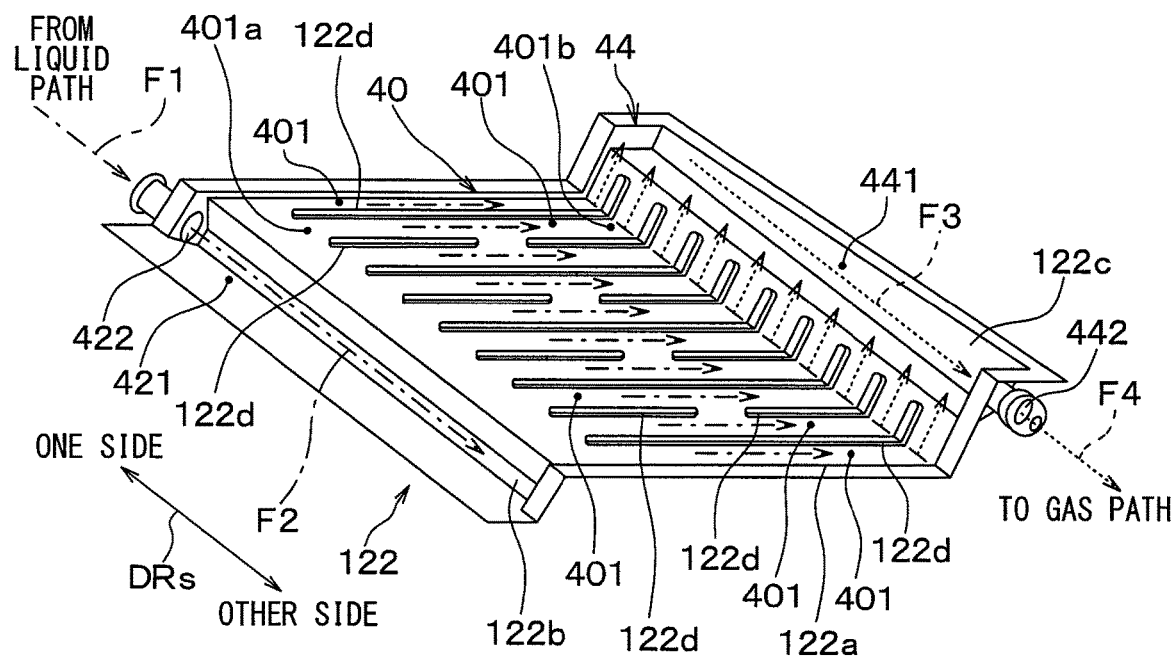

As shown in FIG. 19, in the present embodiment, a shape of evaporation channels 401 and a shape of protrusion portions 122*d* of a second plate member 122 are different from those of the ninth embodiment. Further, the present embodiment is different from the ninth embodiment in that multiple assembled batteries BP are provided.

Specifically, according to the present embodiment, two assembled batteries BP are provided. In the two assembled batteries BP, multiple battery cells BC are stacked in a cell stacking direction DRs in the same direction. A fluid evaporation portion 40 is connected to a battery lower surface BPa in a thermally conductive manner in any of the two assembled batteries BP.

Some protrusion portions 122d out of all protrusion portions 122d of a second plate member 122 are divided between upstream ends 401a and downstream ends 401b of evaporation channels 401. The divided protrusion portions 122d and the other protrusion portions 122d, that is, the protrusion portions 122d continuously extending from the upstream ends 401a to the downstream ends 401b of the evaporation channels 401 are alternately disposed in a cell stacking direction DRs across the evaporation channels 401.

One divided portions and the other divided portions of the divided protrusion portions 122d are aligned in series with a mutual interval in an extending direction of the evaporation channels 401. For that reason, the two evaporation channels 401 adjacent to each other across the divided protrusion portion 122d communicate with each other through the mutual space between the divided portion on one side and the divided portion on the other side of the divided protrusion portion 122d. In short, one evaporation channel 401 of the two adjacent evaporation channels 401 communicates with the other evaporation channel 401 in the middle of the one evaporation channel 401.

Except for what has been described above, the present embodiment is the same as the ninth embodiment. The present embodiment can obtain the effects obtained from a configuration common to the ninth embodiment as in the ninth embodiment.

In addition, according to the present embodiment, the second plate member 122 includes the protrusion portion 122d divided between the upstream end 401a and the downstream end 401b of the evaporation channel 401. This is the same as the fifth embodiment described above. Therefore, in the present embodiment, the effects obtained from the configuration common to the above-mentioned fifth embodiment can be obtained in the same manner as in the fifth embodiment.

Although the present embodiment is a modification based on the ninth embodiment, the present embodiment can be combined with any of the above-described second to fourth, sixth to eighth, and tenth embodiments.

Twelfth Embodiment

Next, a twelfth embodiment will be described. In the present embodiment, differences from the ninth embodiment will be mainly described.

Figure 20:
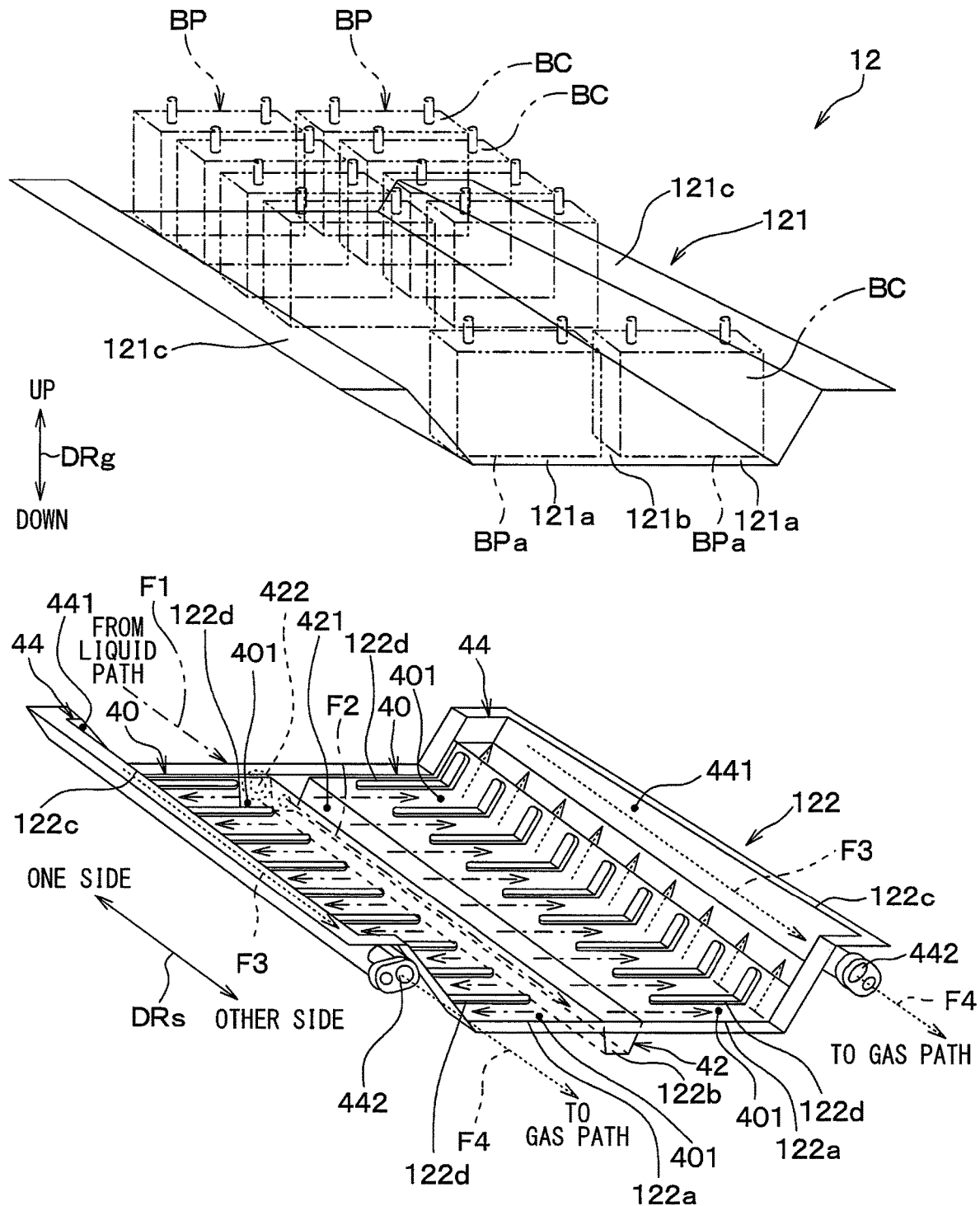
FIG. 20 is an exploded perspective view showing a schematic configuration of an evaporator according to a twelfth embodiment, which corresponds to FIG. 17 in the ninth embodiment.

As shown in FIG. 20, in the present embodiment, two assembled batteries BP, two fluid evaporation portions 40, and two fluid outflow portions 44 are provided. In this respect, the present embodiment is different from the ninth embodiment.

Specifically, in the present embodiment, multiple battery cells BC included in each of the two assembled batteries BP are stacked in a cell stacking direction DRs in the same direction. One of the two fluid evaporation portions 40 is connected to a battery lower surface BPa of one of the two assembled batteries BP so as to be thermally conductive. Similarly, the other fluid evaporation portion 40 is connected to the battery lower surface BPa of the other assembled battery BP so as to be thermally conductive.

An evaporator 12 of the present embodiment is formed symmetrically about a liquid supply portion 42. For example, in the evaporator 12 of the present embodiment, the fluid evaporation portion 40 and the fluid outflow portion 44 included on one side with the liquid supply portion 42 as a boundary are configured in the same manner as the fluid evaporation portion 40 and the fluid outflow portion 44 of the ninth embodiment. In the evaporator 12 of the present embodiment, the fluid evaporation portion 40 and the fluid outflow portion 44 included on the other side with the liquid supply portion 42 as the boundary are also configured in the same manner as the fluid evaporation portion 40 and the fluid outflow portion 44 of the ninth embodiment.

Accordingly, the liquid supply portion 42 is disposed between the one fluid evaporation portion 40 and the other fluid evaporation portion 40, and is connected to each of the fluid evaporation portions 40. In other words, the liquid supply portion 42 distributes and supplies the liquid-phase working fluid flowing into the supply channel 421 to each of the multiple evaporation channels 401 included in one fluid evaporation portion 40, and simultaneously distributes and supplies the liquid-phase working fluid to each of the multiple evaporation channels 401 included in the other fluid evaporation portion 40.

One fluid outflow portion 44 of the two fluid outflow portions 44 is connected to one fluid evaporation portion 40 at a side opposite to the liquid supply portion 42 side. Similarly, the other fluid outflow portion 44 is connected to the other fluid evaporation portion 40 on the side opposite to the liquid supply portion 42 side. A fluid outlet 442 is provided in each of the one fluid outflow portion 44 and the other fluid outflow portion 44. Each fluid outlet 442 is connected to a gas path 16.

Except for what has been described above, the present embodiment is the same as the ninth embodiment. The present embodiment can obtain the effects obtained from a configuration common to the ninth embodiment as in the ninth embodiment.

Although the present embodiment is a modification based on the ninth embodiment, the present embodiment can be combined with any of the above-mentioned second to eighth, tenth, and eleventh embodiments.

Thirteenth Embodiment

Next, a thirteenth embodiment will be described. In the present embodiment, differences from the first embodiment will be mainly described.

Figure 21:
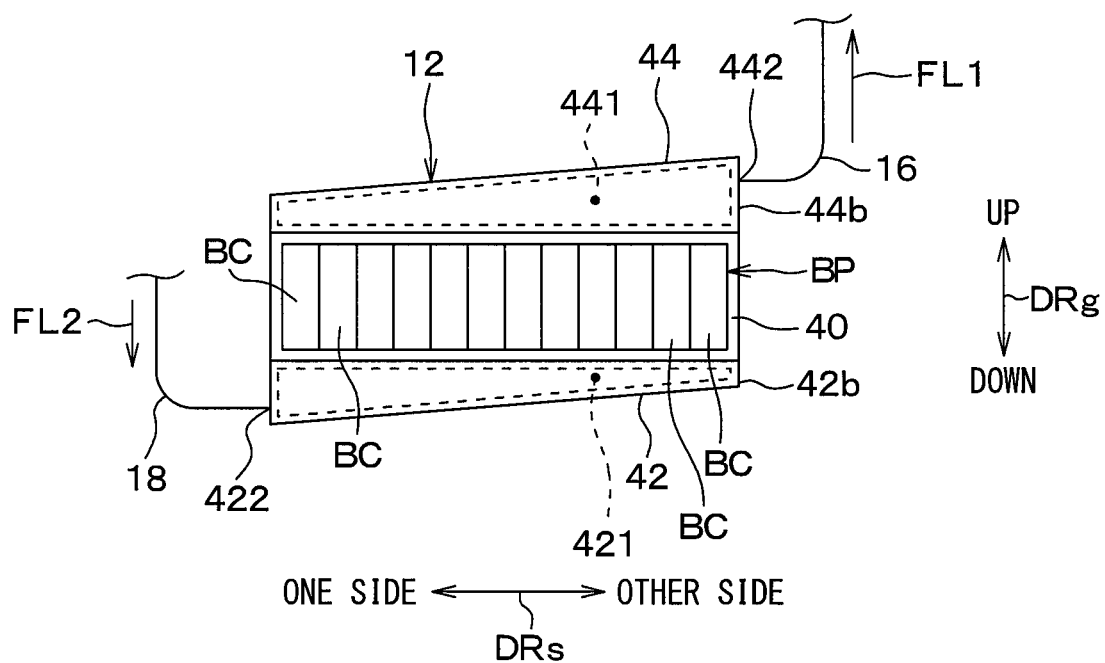
FIG. 21 is a schematic diagram showing a schematic configuration of an evaporator according to a thirteenth embodiment, which corresponds to a diagram in which the evaporator is extracted from FIG. 1.

As shown in FIG. 21, a supply channel 421 of the present embodiment is provided so that a channel cross-sectional area of the supply channel 421 becomes smaller toward a downstream side of a working fluid flow. Except for the above configuration, the present embodiment is the same as the first embodiment. The present embodiment can obtain the same effects as those of the first embodiment, which are obtained from the same configuration as that of the first embodiment.

As described above, in the present embodiment, the supply channel 421 is provided so that the channel cross-sectional area of the supply channel 421 becomes smaller toward the downstream side of the working fluid flow. This makes it possible to reduce a pressure loss of the working fluid flowing through the supply channel 421 while reducing the amount of the working fluid contained in a working fluid circuit 10.

Although the present embodiment is a modification based on the first embodiment, the present embodiment can be combined with any of the above-mentioned second to twelve embodiments.

Fourteenth Embodiment

Next, a fourteenth embodiment will be described. In the present embodiment, differences from the first embodiment will be mainly described.

Figure 22:
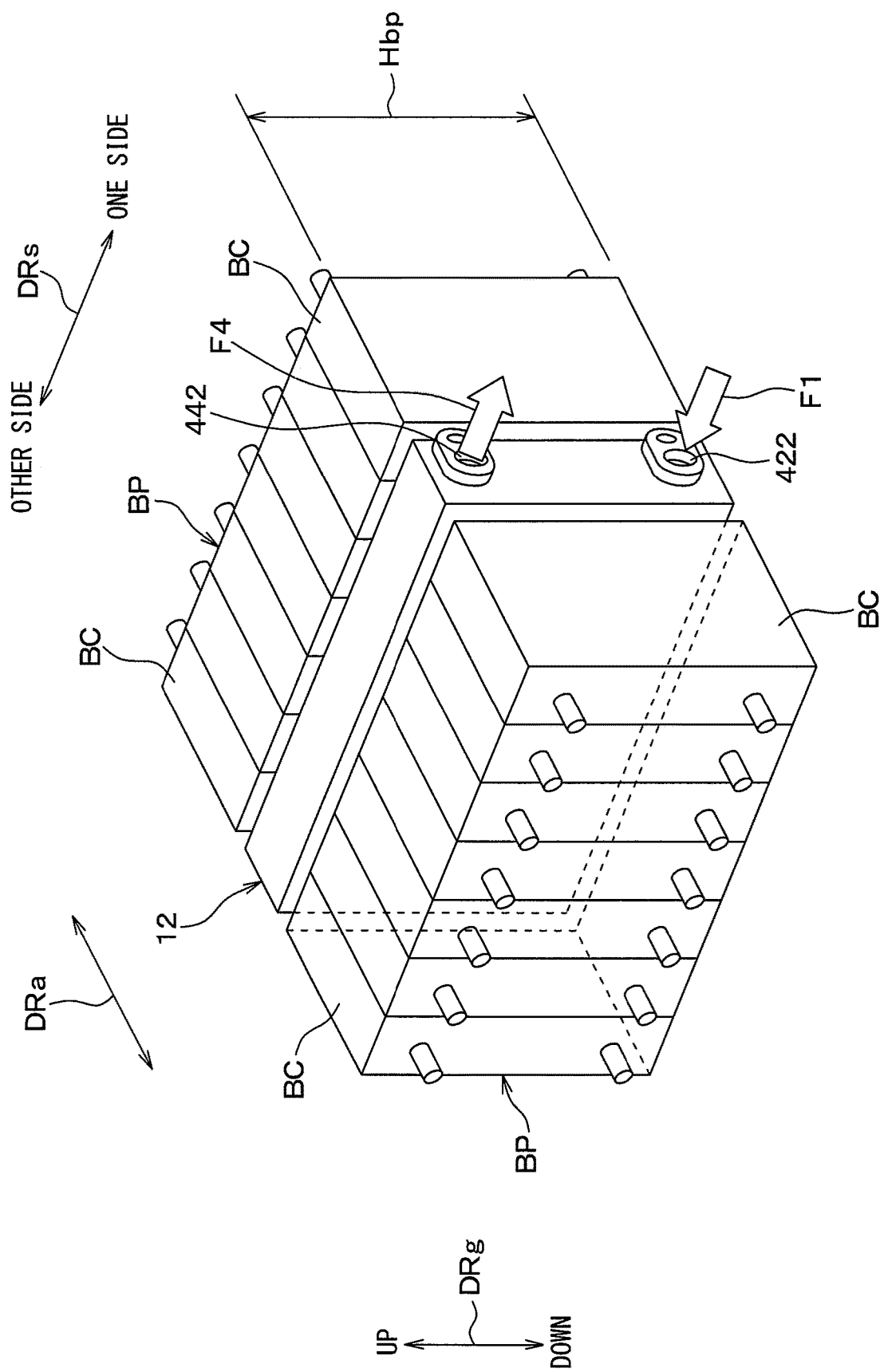
FIG. 22 is a perspective view showing a placement of an evaporator and an assembled battery according to a fourteenth embodiment.
Figure 23:
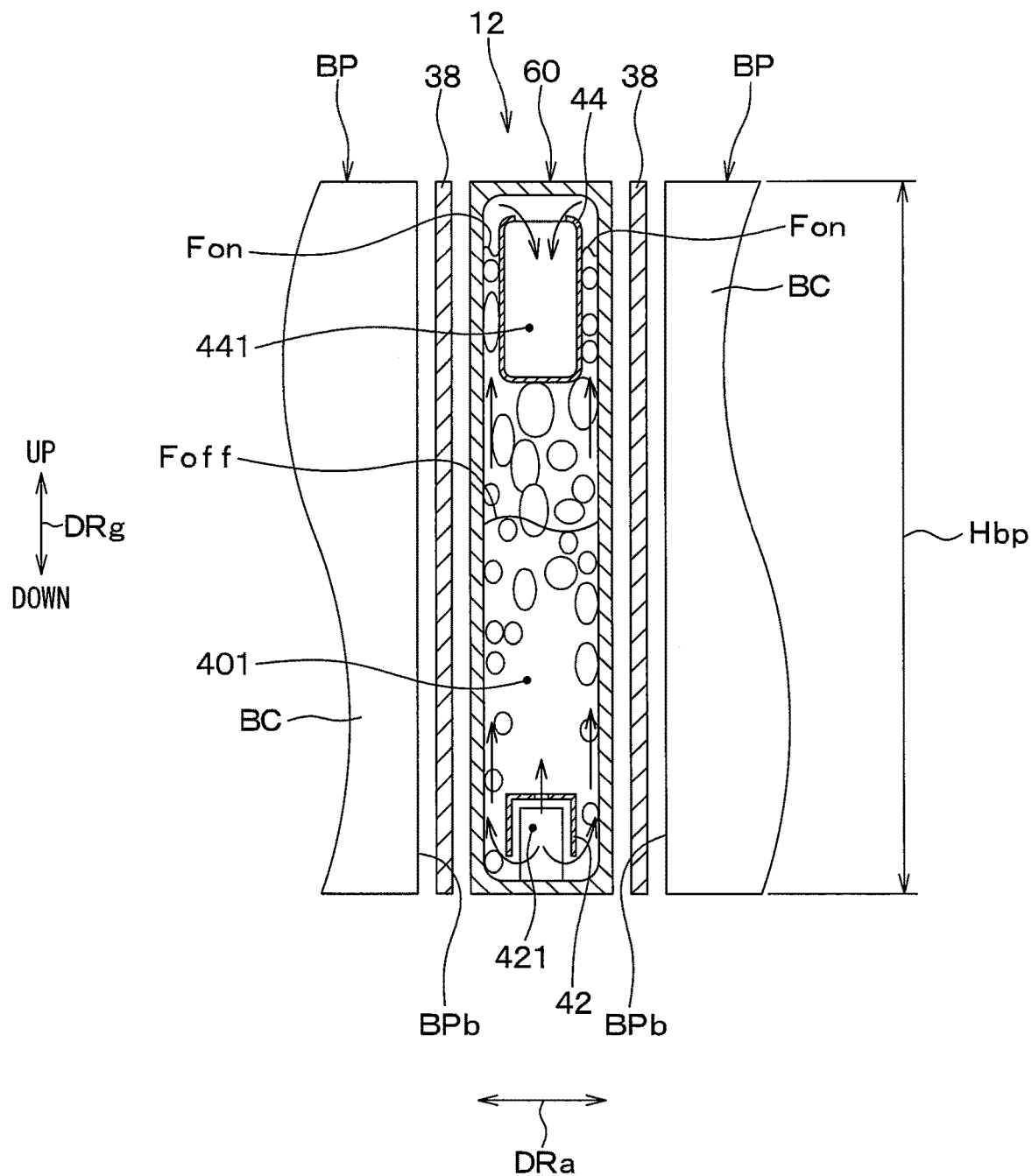
FIG. 23 is a cross-sectional view schematically showing a cross section taken along a line II-II of FIG. 1 in the fourteenth embodiment, and corresponds to FIG. 2 in the first embodiment.

As shown in FIGS. 22 and 23, in the present embodiment, a fluid evaporation portion 40 is connected to a battery lateral surface BPb of an assembled battery BP so as to be thermally conductive similarly to the first embodiment. Specifically, the fluid evaporation portion 40 is connected to the battery lateral surface BPb through a heat conduction material 38. The liquid supply portion 42 is disposed apart from both the assembled battery BP and the heat conduction material 38.

However, in the present embodiment, unlike the first embodiment, a supply channel 421 and an outflow channel 441 are disposed on a front surface of the battery lateral surface BPb. A part of the evaporation channels 401 is interposed between the liquid supply portion 42 and the assembled battery BP, and between a fluid outflow portion 44 and the assembled battery BP. This makes it possible to dispose the liquid supply portion 42 and the fluid outflow portion 44 within a height range Hbp occupied by the assembled battery BP in a vehicle vertical direction DRg, and to accommodate an evaporator 12 within the height range Hbp.

For example, in the present embodiment, the upper ends of the two assembled batteries BP and an upper end of the evaporator 12 are aligned with each other in the vehicle vertical direction DRg, and lower ends of the two assembled batteries BP and a lower end of the evaporator 12 are also aligned with each other in the vehicle vertical direction DRg.

The evaporator 12 of the present embodiment cools the two assembled batteries BP simultaneously. In other words, in the evaporator 12, the fluid evaporation portion 40 is connected to one of the two assembled batteries BP so as to be thermally conductive on one surface side of the fluid evaporation portion 40. At the same time, the fluid evaporation portion 40 is connected to the other of the two assembled batteries BP so as to be thermally conductive on the other surface side of the fluid evaporation portion 40.

In FIG. 22, a heat conduction material 38 is not shown. FIG. 23 also shows a stopping liquid surface Foff of a working fluid when the working fluid in the evaporation channel 401 is not boiling, and a cooling liquid surface Fon of the working fluid when the working fluid in the evaporation channel 401 is boiling. As can be seen by comparing those liquid surfaces Foff and Fon with each other, the liquid level of the working fluid rises as the working fluid absorbs heat from the assembled battery BP and boils.

Figure 24:
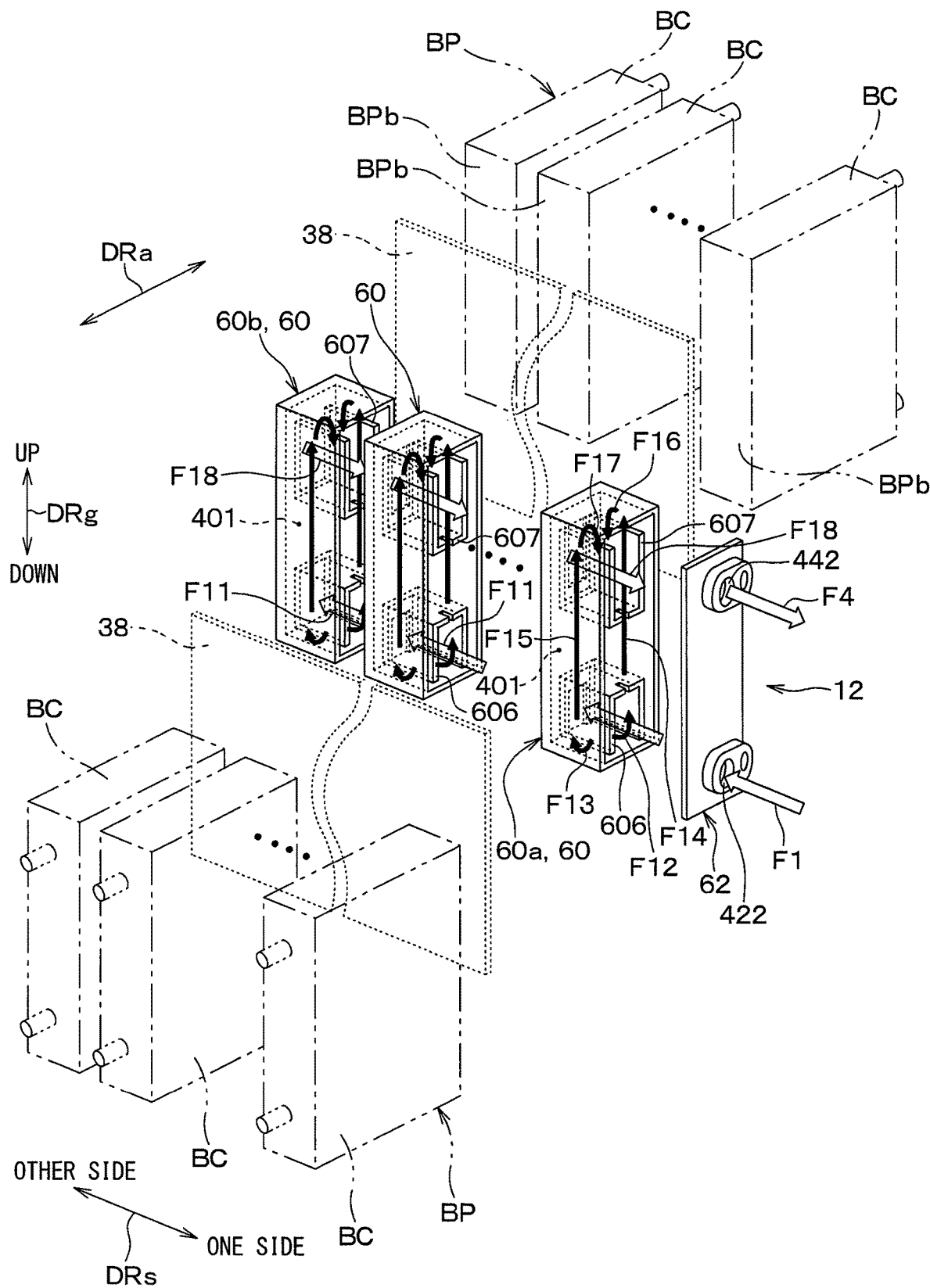
FIG. 24 is an exploded perspective view showing a schematic configuration of an evaporator in the fourteenth embodiment, and corresponds to FIG. 3 in the first embodiment.

Specifically, as shown in FIGS. 23 and 24, the evaporator 12 includes multiple stacking units 60 stacked in the cell stacking direction DRs, and an end plate 62. Each of the stacking units 60 and the end plate 62 is made of a metal such as an aluminum alloy having a high thermal conductivity. In FIG. 24, battery cells BC are illustrated by dashed-two dotted lines and the heat conduction material 38 is illustrated by a dashed line for easy viewing. Some of the multiple battery cells BC included in the assembled battery BP and some of the multiple stacking units 60 are omitted. This is the same as FIG. 28, FIG. 31, and FIG. 36 to be described later.

Figure 25:
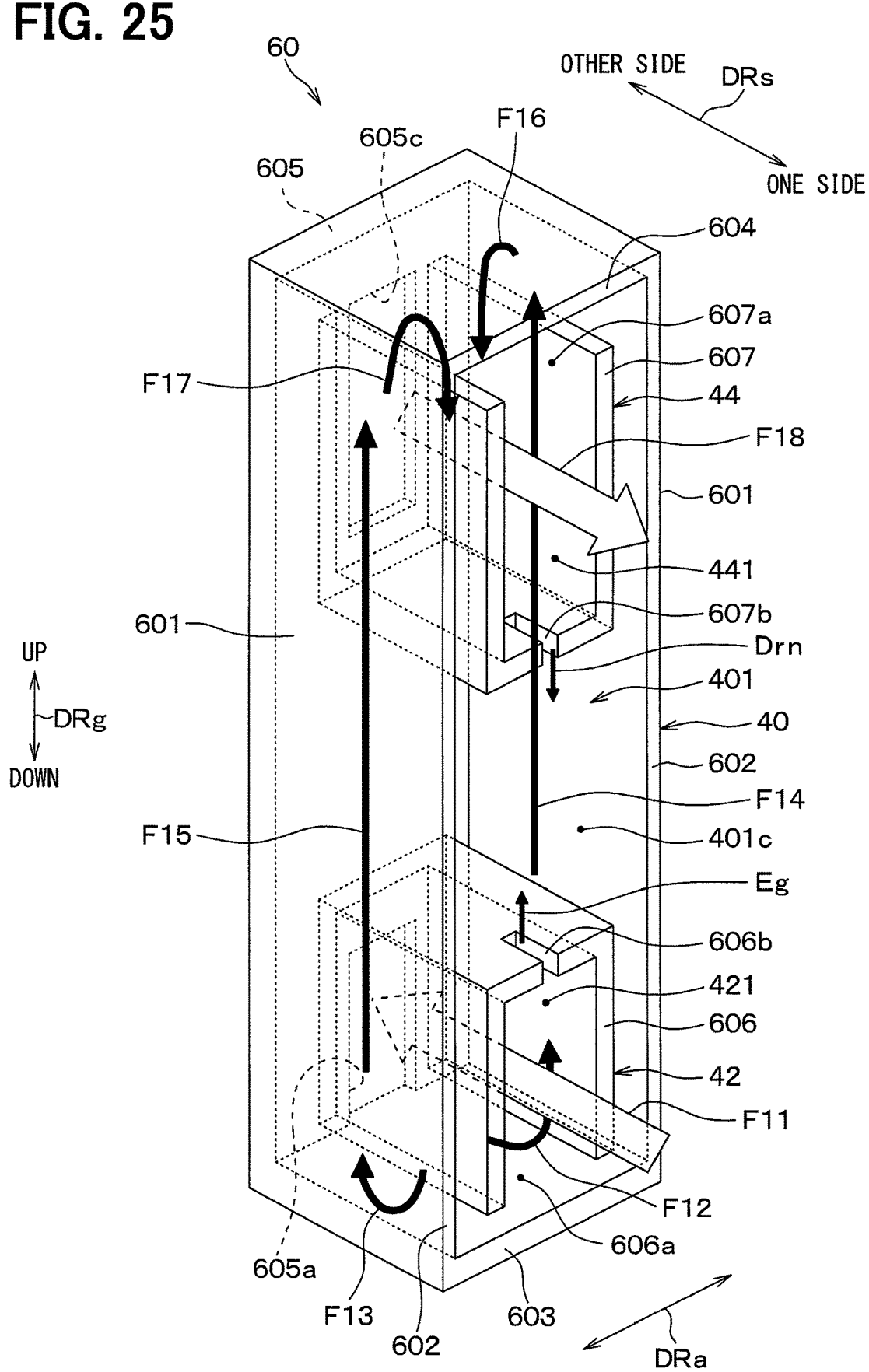
FIG. 25 is a perspective view showing an excerpt of one of multiple stacking units configuring the evaporator of FIG. 24, that is, a perspective view showing the stacking unit as a single unit.
Figure 26:
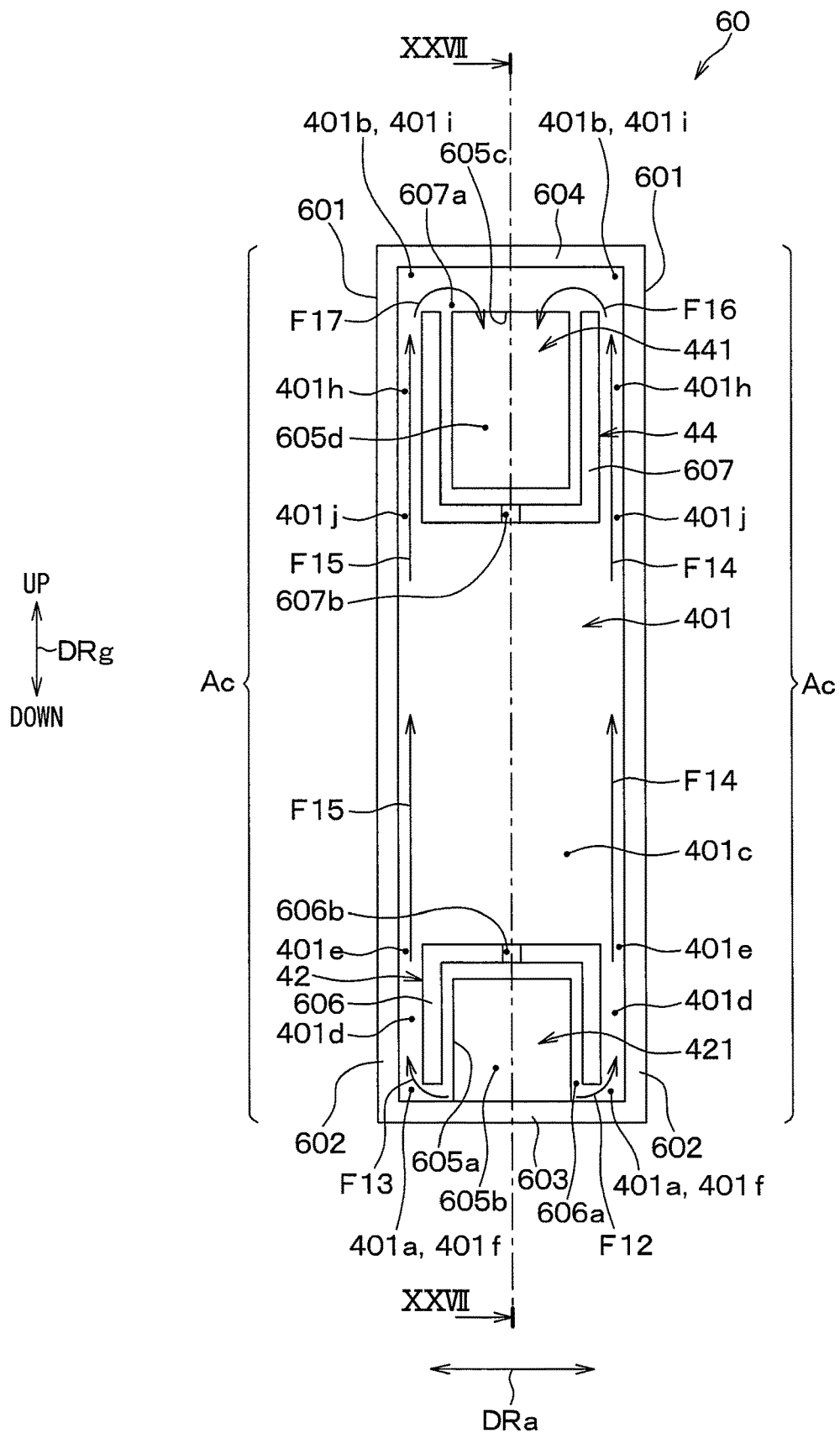
FIG. 26 is a front view of the stacking units of FIG. 25 as viewed from one side in a cell stacking direction.

As shown in FIGS. 25 and 26, the stacking unit 60 (in other words, the block-shaped stacking block 60) has a hollow rectangular parallelepiped shape formed so as to extend in the vehicle vertical direction DRg. The stacking unit 60 has unit lateral surfaces 601 extending along the cell stacking direction DRs and the vehicle vertical direction DRg. The unit lateral surfaces 601 are parts of an outer surface of the stacking unit 60 and are formed on one of the two assembled batteries BP and the other assembled battery BP (that is, both sides of the stacking unit 60).

In the present embodiment, the unit lateral surfaces 601 are planar, and a normal direction DRa of the unit lateral surfaces 601 is a direction intersecting with the cell stacking direction DRs and the vehicle vertical direction DRg, strictly speaking, a direction orthogonal to the cell stacking direction DRs and the vehicle vertical direction DRg. The normal direction DRa of the unit lateral surfaces 601 is referred to as a side normal direction DRa.

The stacking unit 60 is formed to have a symmetrical shape in the side normal direction DRa. The number of stacks of the stacking units 60 may be the same as or different from the number of stacks of the battery cells BC included in the assembled battery BP. In the cell stacking direction DRs, the stacking units 60 may be provided in a one-to-one correspondence for each battery cell BC, or may be provided in a one-to-one correspondence for each section of the length of the assembled battery BP.

As shown in FIGS. 24 and 26, the unit lateral surfaces 601 face the battery lateral surface BPb of the assembled battery BP. At the same time, the unit lateral surfaces 601 are in contact with the heat conduction material 38, and are connected to the battery lateral surface BPb through the heat conduction material 38 so as to be thermally conductive.

Figure 27:
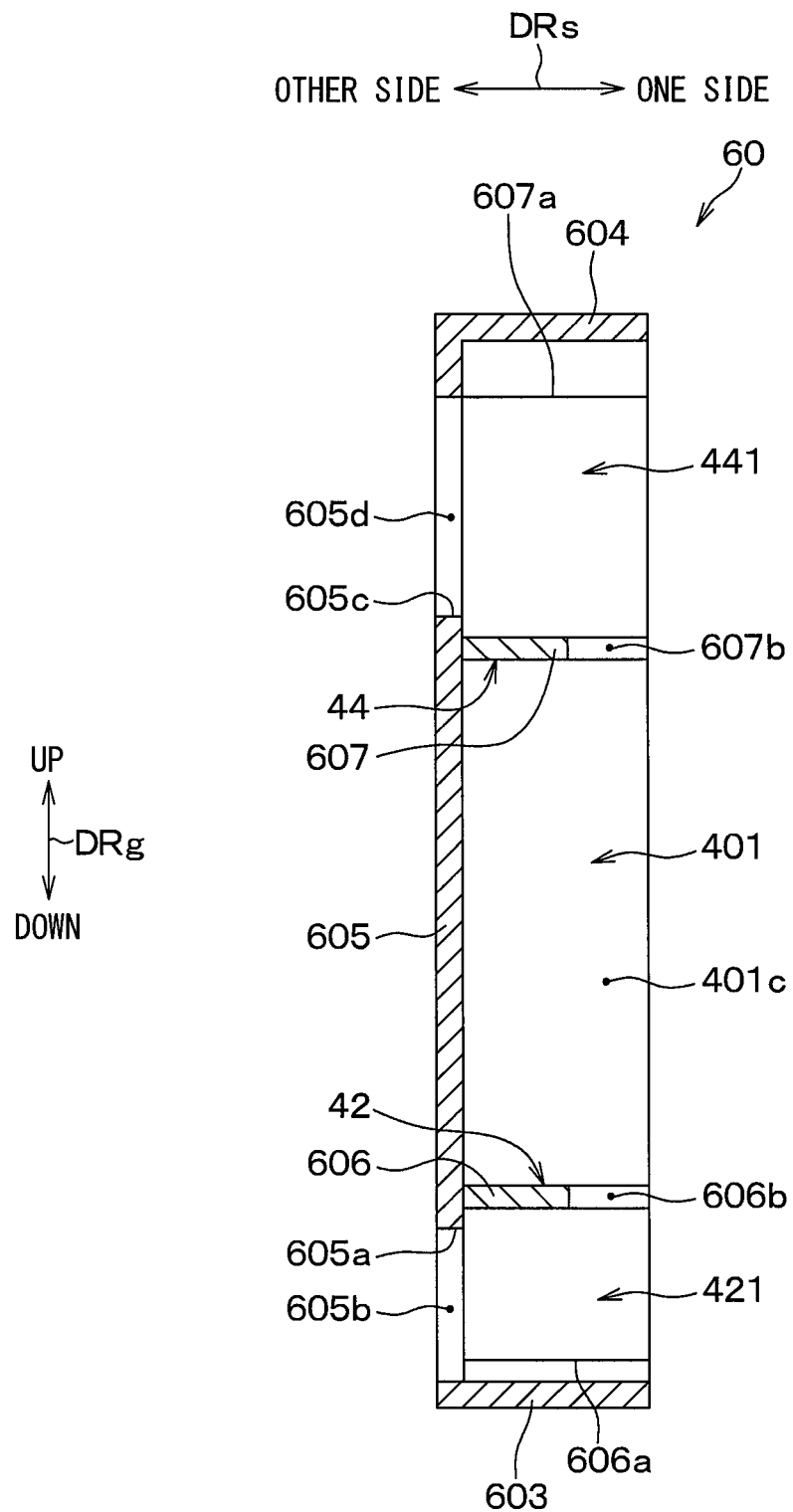
FIG. 27 is a cross-sectional view showing a cross section taken along a line XXVII-XXVII of FIG. 26.

As shown in FIGS. 26 and 27, since the stacking unit 60 is hollow in shape, the stacking unit 60 has a pair of side walls 602, a lower wall 603, an upper wall 604, and an evaporation channel partition wall 605 as outer walls of the stacking unit 60. The pair of side walls 602 are respectively provided on one side and the other side of the stacking unit 60 in the side normal direction DRa. The unit lateral surfaces 601 are formed on the side walls 602 of the stacking unit 60.

The lower wall 603 is provided at a lower end of the stacking unit 60, and the upper wall 604 is provided at an upper end of the stacking unit 60.

As a single unit of the stacking unit 60, one side of the stacking unit 60 is opened in the cell stacking direction DRs, and the other side of the stacking unit 60 is covered with an evaporation channel partition wall 605. As shown in FIGS. 24 and 27, the evaporation channel partition wall 605 is a partition wall that separates the multiple evaporation channels 401 from one another in the cell stacking direction DRs. The open one side of the stacking unit 60 is covered by the evaporation channel partition wall 605 of the stacking unit 60 stacked on one side by stacking the stacking unit 60 on the one side.

For example, it is assumed that a first stacking unit 60 which is a certain stacking unit 60 among the multiple stacking units 60 and a second stacking unit 60 which is adjacent to the first stacking unit 60 on one side in the cell stacking direction DRs are provided. In that case, the evaporation channel partition wall 605 included in the second stacking unit 60 separates the evaporation channels 401 defined in the first and second stacking units 60 from each other in the cell stacking direction DRs.

As shown in FIGS. 26 and 27, the evaporation channel partition wall 605 has a first through hole forming portion 605a forming a first wall through hole 605b and a second through hole forming portion 605c forming a second wall through hole 605d. Each of the first wall through hole 605b and the second wall through hole 605d is a through hole that penetrates through the evaporation channel partition wall 605 in the cell stacking direction DRs. In addition, the first through hole forming portion 605a is disposed to a lower side of the evaporation channel partition wall 605, and the second through hole forming portion 605c is disposed to an upper side of the evaporation channel partition wall 605.

The stacking unit 60 has a wall-shaped supply side wall portion 606 configuring a part of the liquid supply portion 42 and a wall-shaped outflow side wall portion 607 configuring a part of the fluid outflow portion 44. The supply side wall portion 606 and the outflow side wall portion 607 are fixed to the evaporation channel partition wall 605, and are accommodated in an internal space of the stacking unit 60 surrounded by the outer walls 602, 603, 604, and 605 of the stacking unit 60.

The supply side wall portion 606 has a wall shape protruding from the evaporation channel partition wall 605 toward one side of the cell stacking direction DRs (that is, the internal space side of the stacking unit 60). The supply side wall portion 606 is a supply-side partition portion configured as a partition wall for separating between an evaporation channel 401 and a supply channel 421 in the stacking unit 60.

In particular, the supply side wall portion 606 is disposed downwardly within the stacking unit 60. The supply side wall portion 606 is formed of a wall having a U-shaped cross-sectional shape in which a groove opened downward is defined. The supply side wall portion 606 is formed so as to cover an upper portion of the first wall through hole 605b and both sides of the first wall through hole 605b in the side normal direction DRa, on one side of the evaporation channel partition wall 605 in the cell stacking direction DRs. n the other hand, an open lower portion of the supply side wall portion 606 is a supply side opening 606a. The supply side opening 606a is located below a center of the first wall through hole 605b.

The outflow side wall portion 607 has a wall shape protruding from the evaporation channel partition wall 605 toward one side of the cell stacking direction DRs (that is, the internal space side of the stacking unit 60). The outflow side wall portion 607 is an outflow-side partition portion configured as a partition wall for separating between the evaporation channel 401 and the outflow channel 441 in the stacking unit 60.

In detail, the outflow side wall portion 607 is disposed upward in the stacking unit 60. The outflow side wall portion 607 is formed of a wall having a U-shaped cross-sectional shape in which a groove opened upward is defined. The outflow side wall portion 607 is formed so as to cover a lower portion of the second wall through hole 605d and both sides of the second wall through hole 605d in the side normal direction DRa, on one side of the evaporation channel partition wall 605 in the cell stacking direction DRs. On the other hand, an open upper portion of the outflow side wall portion 607 defines an outflow side opening 607a. The outflow side opening 607a is positioned above a center of the second wall through hole 605d.

Further, the multiple stacking units 60 are stacked in the cell stacking direction DRs and joined to one another, thereby configuring the fluid evaporation portion 40, the liquid supply portion 42, and the fluid outflow portion 44. In other words, each of the stacking units 60 has a part of the fluid evaporation portion 40, a part of the liquid supply portion 42, and a part of the fluid outflow portion 44.

More specifically, in each stacking unit 60, a part of the fluid evaporation portion 40 included in the stacking unit 60 corresponds to the side wall 602, the lower wall 603, the upper wall 604, and a part of the evaporation channel partition wall 605 facing the evaporation channel 401. The first through hole forming portion 605a and the supply side wall portion 606 correspond to a part of the liquid supply portion 42 included in the stacking unit 60. The second through hole forming portion 605c and the outflow side wall portion 607 correspond to a part of the fluid outflow portion 44 of the stacking unit 60.

In the joining of the stacking units 60, in detail, one side edges of the pair of side walls 602, the lower wall 603, the upper wall 604, the supply side wall portion 606, and the outflow side wall portion 607 in the cell stacking direction DRs in one stacking unit 60 are joined to the evaporation channel partition wall 605 of another stacking unit 60 adjacent to the one side of the one stacking unit 60 and serving as a joining partner.

As shown in FIGS. 24 to 26, the end plate 62 is formed in a plate-shape having the cell stacking direction DRs as a thickness direction. The end plate 62 is disposed further on one side of the stacking unit 60, that is, a one-end stacking unit 60a, which is located at one end of the multiple stacking units 60 in the cell stacking direction DRs. The end plate 62 is joined to the one-end stacking unit 60a so as to cover one side of the one-end stacking unit 60a in the cell stacking direction DRs. More specifically, one side edges of the pair of side walls 602, the lower wall 603, the upper wall 604, the supply side wall portion 606, and the outflow side wall portion 607 in the one-end stacking unit 60a in the cell stacking direction DRs are joined to the end plate 62. The stacking units 60 are joined to one another and the stacking units 60 and the end plate 62 are joined to each other by a joining method such as brazing, for example, to form an airtight joining.

The end plate 62 is also formed with a fluid inlet 422 and a fluid outlet 442 disposed above the fluid inlet 422. The fluid inlet 422 and the multiple first wall through holes 605b are provided on a common axis line extending in the cell stacking direction DRs at a position closer to a lower side of the evaporator 12. The fluid outlet 442 and the multiple second wall through holes 605d are provided on a common axis line extending in the cell stacking direction DRs at a position closer to an upper side of the evaporator 12.

Accordingly, the multiple stacking units 60 are stacked on one another in the cell laminating direction DRs so that the supply channel 421 and the outflow channel 441 each extend linearly along the cell stacking direction DRs. In other words, the supply channel 421 includes multiple first wall through holes 605b and passes through the evaporation channel partition wall 605, and extends in the cell stacking direction DRs. The outflow channel 441 includes multiple second wall through holes 605d and penetrates through the evaporation channel partition wall 605, and extends in the cell stacking direction DRs.

The through holes 605b and 605d are not provided in the evaporation channel partition wall 605 of the stacking unit 60 located at the other end of the multiple stacking units 60 in the cell stacking direction DRs, that is, the other end stacking unit 60b.

As shown in FIGS. 25 to 27, in the present embodiment, one evaporation channel 401 is provided for each stacking unit 60. In other words, one evaporation channel 401 is provided in each of the multiple stacking units 60.

More specifically, in each of the multiple stacking units 60, the evaporation channel 401 provided in the stacking unit 60 has an evaporation intermediate channel 401c, a pair of upstream side channels 401d, and a pair of downstream side channels 401h. Each of the evaporation intermediate channel 401c, the pair of upstream side channels 401d, and the pair of downstream side channels 401h is a channel in which the working fluid flows from a lower side to an upper side. The pair of downstream side channels 401h are provided on a downstream side of the evaporation intermediate channel 401c along the working fluid flow, and the evaporation intermediate channel 401c is provided on the downstream side of the pair of upstream side channels 401d along the working fluid flow.

The evaporation channel 401 extends over substantially the entire length of the stacking unit 60 in the vehicle vertical direction DRg. For that reason, the entire unit lateral surface 601 indicated as a region Ac in FIG. 26 functions as a cooling surface of the fluid evaporation portion 40 that cools the assembled battery BP.

The evaporation intermediate channel 401c is disposed between the supply side wall portion 606 configuring a part of the liquid supply portion 42 and the outflow side wall portion 607 configuring a part of the fluid outflow portion 44 in the vehicle vertical direction DRg in the stacking unit 60. The evaporation intermediate channel 401c is connected to the outflow channel 441 through the pair of downstream side channels 401 h, and is connected to the supply channel 421 through the pair of upstream side channels 401d.

Each of the pair of upstream side channels 401d is provided as a supply-side interposed channel disposed so as to be interposed between the battery lateral surface BPb and the supply channel 421. Each of the pair of upstream side channels 401d is disposed below the evaporation intermediate channel 401c, and connects the evaporation intermediate channel 401c and the supply channel 421. Each of the pair of upstream side channels 401d has an upper end 401e connected to the evaporation intermediate channel 401c and a lower end 401f as an upstream end 401a of the evaporation channel 401. In the upstream side channel 401d, the working fluid flows from the lower end 401f to the upper end 401e. In other words, the upper end 401e of the upstream side channel 401d is provided on the downstream side of the lower end 401f along the working fluid flow.

The lower end 401f of the upstream side channel 401d is connected to a supply side opening 606a that opens downward from the supply channel 421. In short, the lower end 401f of the upstream side channel 401d is connected to a lower part of the supply channel 421.

One of the pair of upstream side channels 401d is disposed on one side of the supply side wall portion 606 in the side normal direction DRa. Therefore, one of the upstream side channels 401d is disposed so as to be interposed between the battery lateral surface BPb of one of the two assembled batteries BP and the supply channel 421 in the side normal direction DRa.

Similarly, the other upstream side channel 401d of the pair of upstream side channels 401d is disposed on the other side of the supply side wall portion 606 in the side normal direction DRa. Therefore, the other upstream side channel 401d is disposed so as to be interposed between the battery lateral surface BPb and the supply channel 421 of the other of the two assembled batteries BP in the side normal direction DRa.

As can be understood from the placement relationship described above, the supply side wall portion 606 is formed so as to separate between the pair of upstream side channels 401d and the supply channel 421, and to separate between the evaporation intermediate channel 401c and the supply channel 421.

Each of the pair of downstream side channels 401h is provided as an outflow-side interposed channel disposed so as to be interposed between the battery lateral surface BPb and the outflow channel 441. Each of the pair of downstream side channels 401h is disposed above the evaporation intermediate channel 401c, and connects the evaporation intermediate channel 401c and the outflow channel 441. Each of the pair of downstream side channels 401h has an upper end 401i as a downstream end 401b of the evaporation channel 401 and a lower end 401j connected to the evaporation intermediate channel 401c. In the downstream side channel 401h, the working fluid flows from the lower end 401j to the upper end 401i. In other words, the lower end 401j of the downstream side channel 401h is provided on the upstream side of the upper end 401i along the working fluid flow.

The upper end 401i of the downstream side channel 401h is connected to an outflow side opening 607a that opens upward from the outflow channel 441. In short, the upper end 401i of the downstream side channel 401h is connected to an upper part of the outflow channel 441.

One of the pair of downstream side channels 401h is disposed on one side of the outflow side wall portion 607 in the side normal direction DRa. Therefore, one of the downstream side channels 401h is disposed so as to be interposed between the battery lateral surface BPb of one of the two assembled batteries BP and the outflow channel 441 in the side normal direction DRa.

Similarly, the other downstream side channel 401h of the pair of downstream side channels 401h is disposed on the other side of the outflow side wall portion 607 in the side normal direction DRa. Therefore, the other downstream side channel 401h is disposed so as to be interposed between the battery lateral surface BPb of the other of the two assembled batteries BP and the outflow channel 441 in the side normal direction DRa.

As can be understood from the placement relationship, the outflow side wall portion 607 is formed so as to separate between the pair of downstream side channels 401h and the outflow channel 441, and to separate between the evaporation intermediate channel 401c and the outflow channel 441.

As shown in FIGS. 25 to 27, in each of the multiple stacking units 60, a partition communication hole 607b is provided in the outflow side wall portion 607. The partition communication hole 607b is provided as a through hole that penetrates downwardly through the wall-shaped outflow side wall portion 607 from the outflow channel 441, and therefore is disposed below the outflow channel 441. Since the partition communication hole 607b is provided in this manner, the outflow channel 441 is communicated with the evaporation intermediate channel 401c without passing through the downstream side channel 401h. In other words, the partition communication hole 607b is connected to the evaporation intermediate channel 401c in parallel with the downstream side channel 401h.

When the liquid-phase working fluid is ejected from the downstream side channel 401h and flows into the outflow channel 441 in the outflow side wall portion 607, the partition communication hole 607b returns the inflow liquid-phase working fluid to the evaporation intermediate channel 401c as indicated by an arrow Drn in FIG. 25.

To achieve the above, the partition communication hole 607b is provided to have a size such that a flow of the working fluid is narrowed in the case of passing through the partition communication hole 607b than in the case of passing through each of the pair of downstream side channels 401h. In short, a channel cross-sectional area of the partition communication hole 607b as the channel of the working fluid is remarkably smaller than the channel cross-sectional area of each of the channels of the pair of downstream side channels 401h. As a result, most of the gas-liquid two-phase working fluid flowing upward from the evaporation intermediate channel 401c flows to the pair of downstream side channels 401h instead of the partition communication hole 607b.

The partition communication hole 607b is defined in a groove shape when the stacking unit 60 is viewed as a single unit. The outflow side wall portion 607 in which the partition communication hole 607b is provided is joined to the evaporation channel partition wall 605 of the stacking unit 60 adjacent in the cell stacking direction DRs, as a result of which the partition communication hole 607b has a complete hole shape. The partition communication hole 607b does not need to have a complete hole shape, and may have a groove shape.

In each of the multiple stacking units 60, a bubble discharge hole 606b for discharging bubbles generated in the supply channel 421 as indicated by an arrow Eg in FIG. 25 is defined in the supply side wall portion 606. The bubble discharge hole 606b is disposed above the supply channel 421 since the bubble discharge hole 606b is defined as a through hole that penetrates upwardly from the supply channel 421 through the wall-like supply side wall portion 606.

The bubble discharge hole 606b is provided so as to have a very small channel cross-sectional area that allows a flow of the gas-phase working fluid while preventing the flow of the liquid-phase working fluid. For that reason, the gas-phase working fluid in the supply channel 421 is biased upward in the supply channel 421, and is discharged to the evaporation channel 401 through the bubble discharge hole 606b. Most of the liquid-phase working fluid in the supply channel 421 flows from the supply side opening 606a to the pair of upstream side channels 401d.

The bubble discharge hole 606b is provided in a groove shape when the stacking unit 60 is viewed as a single unit. The supply side wall portion 606 in which the bubble discharge hole 606b is provided is joined to the evaporation channel partition wall 605 of the stacking unit 60 adjacent in the cell stacking direction DRs, as a result of which the bubble discharge hole 606b has a complete hole shape. The bubble discharge hole 606b does not need to have a complete hole shape, and may have a groove shape.

In the evaporator 12 configured as described above, the working fluid flows as indicated by arrows F1, F11, F12, F13, F14, F15, F16, F17, F18, and F4 shown in FIGS. 24 to 26.

Specifically, the liquid-phase working fluid from the liquid path 18 (refer to FIG. 1) flows from the fluid inlet 422 into the supply channel 421 as indicated by the arrow F1. The inflow working fluid flows from one side of the cell stacking direction DRs to the other side in the supply channel 421, as indicated by the arrow F11. The working fluid in the supply channel 421 flows from the supply side opening 606a to the pair of upstream side channels 401d in each stacking unit 60 as indicated by the arrows F12 and F13.

In the evaporation channel 401, the working fluid flows from the lower side to the upper side as indicated by the arrows F14 and F15, and is boiled by the heat of the two assembled batteries BP. More specifically, the working fluid removes the heat from each battery cell BC and evaporates while flowing through the pair of upstream side channels 401d, the evaporation intermediate channel 401c, and the pair of downstream side channels 401h in a stated order. For that reason, in each of the evaporation channels 401, the working fluid flows into the outflow channel 441 only in the gas phase or in the gas-liquid two-phase.

At that time, since the working fluid flows while evaporating in the pair of upstream side channels 401d, the pair of upstream side channels 401d functions as a heat insulating portion (in other words, a heat insulating layer) that insulates the heat between each of the two assembled batteries BP and the liquid supply portion 42. More specifically, the liquid phase or gas-liquid two-phase working fluid flowing in the upstream side channel 401d absorbs the heat from the two assembled batteries BP and evaporates, thereby insulating the heat between each of the two assembled batteries BP and the liquid supply portion 42. Further, the liquid supply portion 42 is separated from each of the two assembled batteries BP by a space occupied by the upstream side channel 401d so that the upstream side channel 401d insulates each of the two assembled batteries BP from the liquid supply portion 42.

As described above, since the liquid supply portion 42 is disposed so that the upstream side channel 401d as the heat insulating portion is interposed between the liquid supply portion 42 and the assembled battery BP, even in the present embodiment, as in the first embodiment, the liquid supply portion 42 is disposed at a position of being more insulated from the heat of the assembled battery BP than the fluid evaporation portion 40. The liquid-phase working fluid flowing in from the fluid inlet 422 is supplied to the upstream end 401a of the evaporation channel 401 provided in each of the stacking units 60 through the supply channel 421 without boiling and without becoming a bubble flow in a substantially liquid phase.

The amount of the working fluid sealed in the working fluid circuit 10 is set so that when the working fluid boils by heat from the assembled battery BP, the liquid level of the working fluid rises to the vicinity of an upper end of the outflow side wall portion 607 (for example, a cooling liquid surface Fon at the time of cooling in FIG. 23).

The working fluid flowing in the evaporation channel 401 as indicated by the arrows F14 and F15 flows into the outflow channel 441 from the outflow side opening 607a as indicated by the arrows F16 and F17. The working fluid flowing into the outflow channel 441 is separated into gas and liquid, and flows from the other side to one side in the cell stacking direction DRs in the outflow channel 441 as indicated by the arrow F18. At this time, the gas-liquid separated gas-phase working fluid flows upward in the outflow channel 441, and the liquid-phase working fluid flows downward in the outflow channel 441. For that reason, the fluid outlet 442 is connected to a position close to an upper side of the outflow channel 441 in order to preferentially flow out the gas-phase working fluid of the gas phase and the liquid phase.

The gas-phase working fluid flowing to one end in the cell stacking direction DRs in the outflow channel 441 flows out from the fluid outlet 442 to the gas path 16 (refer to FIG. 1) as indicated by the arrow F4.

Except for what has been described above, the present embodiment is the same as the first embodiment. The present embodiment can obtain the same effects as those of the first embodiment, which are obtained from the same configuration as that of the first embodiment.

According to the present embodiment, each of the multiple evaporation channels 401 has a pair of upstream side channels 401*d*. The pair of upstream side channels 401*d* are disposed so as to be interposed between the battery lateral surface BPb of the assembled battery BP and the supply channel 421. This makes it possible to insulate the assembled battery BP and the supply channel 421 from each other by the upstream side channel 401*d*. At the same time, the evaporation channel 401 can be extended between the assembled battery BP and the supply channel 421.

As a result, an area of the fluid evaporation portion 40 receiving the heat from the assembled battery BP can be prevented from being reduced due to the provision of the liquid supply portion 42 while limiting a height of the evaporator 12 in the vehicle vertical direction DRg. Specifically, the area of the fluid evaporation portion 40 receiving heat from the assembled battery BP is the area of the fluid evaporation portion 40 connected to the battery lateral surface BPb through the heat conduction material 38, and in FIG. 26, a size of the region Ac corresponds to the above area.

According to the present embodiment, each of the multiple evaporation channels 401 has a downstream side channel 401*h*. The downstream side channel 401*h* is disposed so as to be interposed between the battery lateral surface BPb of the assembled battery BP and the outflow channel 441. Accordingly, the evaporation channel 401 can be extended between the assembled battery BP and the outflow channel 441. As a result, the area of the fluid evaporation portion 40 receiving heat from the assembled battery BP can be prevented from being reduced due to the provision of the fluid outflow portion 44 while limiting the height of the evaporator 12 in the vehicle vertical direction DRg.

In the present embodiment, as shown in FIGS. 23 to 26, the supply channel 421 and the outflow channel 441 are provided while the height of the stacking unit 60 in the vehicle vertical direction DRg is used as the fluid evaporation portion 40. The height of the stacking unit 60 is aligned with the height of the assembled battery BP. For example, in the case of being mounted on the vehicle, the assembled battery BP and the evaporator 12 are often disposed under a floor or under a cargo compartment, and the evaporator 12 is downsized in the vehicle vertical direction DRg in this manner, thereby being capable of improving the mountability on the vehicle.

In the present embodiment, a part of the fluid evaporation portion 40 functions as a heat insulating layer that prevents a heat transfer between the liquid supply portion 42 and the assembled battery BP. For that reason, a temperature rise in the liquid supply portion 42 caused by the heat from the assembled battery BP can be reduced and the evaporation of the working fluid in the liquid supply portion 42 can be reduced, while ensuring a sufficient heat receiving area for the fluid evaporation portion 40 to receive the heat from the assembled battery BP. With a structure in which the heat receiving area of the fluid evaporation portion 40 is increased in this manner, the cooling capacity of the evaporator 12 can be enhanced in accordance with an increase in the heat receiving area. In addition, the temperature variation can be reduced in the temperature distribution of the assembled battery BP.

According to the present embodiment, the upstream side channel 401*d* includes a lower end 401*f* as an upstream end 401*a* of the evaporation channel 401 and an upper end 401*e* disposed at a downstream side of the lower end 401*f* in the working fluid flow. The lower end 401*f* of the upstream side channel 401*d* is connected to a lower part of the supply channel 421. This makes it possible to make the working fluid flow in the vehicle vertical direction DRg as long as possible while allowing the working fluid to absorb the heat from the assembled battery BP in the upstream side channel 401*d*. As a result, the working fluid flowing through the upstream side channel 401*d* can easily absorb the heat from the assembled battery BP.

In addition, according to the present embodiment, the wall-shaped supply side wall portion 606 included in the liquid supply portion 42 separates between the upstream side channel 401*d* and the supply channel 421. This makes it possible to restrict the flow path of the working fluid between the supply channel 421 and the upstream side channel 401*d*, and direct the working fluid flowing from the supply channel 421 to the upstream side channel 401*d* to a specific location such as the lower end 401*f* of the upstream side channel 401*d*.

According to the present embodiment, the downstream side channel 401*h* includes an upper end 401*i* as the downstream end 401*b* of the evaporation channel 401 and a lower end 401*j* disposed at the upstream side of the working fluid stream from the upper end 401*i*. The upper end 401*i* of the downstream side channel 401*h* is connected to an upper part of the outflow channel 441. This makes it possible to make the working fluid flow in the vehicle vertical direction DRg as long as possible while allowing the working fluid to absorb the heat from the assembled battery BP in the downstream side channel 401*h*. As a result, the working fluid flowing through the downstream side channel 401*h* can easily absorb the heat from the assembled battery BP.

According to the present embodiment, the fluid outflow portion 44 has a wall-shaped outflow side wall portion 607 that separates between the downstream side channel 401*h* and the outflow channel 441, and between the evaporation intermediate channel 401*c* and the outflow channel 441. The outflow side wall portion 607 is provided with a partition communication hole 607*b* connected in parallel with the downstream side channel 401*h* with respect to the evaporation intermediate channel 401*c* and communicating the outflow channel 441 with the evaporation intermediate channel 401*c*. The partition communication hole 607*b* is disposed below the outflow channel 441, and is provided to have a size such that a flow of the working fluid is narrowed more in the case of passing through the partition communication hole 607*b* than in the case of passing through the downstream side channel 401*h*.

In this example, when the cooling capacity of the evaporator 12 is greatly exhibited, the boiling of the working fluid in the fluid evaporation portion 40 occurs intensely, so that the liquid surface of the working fluid rises due to the rising of the bubbles. As a result, the liquid-phase working fluid may temporarily flow into the outflow channel 441.

In the present embodiment, since the partition communication hole 607*b* is provided as described above, the working fluid of the liquid phase can be returned to the evaporation channel 401 when the liquid-phase working fluid temporarily accumulates in the outflow channel 441 due to such intense boiling or the like. For example, the liquid-phase working fluid accumulated in the outflow channel 441 can be returned to the evaporation channel 401 through the partition communication hole 607*b* after the intense boiling has been stopped.

Due to a size of the partition communication hole 607*b*, the bubble flow of the working fluid flowing upward in the evaporation intermediate channel 401*c* flows not to the partition communication hole 607*b* but exclusively to the downstream side channel 401*h*. In other words, the working fluid, which has become the bubble flow in the evaporation channel 401 can be prevented from flowing into the outflow channel 441 through the partition communication hole 607b.

According to the present embodiment, as shown in FIGS. 24 to 26, the evaporator 12 includes the multiple stacking units 60, each of which has a part of the fluid evaporation portion 40, a part of the liquid supply portion 42, and a part of the fluid outflow portion 44, and is formed so as to extend in the vehicle vertical direction DRg. The multiple stacking units 60 are formed with unit lateral surfaces 601 extending along the vehicle vertical direction DRg. The unit lateral surface 601 faces the battery lateral surface BPb of the assembled battery BP, and is connected to the battery lateral surface BPb so as to be thermally conductive. Further, the multiple stacking units 60 are stacked in the cell stacking direction DRs and joined to one another, thereby configuring the fluid evaporation portion 40, the liquid supply portion 42, and the fluid outflow portion 44.

Therefore, the number of stacks of the stacking units 60 is determined according to the number of stacks of the battery cells BC included in the assembled battery BP, thereby being capable of configuring the evaporator 12 according to the size of the assembled battery BP. For example, the multiple stacking units 60 are stacked on one another, thereby being capable of providing the evaporation channels 401 extending in the vehicle vertical direction DRg for each battery cell BC or for each section in the cell stacking direction DRs. As a result, only a part of the evaporator 12 in the cell stacking direction DRs can be inhibited from being dried out. In the assembled battery BP, the occurrence of the cooling variation and the temperature variation for each battery cell BC can be reduced.

Fifteenth Embodiment

Next, a fifteenth embodiment will be described. In the present embodiment, differences from the fourteenth embodiment described above will be mainly described.

Figure 28:
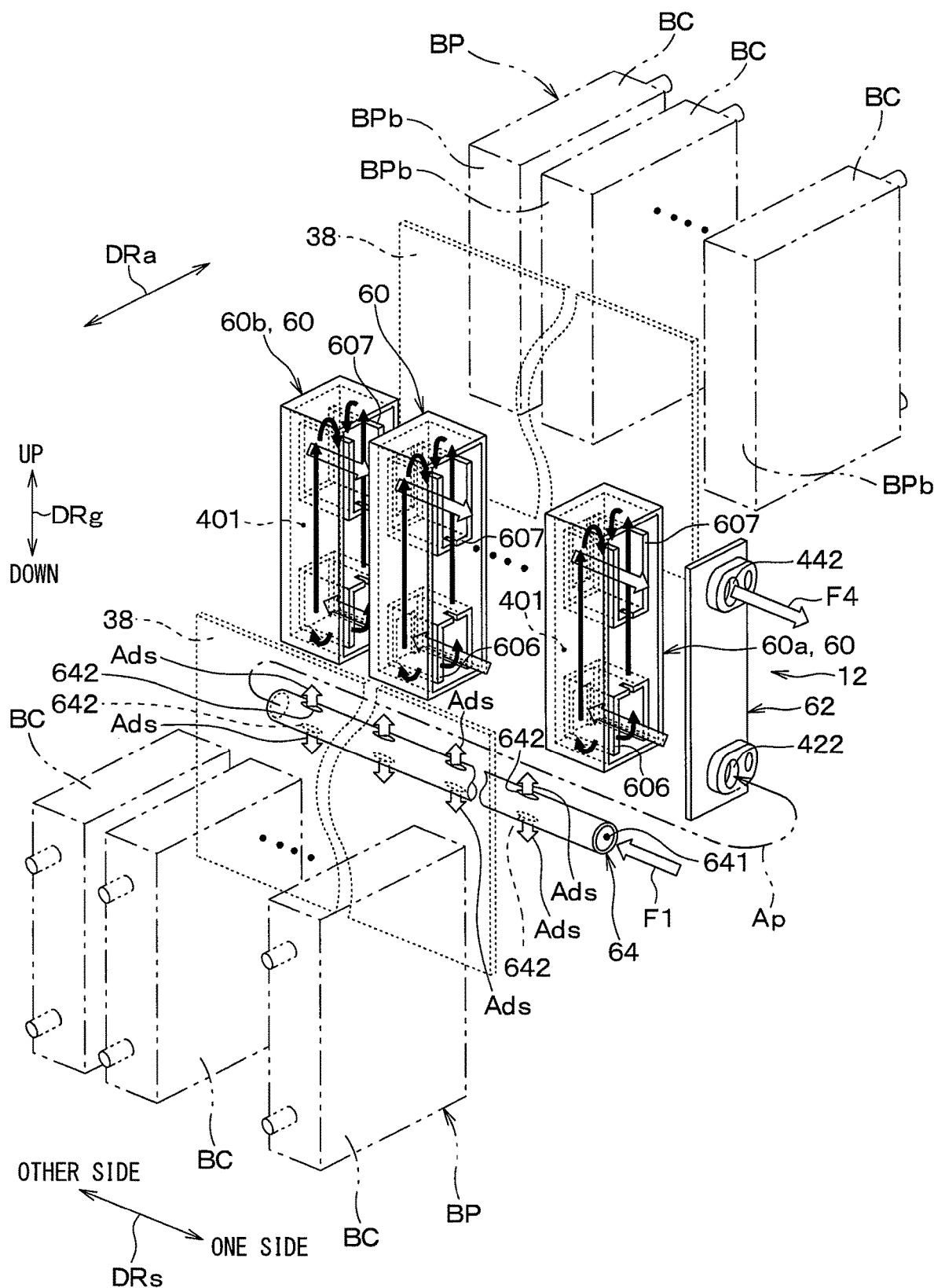
FIG. 28 is an exploded perspective view showing a schematic configuration of an evaporator according to a fifteenth embodiment, and corresponds to FIG. 24 in the fourteenth embodiment.
Figure 29:
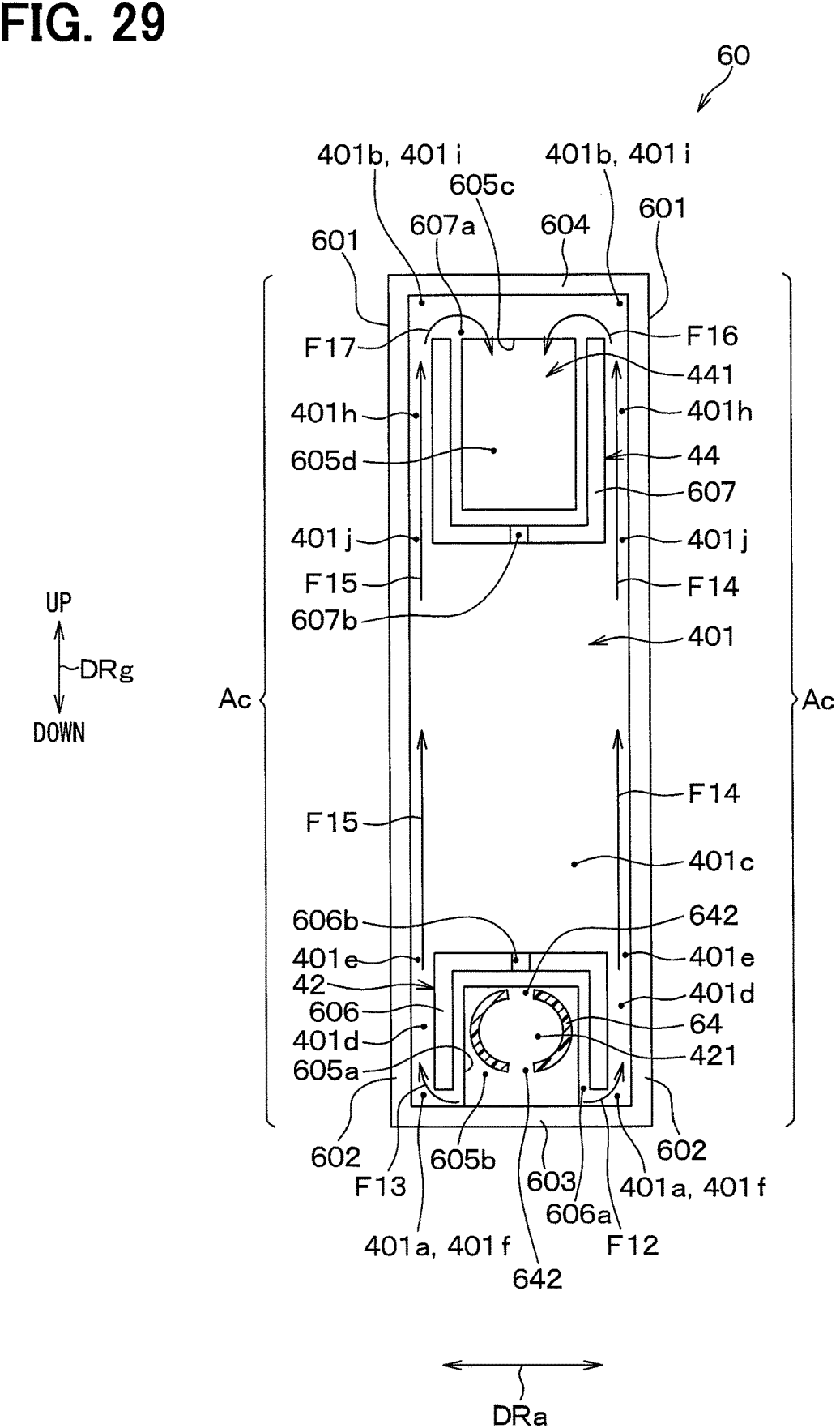
FIG. 29 is a front view of a single unit of the stacking units configuring the evaporator as viewed from one side in the cell stacking direction according to the fifteenth embodiment, and corresponds to FIG. 26 of the fourteenth embodiment.

As shown in FIGS. 28 and 29, in the present embodiment, an evaporator 12 includes a heat insulating pipe 64. In this respect, the present embodiment is different from the fourteenth embodiment.

Specifically, the heat insulating pipe 64 functions as a heat insulating material for insulating heat between the inside and the outside of the heat insulating pipe 64. For example, the heat insulating pipe 64 is a pipe made of a resin, and because of the material, the heat insulating pipe 64 has a high heat insulating property as compared with the side wall 602 on which the unit lateral surface 601 is provided.

The heat insulating pipe 64 is a pipe extending in the cell stacking direction DRs. The heat insulating pipe 64 is inserted from a fluid inlet 422 of an end plate 62 into a stacked joint body configured by the multiple stacking units 60 and the end plate 62 after the multiple stacking units 60 and the end plate 62 have been brazed and joined to each other, for example.

In an evaporator 12, one side opening 641 provided on one side of the heat insulating pipe 64 in the cell stacking direction DRs is connected to a fluid inlet 422. For that reason, the working fluid flowing into the fluid inlet 422 flows from the one-side opening 641 into the heat insulating pipe 64, and flows in the heat insulating pipe 64 from one side to the other side in the cell stacking direction DRs.

Therefore, a space inside the heat insulating pipe 64 serves as a supply channel 421. For that reason, the heat insulating pipe 64 and the supply side wall portion 606 provided in the stacking unit 60 configure a supply-side partition portion for separating between the pair of upstream side channels 401d and the supply channel 421, and between the evaporation intermediate channel 401c and the supply channel 421. In the present embodiment, the supply-side partition portion includes the heat insulating pipe 64 functioning as a heat insulating material.

Further, the heat insulating pipe 64 inserted into the stacked joint body described above reaches the inside of the other end stacking unit 60b through the first wall through hole 605b of each stacking unit 60. The heat insulating pipe 64 is provided with multiple radial holes 642 penetrating in the radial direction of the heat insulating pipe 64. In the present embodiment, the multiple radial holes 642 are defined above the heat insulating pipe 64, and the multiple radial holes 642 are also provided below the heat insulating pipe 64, and each of those radial holes 642 penetrates through the pipe wall of the heat insulating pipe 64 in the vertical direction DRg of the vehicle.

Further, at least one radial hole 642 of the heat insulating pipe 64 is provided so as to open into the stacking unit 60 for each stacking unit 60. For that reason, the liquid-phase working fluid flowing through the heat insulating pipe 64 flows out of the radial holes 642 in each of the stacking units 60 as indicated by the arrows Ads, and is distributed to each of the stacking units 60.

Except for what has been described above, the present embodiment is the same as the fourteenth embodiment. The present embodiment can obtain the same effects as those of the fourteenth embodiment which are obtained from the same configuration as those of the fourteenth embodiment.

In addition, according to the present embodiment, the supply side wall portion 606 that separates between the pair of upstream side channels 401d and the supply channel 421 and between the evaporation intermediate channel 401c and the supply channel 421 includes the heat insulating pipe 64 that functions as a heat insulating material. Therefore, in addition to the pair of upstream side channels 401d, the heat insulating pipe 64 can insulate heat between the assembled battery BP and the supply channel 421.

As a result, as compared with the case where the heat insulating pipe 64 is not provided, the heat from the assembled battery BP is less likely to be transmitted to the working fluid in the supply channel 421, and evaporation of the working fluid in the supply channel 421 can be reduced. As a result, for example, the possibility of dryout occurring in the supply channel 421 can be reduced as compared with the case where the heat insulating pipe 64 is not provided. In the evaporator 12, the cooling capacity for each section in the cell stacking direction DRs (for example, for each stacking unit 60) can be equalized. In other words, variations in the cooling capacity of the evaporator 12 in the cell stacking direction DRs can be reduced.

Sixteenth Embodiment

Next, a sixteenth embodiment will be described. In the present embodiment, differences from the fourteenth embodiment described above will be mainly described.

Figure 30:
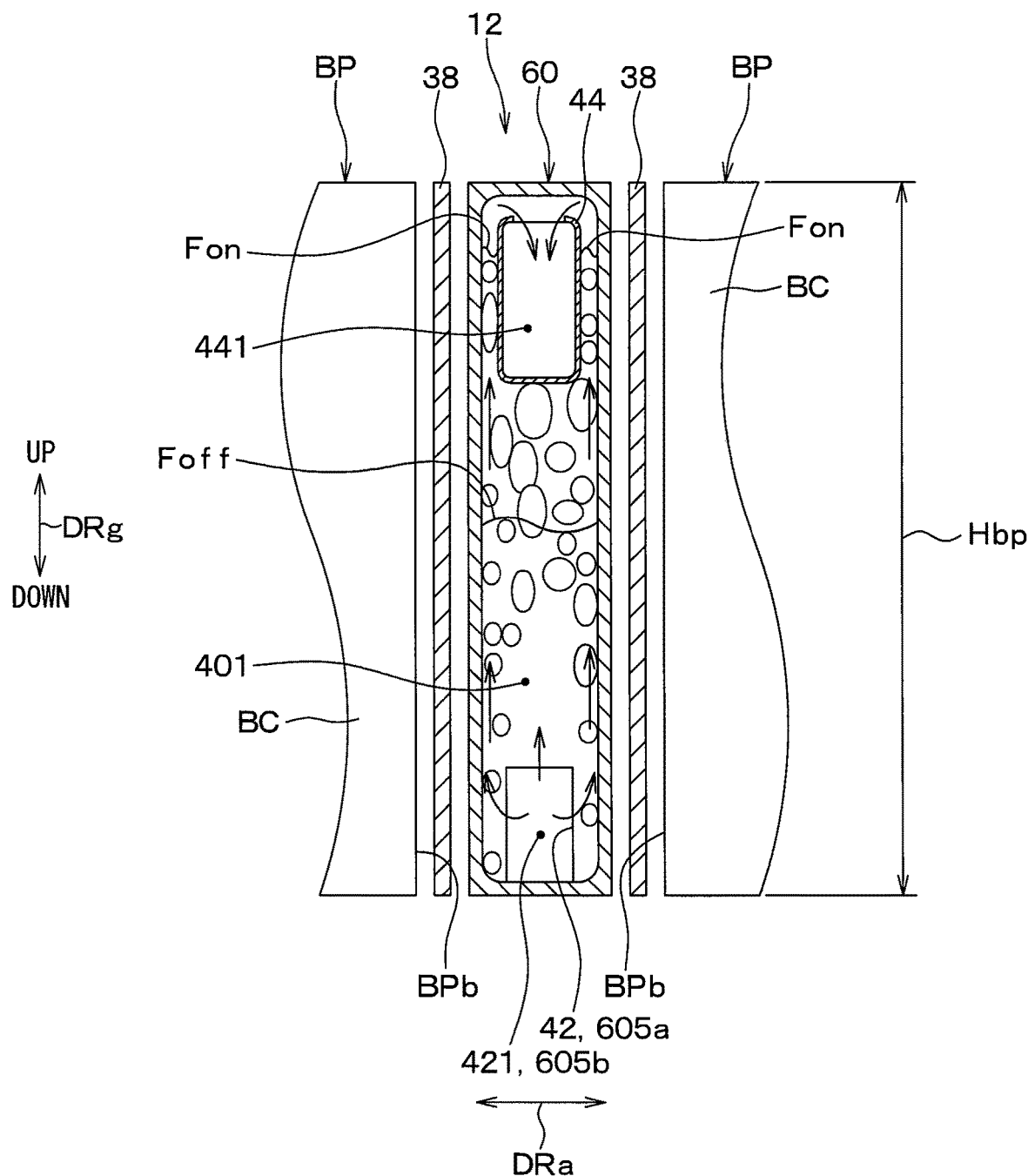
FIG. 30 is a cross-sectional view schematically showing a cross section taken along the line II-II of FIG. 1 according to a sixteenth embodiment, and corresponds to FIG. 23 in the fourteenth embodiment.
Figure 31:
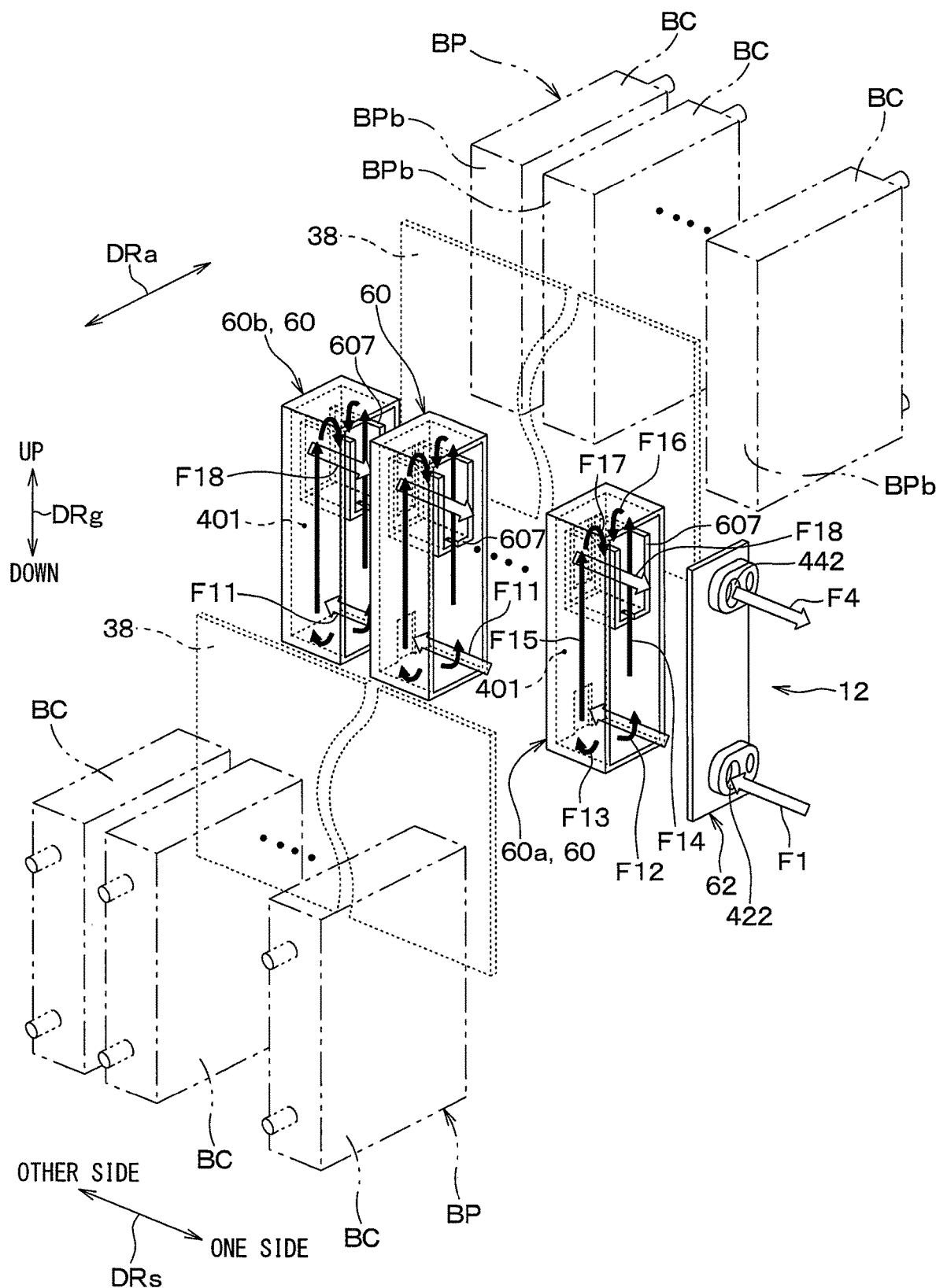
FIG. 31 is an exploded perspective view showing a schematic configuration of an evaporator according to the sixteenth embodiment, and corresponds to FIG. 24 in the fourteenth embodiment.
Figure 32:
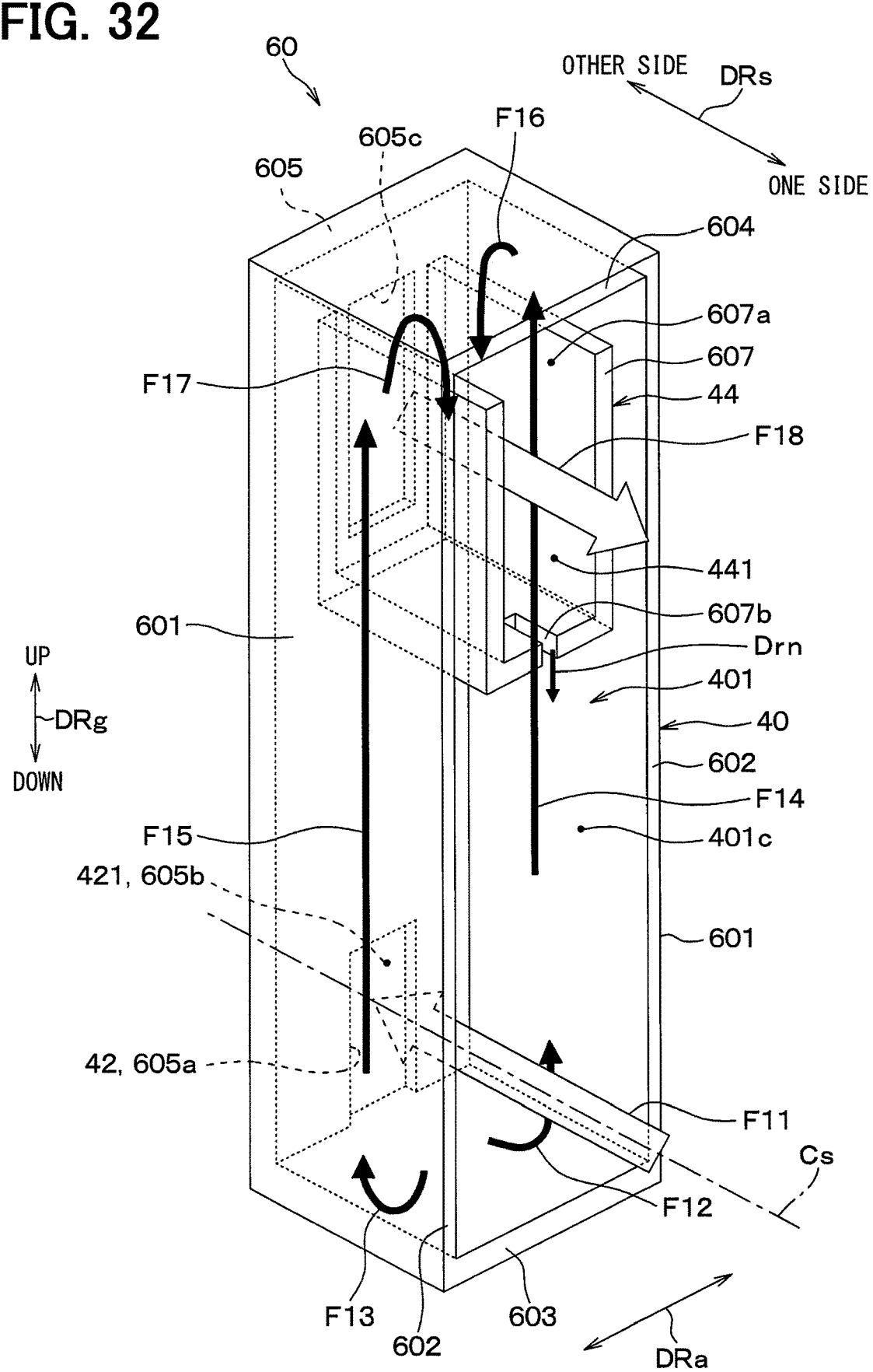
FIG. 32 is a perspective view showing a single unit of a stacking unit configuring the evaporator according to the sixteenth embodiment, and corresponds to FIG. 25 of the fourteenth embodiment.

As shown in FIGS. 30 to 32, in the present embodiment, multiple stacking units 60 that configures an evaporator 12 do not have a supply side wall portion 606 (refer to FIG. 25). In this respect, the present embodiment is different from the fourteenth embodiment.

However, the placement of a fluid inlet 422 and multiple first wall through holes 605b is the same as that of the fourteenth embodiment. In other words, also in the present embodiment, the fluid inlet 422 and the multiple first wall through holes 605b are provided on a supply channel axis line Cs which is a common axis line Cs extending in the cell stacking direction DRs.

Accordingly, the liquid-phase working fluid flowing into the fluid inlet 422 flows from one side to the other side in the cell stacking direction DRs through the multiple first wall through holes 605b in sequence. In other words, a space extending along the supply channel axis line Cs in the stacked multiple stacking units 60, that is, a space extending from the fluid inlet 422 to the cell stacking direction DRs including the multiple first wall through holes 605b is the supply channel 421.

For that reason, the multiple first through hole forming portions 605a are aligned in the cell stacking direction DRs to configure the liquid supply portion 42. The multiple first through hole forming portions 605a are aligned side by side in the cell stacking direction DRs to form the supply channel 421 including the multiple first wall through holes 605b aligned side by side in the cell stacking direction DRs so as to extend in the cell stacking direction DRs.

Figure 33:
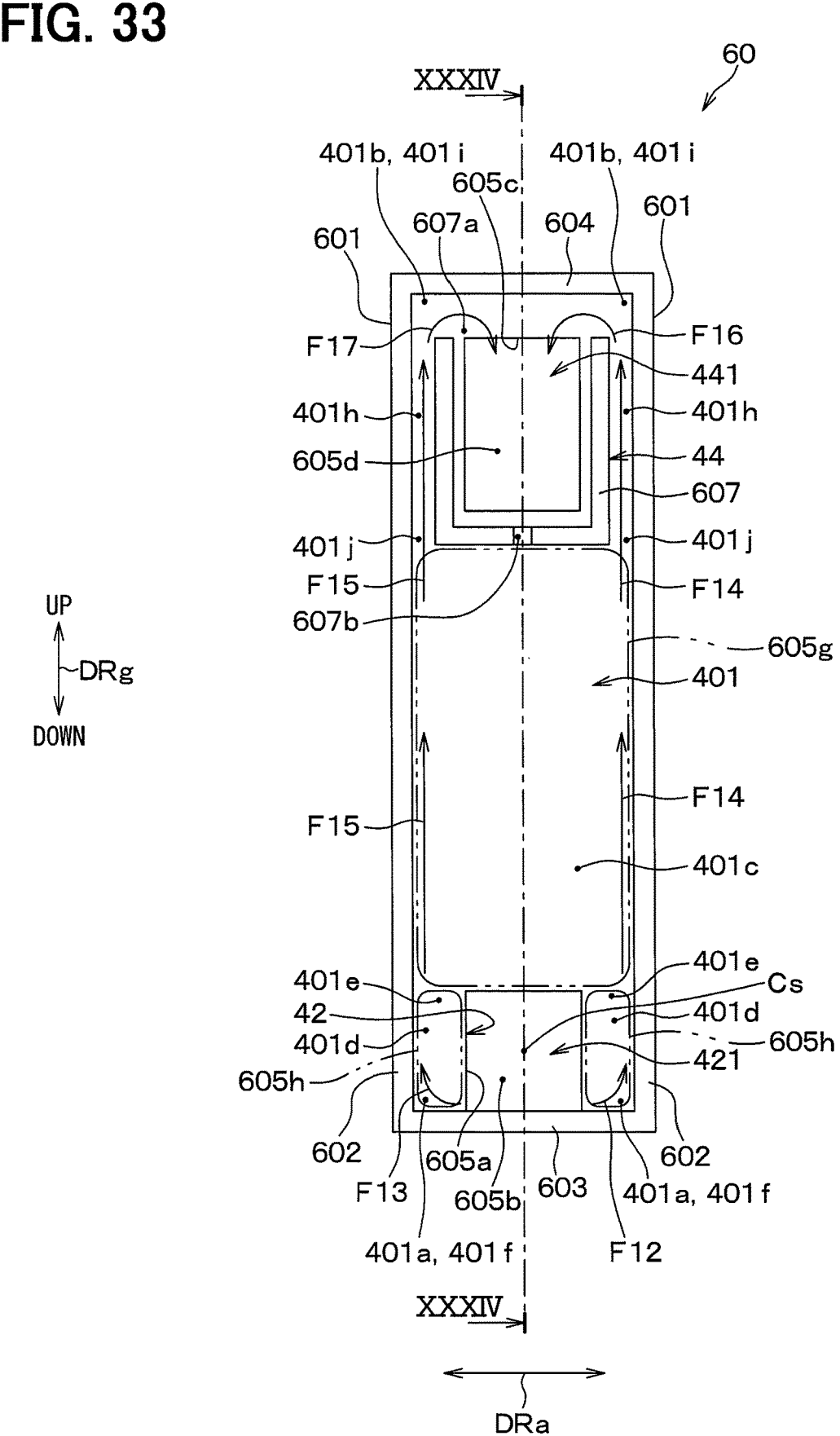
FIG. 33 is a front view of the single unit of the stacking unit configuring the evaporator according to the sixteenth embodiment as viewed from one side in the cell stacking direction, and corresponds to FIG. 26 in the fourteenth embodiment.
Figure 34:
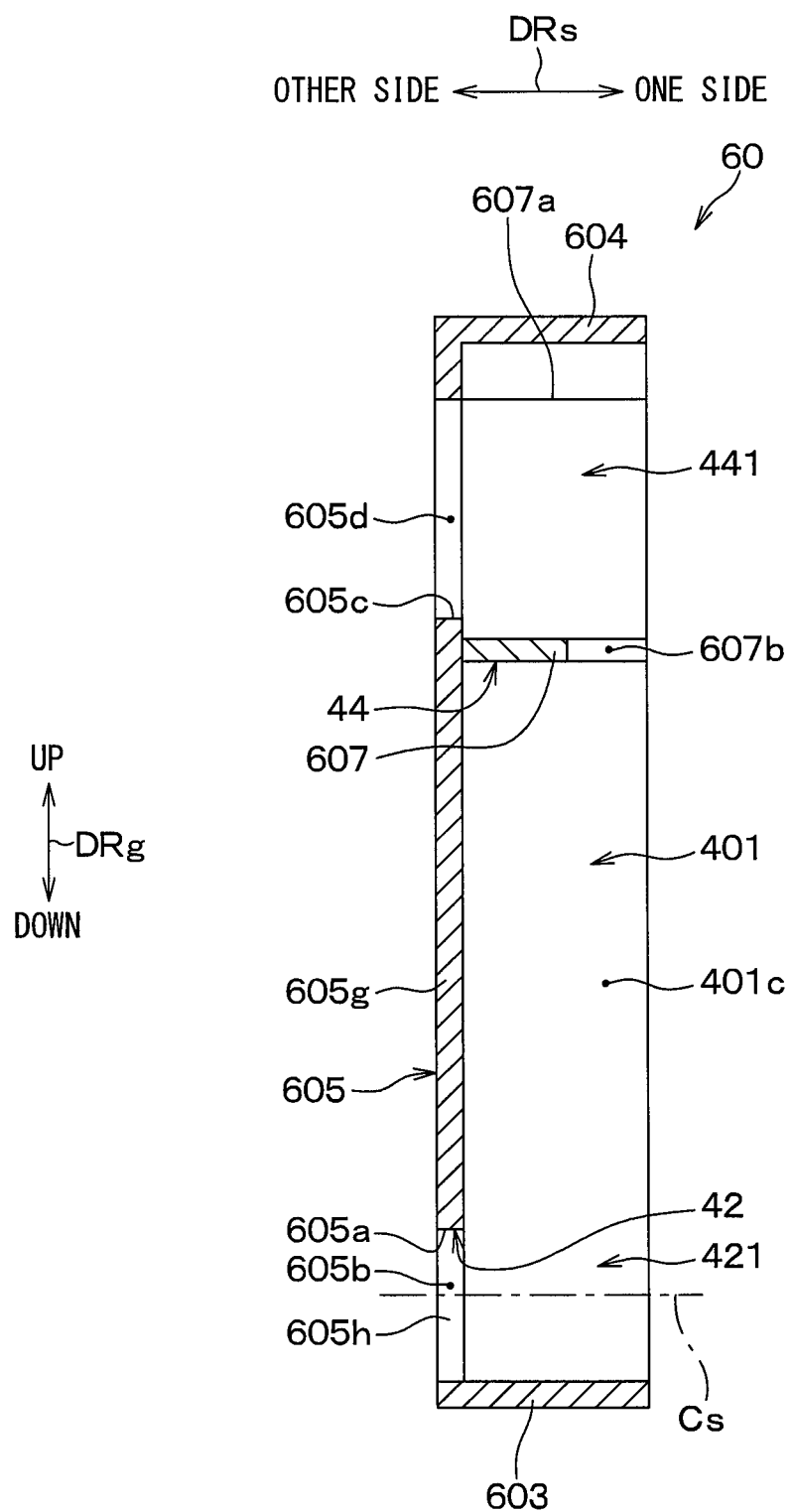
FIG. 34 is a cross-sectional view showing a cross section taken along a line XXXIV-XXXIV of FIG. 33 according to the sixteenth embodiment, and corresponds to FIG. 27 in the fourteenth embodiment.

As shown in FIGS. 33 and 34, the evaporation channel partition wall 605 is the same as that in the fourteenth embodiment, but in detail, the evaporation channel partition wall 605 has an intermediate partition wall portion 605g and a supply-side partition wall portion 605h extending downward from the intermediate partition wall portion 605g. The intermediate partition wall portion 605g is a portion of the evaporation channel partition wall 605 which separates between the evaporation intermediate channels 401c adjacent to each other in the cell stacking direction DRs, in the cell stacking direction DRs. The supply-side partition wall portion 605h is a portion of the evaporation channel partition wall 605 which separates between the upstream side channels 401d adjacent to each other in the cell stacking direction DRs, in the cell stacking direction DRs.

The evaporation channel partition wall 605 has a first through hole forming portion 605a, but in detail, the supply-side partition wall portion 605h of the evaporation channel partition wall 605 has a first through hole forming portion 605a. Therefore, the first wall through hole 605b formed by the first through hole forming portion 605a penetrates through the supply-side partition wall portion 605h of the evaporation channel partition wall 605 in the cell stacking direction DRs.

Except for what has been described above, the present embodiment is the same as the fourteenth embodiment. The present embodiment can obtain the same effects as those of the fourteenth embodiment which are obtained from the same configuration as those of the fourteenth embodiment.

According to the present embodiment, the fluid evaporation portion 40 has an evaporation channel partition wall 605 that separates the multiple evaporation channels 401 from each other in the cell stacking direction DRs. The evaporation channel partition wall 605 has a supply-side partition wall portion 605h for separating between the upstream side channels 401d in the cell stacking direction DRs. The supply-side partition wall portion 605h has a first through hole forming portion 605a that defines a first wall through hole 605b that penetrates through the supply-side partition wall portion 605h in the cell stacking direction DRs. Further, the multiple first through hole forming portions 605a are aligned side by side in the cell stacking direction DRs to configure the liquid supply portion 42. The multiple first through hole forming portions 605a are aligned side by side in the cell stacking direction DRs, thereby forming the supply channel 421 including the multiple the first wall through holes 605b aligned side by side in the cell stacking direction DRs so as to extend in the cell stacking direction DRs.

Therefore, even if there is no wall (for example, the supply side wall portion 606 of FIG. 26) separating between the supply channel 421 and the upstream side channel 401d, the liquid-phase working fluid of the supply channel 421 can flow along the cell stacking direction DRs while passing through the multiple first wall through holes 605b in order. The supply-side partition wall portion 605h prevents the working fluid boiling in the upstream side channel 401d by heat from the assembled battery BP and becoming a bubble flow from flowing in the cell stacking direction DRs.

For example, in the upstream side channel 401d, the working fluid boils most actively on the side wall 602 of the stacking unit 60 (in other words, the portion of the upstream side channel 401d which comes in contact with the side wall 602). For that reason, if the supply amount of the liquid-phase working fluid is sufficient for the evaporation amount of the working fluid in the upstream side channel 401d, the bubble flow in the upstream side channel 401d is prevented from entering the supply channel 421 to such an extent that the flow of the supply channel 421 is obstructed. The working fluid which has become the bubble flow flows from the lower side to the upper side along the supply-side partition wall portion 605h in the upstream side channel 401d. In other words, the supply-side partition wall portion 605h inhibits air bubbles of the working fluid from concentrating at a specific portion in the evaporator 12 and causing dryout.

In this manner, if the supply amount of the liquid-phase working fluid is sufficient for the evaporation amount of the working fluid in the upstream side channel 401d, the working fluid which has become the bubble flow in the upstream side channel 401d can function as a heat insulating layer between the assembled battery BP and the supply channel 421. In the supply channel 421 provided by the multiple first wall through holes 605b continuing in the cell stacking direction DRs, the liquid-phase working fluid can flow in the cell stacking direction DRs.

Seventeenth Embodiment

Next, a seventeenth embodiment will be described. In the present embodiment, differences from the above-mentioned fifteenth embodiment will be mainly described.

Figure 35:
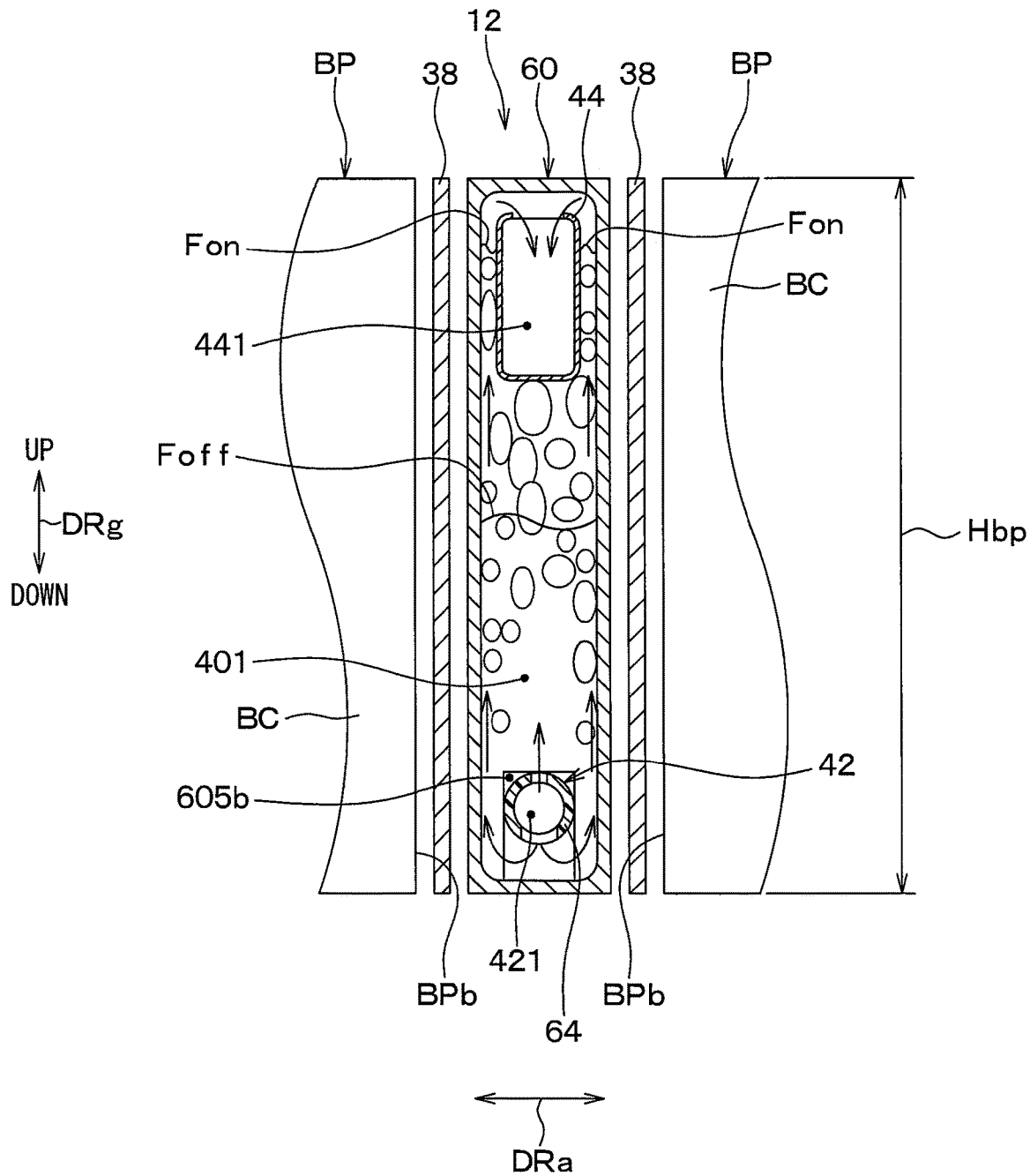
FIG. 35 is a cross-sectional view schematically showing a cross section taken along the line II-II of FIG. 1 according to a seventeenth embodiment, and corresponds to FIG. 23 in the fourteenth embodiment.
Figure 36:
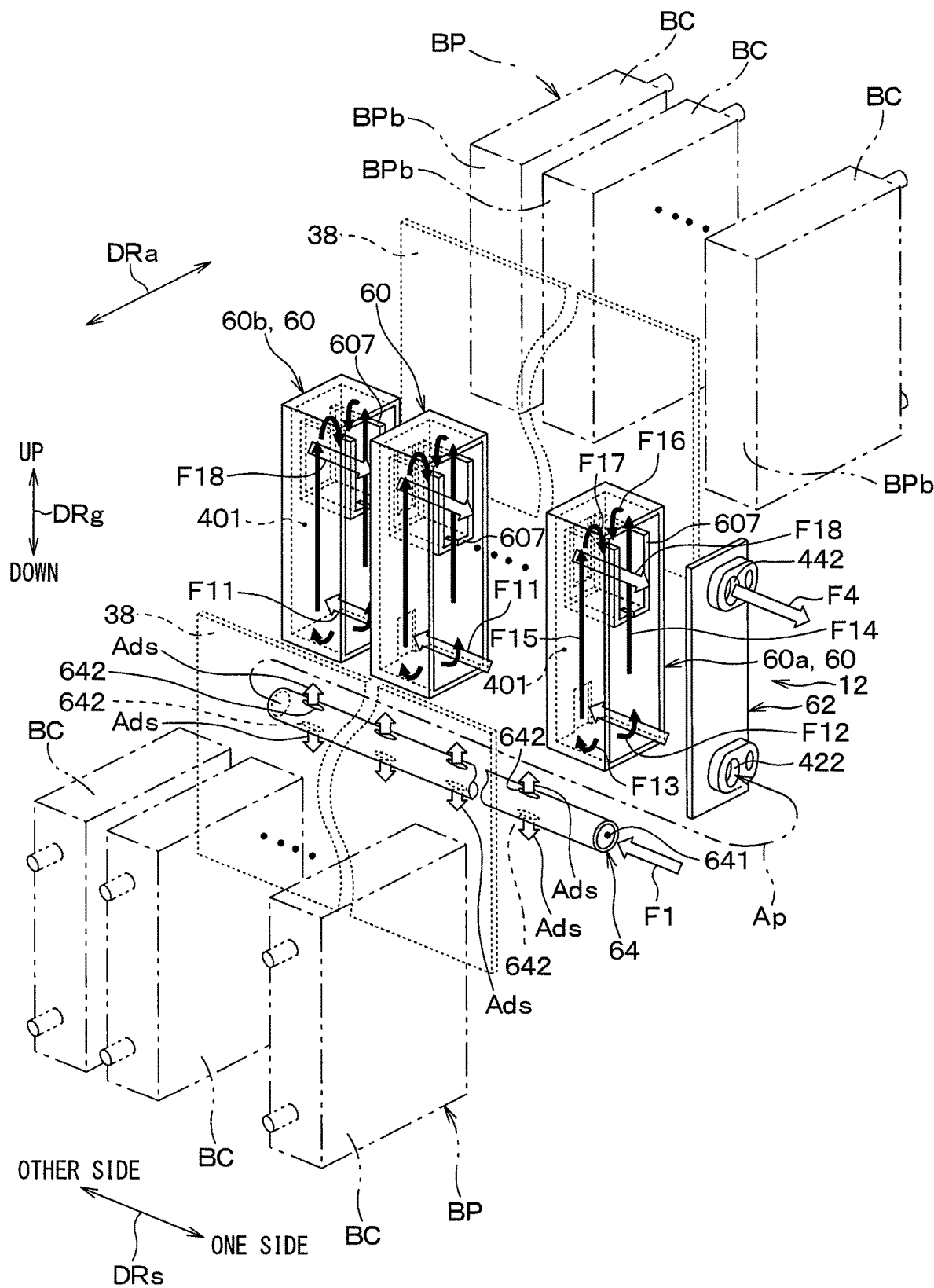
FIG. 36 is an exploded perspective view showing a schematic configuration of an evaporator according to the seventeenth embodiment, and corresponds to FIG. 28 in the fifteenth embodiment.

As shown in FIGS. 35 and 36, in the present embodiment, multiple stacking units 60 that configure an evaporator 12 do not have a supply side wall portion 606 (refer to FIG. 29). In this respect, the present embodiment is different from the fifteenth embodiment.

In the present embodiment, since the supply side wall portion 606 is not provided, the heat insulating pipe 64 configures a supply-side partition portion for separating between a pair of upstream side channels 401d and a supply channel 421, and between an evaporation intermediate channel 401 c and the supply channel 421.

Except for what has been described above, the present embodiment is the same as the fifteenth embodiment. The present embodiment can obtain the same effects as in the fifteenth embodiment which are obtained from the same configuration as in the fifteenth embodiment.

Eighteenth Embodiment

Next, an eighteenth embodiment will be described. In the present embodiment, differences from the fourteenth embodiment described above will be mainly described.

Figure 37:
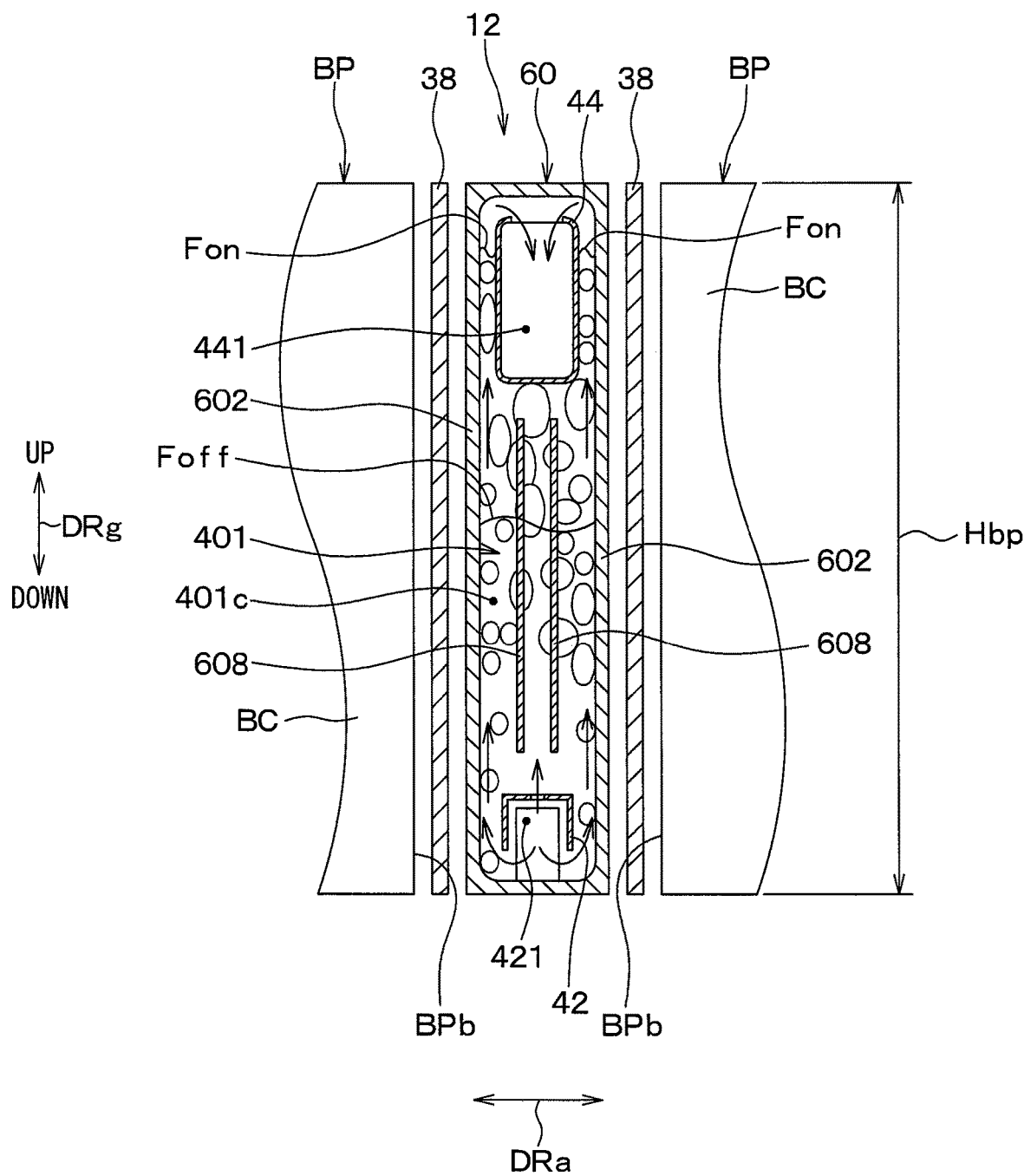
FIG. 37 is a cross-sectional view schematically showing a cross section taken along the line II-II of FIG. 1 according to an eighteenth embodiment, and corresponds to FIG. 23 in the fourteenth embodiment.

As shown in FIG. 37, in the present embodiment, each of multiple stacking units 60 configuring an evaporator 12 includes multiple evaporation channel division walls 608. In this respect, the present embodiment is different from the fourteenth embodiment.

Specifically, the multiple evaporation channel dividing walls 608 have a wall shape extending in a vehicle vertical direction DRg, and are disposed in an evaporation intermediate channel 401c of evaporation channels 401 provided in a stacking unit 60. The multiple evaporation channel division walls 608 are formed with a side normal direction DRa as a thickness direction, and separate the evaporation intermediate channel 401c into the side normal direction DRa. For that reason, the evaporation intermediate channel 401c is divided into multiple divided channels extending in the vehicle vertical direction DRg.

As a result, when the boiling of the working fluid in the evaporation channel 401 is not so severe, the liquid-phase working fluid in the evaporation channel 401 is easily lifted upward by the bubble pump effect. As a result, the variation in the temperature distribution of the vehicle vertical direction DRg on the unit lateral surface 601 can be reduced. The bubble pump effect is an effect of raising a liquid surface of the working fluid in the vicinity of an inside of a side wall 602 heated by the assembled battery BP as bubbles generated by boiling of the working fluid rise in the evaporation channel 401.

Except for what has been described above, the present embodiment is the same as the fourteenth embodiment. The present embodiment can obtain the same effects as those of the fourteenth embodiment which are obtained from the same configuration as those of the fourteenth embodiment.

Nineteenth Embodiment

Next, a nineteenth embodiment will be described. In the present embodiment, differences from the fourteenth embodiment described above will be mainly described.

Figure 38:
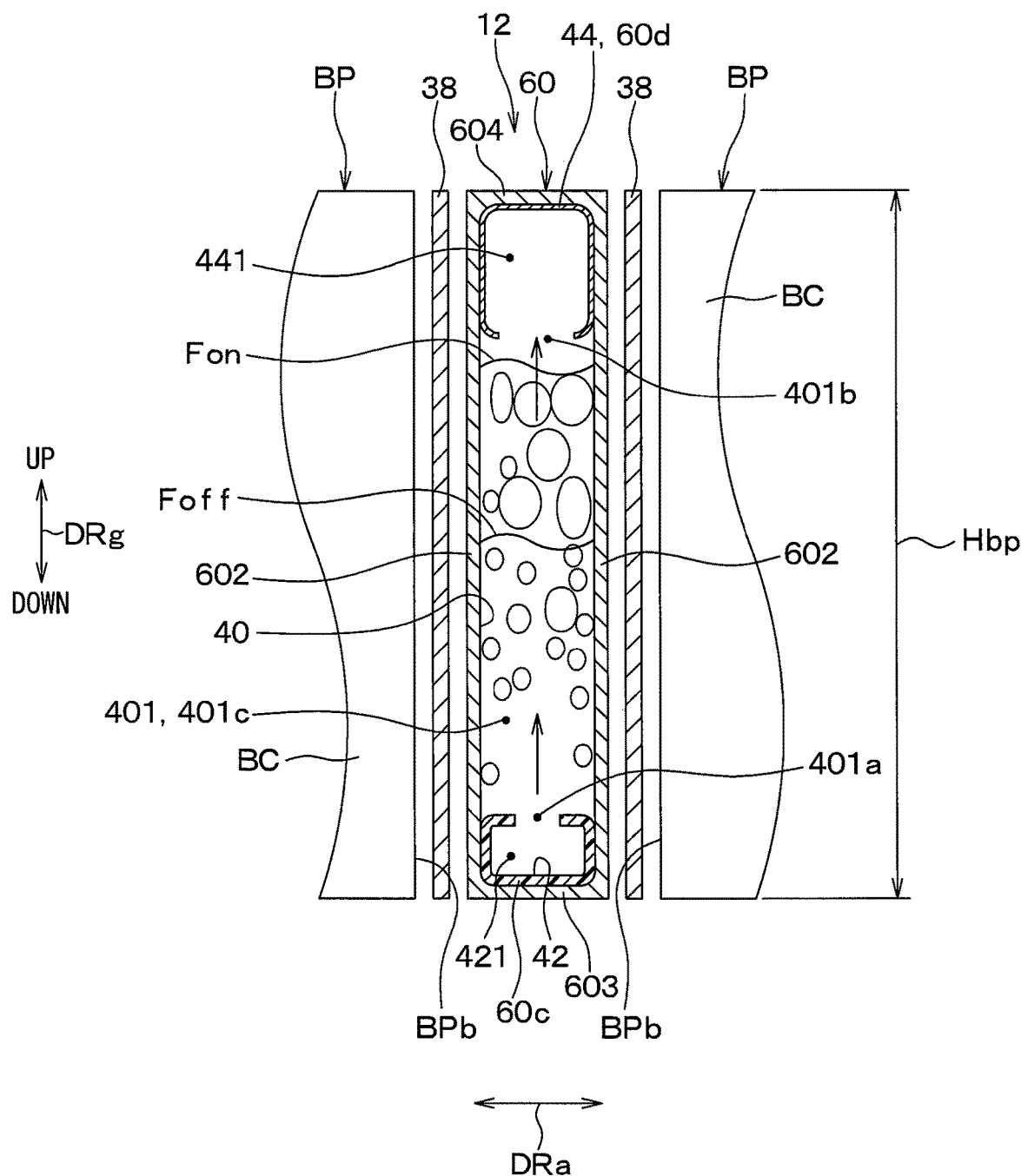
FIG. 38 is a cross-sectional view schematically showing a cross section taken along the line II-II according to a nineteenth embodiment, and corresponds to FIG. 23 in the fourteenth embodiment.

As shown in FIG. 38, an outer shape of a stacking unit 60 according to the present embodiment is the same as that of the fourteenth embodiment. However, in the present embodiment, a connection relationship between a supply channel 421 and an evaporation channel 401 and a connection relationship between an outflow channel 441 and the evaporation channel 401 in the stacking unit 60 are different from those in the fourteenth embodiment. Specifically, the evaporation channel 401 of the present embodiment has an evaporation intermediate channel 401c, but does not have an upstream side channel 401d and a downstream side channel 401h shown in FIG. 26.

The multiple stacking units 60 each have a unit inner lower wall portion 60c of the unit shown in FIG. 38 and a unit inner upper wall portion 60d instead of a supply side wall portion 606 and an outflow side wall portion 607 (refer to FIG. 26). The unit inner lower wall portion 60c is provided below the evaporation channel 401 in the stacking unit 60, and a supply channel 421 is provided in the unit inner lower wall portion 60c. The unit inner upper wall portion 60d is provided above the evaporation channel 401 in the stacking unit 60, and an outflow channel 441 is provided in the unit inner upper wall portion 60d.

In other words, the unit inner lower wall portion 60c of the present embodiment corresponds to the supply side wall portion 606 of the fourteenth embodiment, and the unit inner upper wall portion 60d of the present embodiment corresponds to the outflow side wall portion 607 of the fourteenth embodiment.

However, as shown in FIG. 38, unlike the fourteenth embodiment, the unit inner lower wall portion 60c of the present embodiment opens to the evaporation channel 401 at an upper portion of the unit inner lower wall portion 60c. The unit inner upper wall portion 60d opens to the evaporation channel 401 at a lower portion of the unit inner upper wall portion 60d.

For that reason, in each of the multiple stacking units 60, the supply channel 421 is connected to the upstream end 401a of the evaporation channel 401 above the supply channel 421, and the outflow channel 441 is connected to the downstream end 401b of the evaporation channel 401 below the outflow channel 441.

The unit inner lower wall portion 60c is in contact with the side wall 602 and the lower wall 603 of the stacking unit 60, and the unit inner upper wall portion 60d is in contact with the side wall 602 and the upper wall 604 of the stacking unit 60. The unit inner upper wall portion 60d is made of a metal such as an aluminum alloy similarly to the side wall 602 of the stacking unit 60, but the unit inner lower wall portion 60c is made of a heat insulating material such as a resin having a heat insulating property higher than that of the constituent material of the side wall 602. In the present embodiment, the inner wall portion of the unit inner lower wall portion 60c configures the liquid supply portion 42 in which the supply channel 421 is provided. An outer peripheral portion of the unit inner lower wall portion 60c with respect to the liquid supply portion 42 (that is, a remaining portion obtained by removing the liquid supply portion 42 from the unit inner lower wall portion 60c) forms a heat insulating portion interposed between the liquid supply portion 42 and the assembled battery BP to insulate heat between the liquid supply portion 42 and the assembled battery BP. The unit inner upper wall portion 60d configures a fluid outflow portion 44 in which an outflow channel 441 is provided.

Except for what has been described above, the present embodiment is the same as the fourteenth embodiment. The present embodiment can obtain the same effects as those of the fourteenth embodiment which are obtained from the same configuration as those of the fourteenth embodiment.

Further, according to the present embodiment, since the unit inner lower wall portion 60c is made of a heat insulating material such as a resin, the vaporization of the liquid-phase working fluid flowing through the supply channel 421 can be inhibited as compared with the case where the unit inner lower wall portion 60c is made of, for example, metal.

In the present embodiment, an area of a cooling surface of the fluid evaporation portion 40 for cooling the assembled battery BP is smaller than that of the fourteenth embodiment, but a size occupied by the evaporator 12 in the vehicle vertical direction DRg is the same as that of the fourteenth embodiment.

Twentieth Embodiment

Next, a twentieth embodiment will be described. In the present embodiment, differences from the nineteenth embodiment described above will be mainly described.

Figure 39:
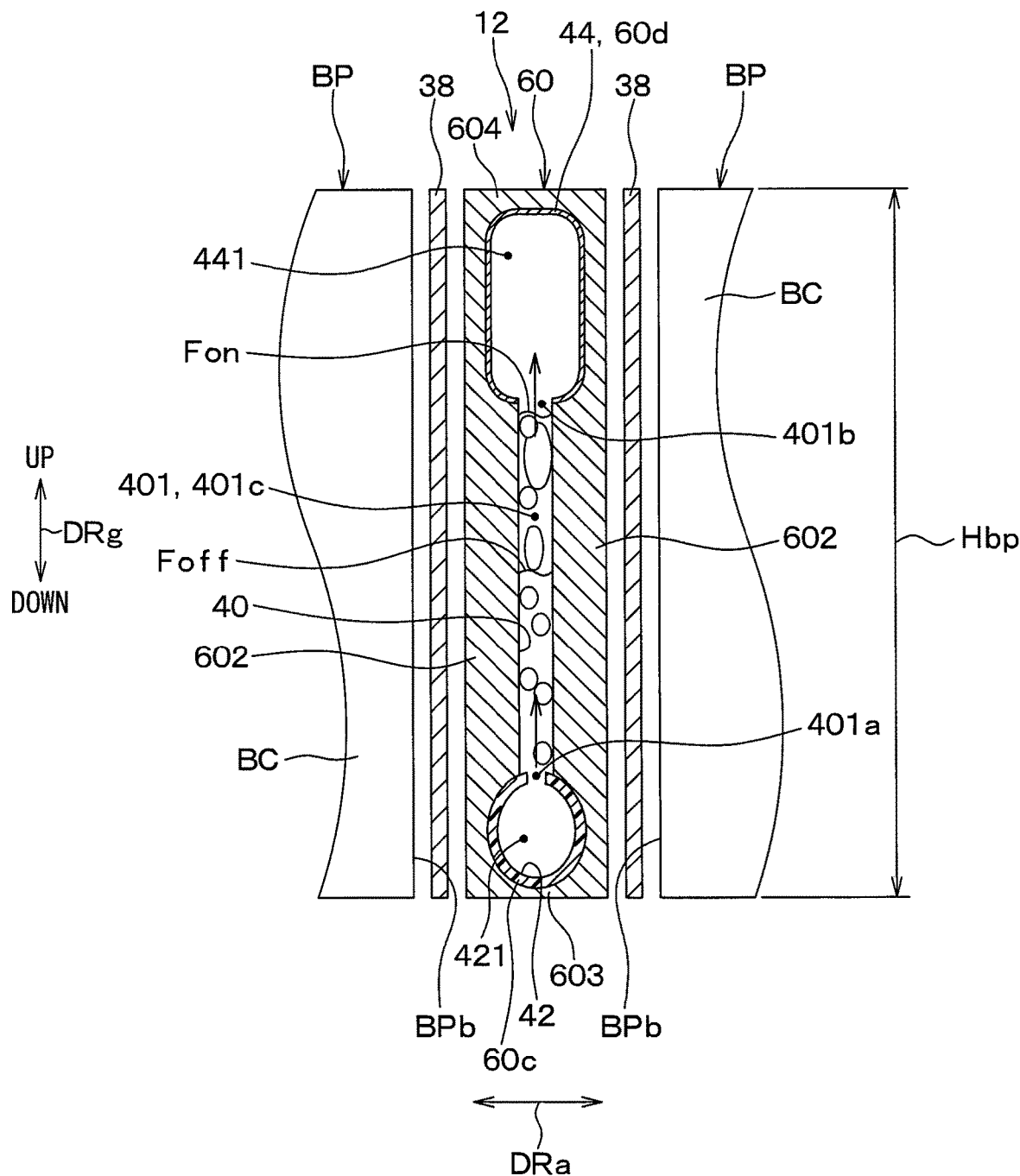
FIG. 39 is a cross-sectional view schematically showing a cross section taken along the line II-II of FIG. 1 according to a twentieth embodiment, and corresponds to FIG. 38 in the nineteenth embodiment.

As shown in FIG. 39, in the present embodiment, a width of an evaporation channel 401 provided in a stacking unit 60 in a side normal direction DRa is narrower than a width of a supply channel 421 and a width of an outflow channel 441. In this respect, the present embodiment is different from the nineteenth embodiment, and is otherwise the same as the nineteenth embodiment.

The present embodiment can obtain the effects obtained from the configuration common to the nineteenth embodiment as in the nineteenth embodiment.

Twenty-First Embodiment

Next, a twenty-first embodiment will be described. In the present embodiment, differences from the nineteenth embodiment described above will be mainly described.

Figure 40:
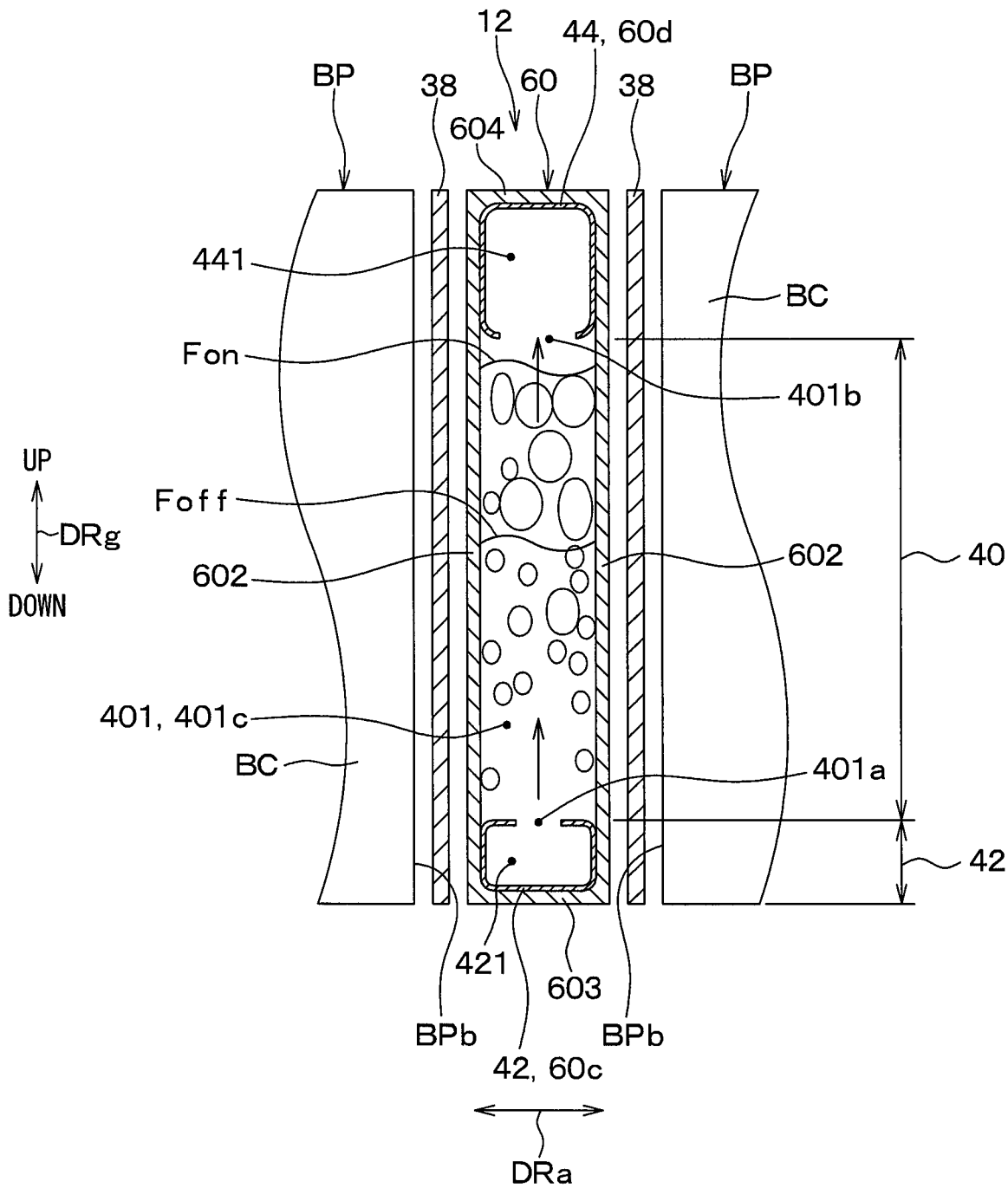
FIG. 40 is a cross-sectional view schematically showing a cross section taken along the line II-II of FIG. 1 according to a twenty-first embodiment, and corresponds to FIG. 38 in the nineteenth embodiment.

As shown in FIG. 40, in the present embodiment, an inner lower wall portion 60c of a stacking unit 60 is not made of a heat insulating material, and is made of a metal such as an aluminum alloy as with a side wall 602 of the stacking unit 60. In this respect, the present embodiment is different from the nineteenth embodiment, and is otherwise the same as the nineteenth embodiment.

The present embodiment can obtain the effects obtained from the configuration common to the nineteenth embodiment as in the nineteenth embodiment.

Since the unit inner lower wall portion 60c of the present embodiment does not include a configuration corresponding to the heat insulating portion, it can be understood that the whole of the unit inner lower wall portion 60c configures a liquid supply portion 42. As shown in FIG. 40, in the evaporator 12 of the present embodiment, the liquid supply portion 42 is disposed so that a surface area of the liquid supply portion 42 which comes in contact with the heat conduction material 38 is smaller than that of the fluid evaporation portion 40. Therefore, also in the present embodiment, the liquid supply portion 42 is disposed at a position more insulated from the heat of the assembled battery BP than the fluid evaporation portion 40. However, since the unit inner lower wall portion 60c does not include a configuration corresponding to the heat insulating portion, a working fluid flowing through the supply channel 421 of the present embodiment is susceptible to an influence of the heat of the assembled battery BP as compared with the nineteenth embodiment.

Twenty-Second Embodiment

Next, a twenty-second embodiment will be described. In the present embodiment, differences from the twenty-first embodiment will be mainly described.

Figure 41:
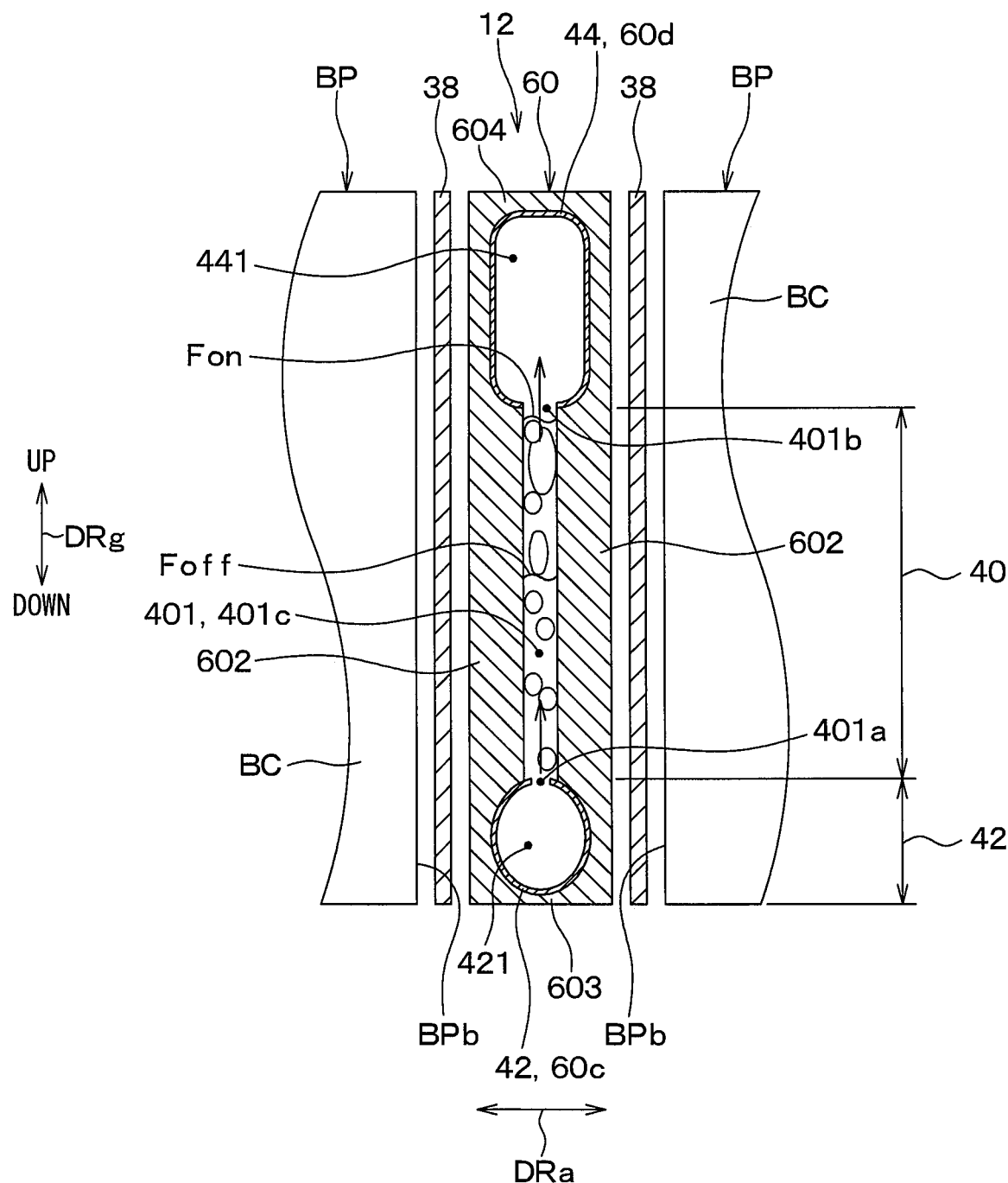
FIG. 41 is a cross-sectional view schematically showing a cross section taken along the line II-II of FIG. 1 according to a twenty-second embodiment, and corresponds to FIG. 40 in the twenty-first embodiment.

As shown in FIG. 41, in the present embodiment, a width of an evaporation channel 401 provided in a stacking unit 60 in a side normal direction DRa is narrower than a width of a supply channel 421 and a width of an outflow channel 441. In this respect, the present embodiment is different from the twenty-first embodiment, and is otherwise the same as the twenty-first embodiment.

The present embodiment can obtain the effects obtained from the configuration common to the twenty-first embodiment as in the twenty-first embodiment.

Other Embodiments (1) In the first embodiment described above, as shown in FIG. 3, the second evaporation forming portion 122a of the first evaporation forming portion 121a and the second evaporation forming portion 122a has multiple protrusion portions 122d, but this is an example. For example, instead of the second evaporation forming portion 122a, the first evaporation forming portion 121a may have the multiple protrusion portions 122d, or both the first and second evaporation forming portions 121a and 122a may have the multiple protrusion portions 122d.

In short, one evaporation forming portion of the first evaporation forming portion 121a and the second evaporation forming portion 122a may have the multiple protrusion portions 122d protruding toward the other evaporation forming portion. The protrusion portions 122d may be in contact with the other evaporation forming portion to separate the multiple evaporation channels 401 from one another. This also applies to the embodiment in which the evaporator 12 is configured by the pair of plate members 121 and 122 in the second embodiment and the subsequent embodiments. If the number of the evaporation channels 401 is two, for example, the number of the protrusion portions 122d may be one instead of a plurality.

(2) In each of the embodiments described above, as shown in FIG. 2 and the like, the air interposed between the liquid supply portion 42 and the assembled battery BP functions as the heat insulating portion 39, but this is an example. For example, the heat insulating portion 39 may be made of a heat insulating material such as a resin having a high heat insulating property instead of air.

(3) In the first embodiment described above, as shown in FIG. 3, in the supply channel 421, the working fluid flows from one side to the other side in the stacking direction DRs, and in the outflow channel 441, the working fluid flows from one side to the other side in the cell stacking direction DRs. In other words, the working fluid flows in the same direction in any of the channels 421 and 441, but may flow in opposite directions in the respective channels 421 and 441. For example, in the supply channel 421, the working fluid may flow from one side to the other side in the cell stacking direction DRs, and in the outflow channel 441, the working fluid may flow from the other side to one side in the cell stacking direction DRs. The same also applies to the second and subsequent embodiments.

(4) In the first embodiment described above, as shown in FIGS. 3 and 4, the evaporation channels 401 are provided in the same number as that of the battery cells BC included in the assembled battery BP, but this is an example. For example, the number of evaporation channels 401 may be larger or smaller than the number of battery cells BC. In other words, the multiple evaporation channels 401 may be allocated to one battery cell BC, or one evaporation channel 401 may be allocated to multiple battery cells BC. The same also applies to the second and subsequent embodiments.

(5) In the third embodiment described above, the multiple multi-hole pipes 50 are provided as shown in FIG. 7, and the number of the multi-hole pipes 50 is the same as the number of the battery cells BC included in the assembled battery BP, but this is an example. For example, the number of the multi-hole pipes 50 may be larger or smaller than the number of the battery cells BC. The same also applies to the seventh embodiment.

(6) In the first embodiment described above, as shown in FIG. 2, the fluid outflow portion 44 is disposed apart from both the assembled battery BP and the heat conduction material 38, but this is an example. The fluid outflow portion 44 may or may not be in contact with the assembled battery BP or the heat conduction material 38. In other words, the fluid outflow portion 44 may or may not be thermally connected to the assembled battery BP. The same also applies to the second and subsequent embodiments.

(7) In the first embodiment described above, for example, in FIG. 1, a left side of a paper surface is one side in the cell stacking direction DRs, and a right side of the paper surface is the other side in the cell stacking direction DRs, but one side and the other side in the cell stacking direction DRs may be mutually replaced. The same also applies to the second and subsequent embodiments.

(8) In the first embodiment described above, as shown in FIG. 3, an inner fin is not provided in the evaporation channel 401 of the fluid evaporation portion 40, but an inner fin may be provided in the evaporation channel 401. The provision of the internal heat transfer structure by the inner fin is also effective for a heat exchange between the working fluid and the assembled battery BP. The provision of the inner fin can be applied to the evaporator 12 including the pair of plate members 121 and 122, for example, in the fourth embodiment in addition to the first embodiment.

Figure 42:
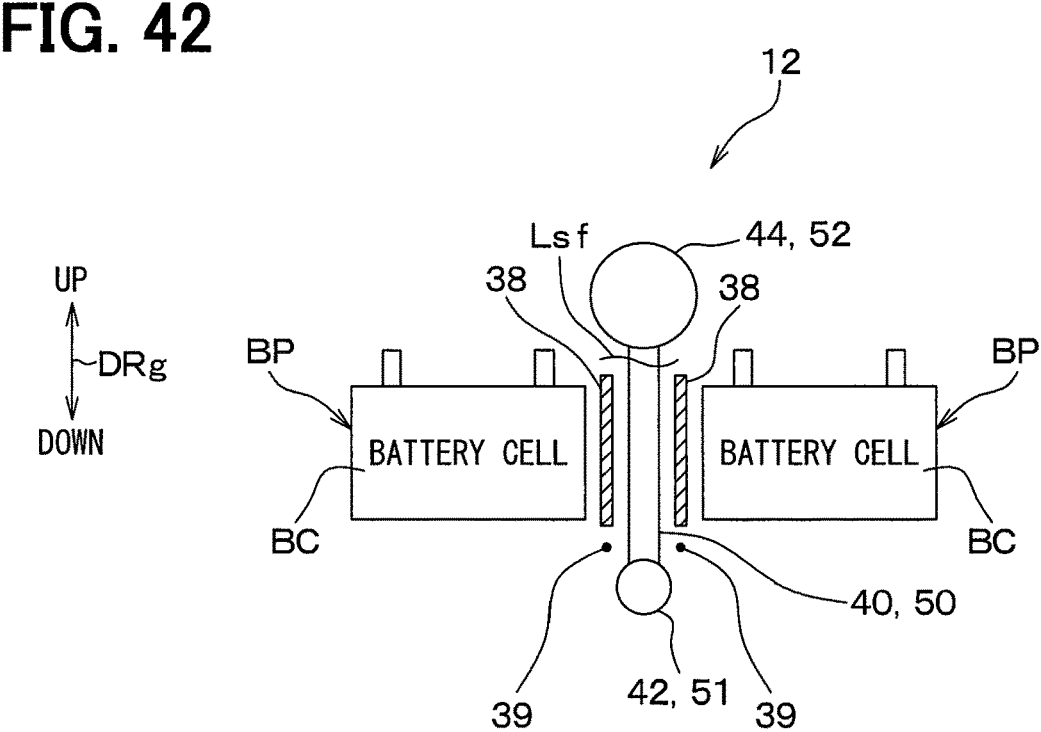
FIG. 42 is a cross-sectional view schematically showing a cross section taken along the line II-II of FIG. 1 in a first modification as another embodiment, and corresponds to FIG. 5 of the second embodiment.

(9) In the second embodiment described above, as shown in FIG. 5, the evaporator 12 cools one assembled battery BP, but may cool multiple assembled batteries BP simultaneously. For example, as shown in FIG. 42, the evaporator 12 may cool two assembled batteries BP simultaneously. In the evaporator 12 of FIG. 42, the fluid evaporation portion 40 is connected to one of the two assembled batteries BP so as to be thermally conductive on one surface side of the fluid evaporation portion 40. At the same time, the fluid evaporation portion 40 is connected to the other of the two assembled batteries BP so as to be thermally conductive on the other surface side of the fluid evaporation portion 40.

Figure 43:
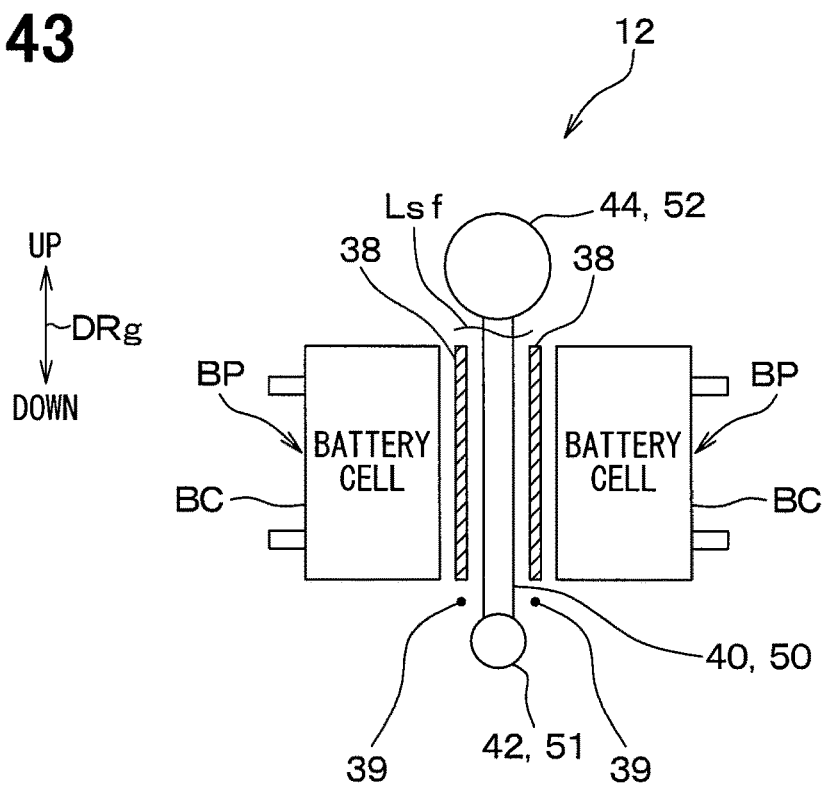
FIG. 43 is a cross-sectional view schematically showing a cross section taken along the line II-II of FIG. 1 in a second modification shown as another embodiment, and corresponds to FIG. 5 of the second embodiment.

Further, as shown in FIG. 43, a posture of the assembled battery BP relative to the evaporator 12 may be different from an attitude shown in FIG. 42.

Figure 44:
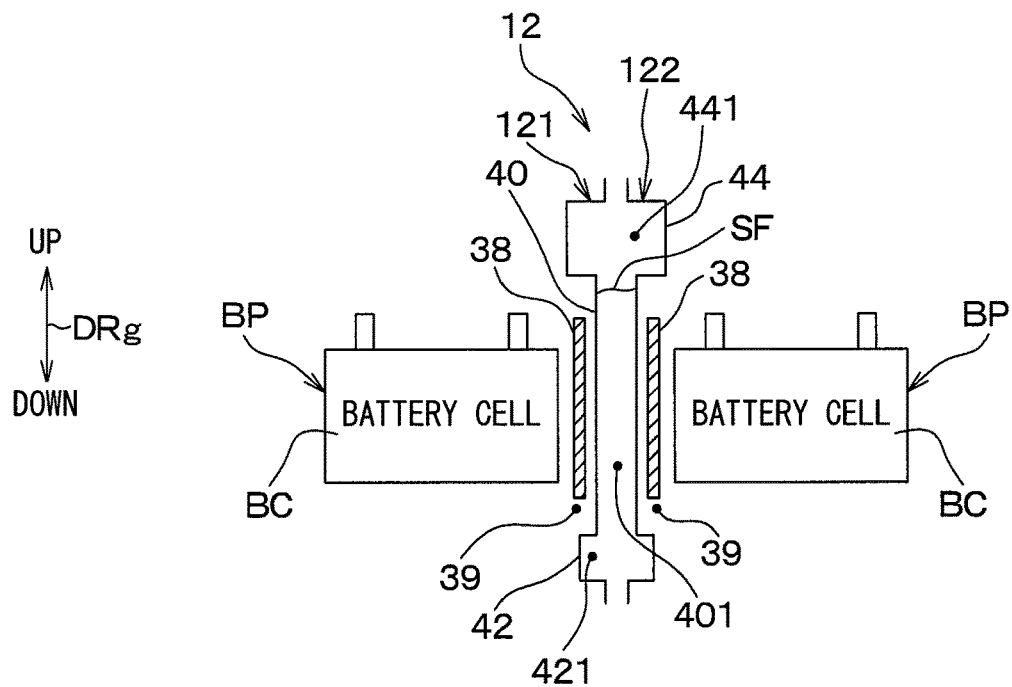
FIG. 44 is a cross-sectional view schematically showing a cross section taken along the line II-II of FIG. 1 in a third modification as another embodiment, and corresponds to FIG. 2 of the first embodiment.

The evaporator 12 shown in FIGS. 42 and 43 is configured by the multi-hole pipe 50 and the two piping members 51 and 52 as in the second embodiment, but may be configured by a pair of plate members 121 and 122 stacked on each other as shown in FIG. 44. The pair of plate members 121 and 122 shown in FIG. 44 is the same as the pair of plate members 121 and 122 shown in FIG. 2.

Figure 45:
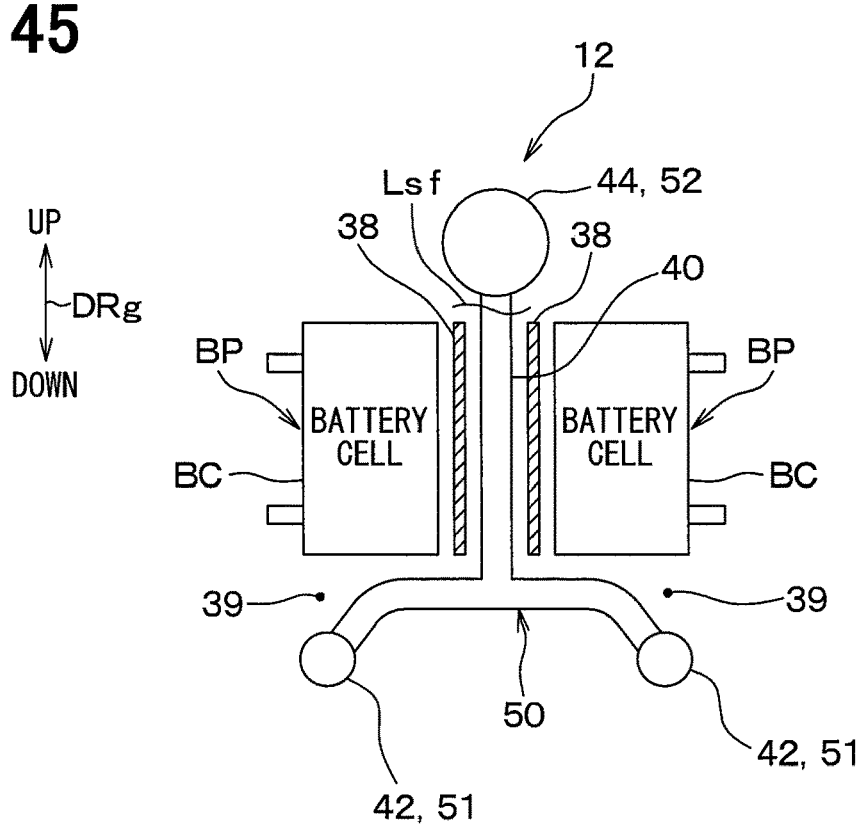
FIG. 45 is a cross-sectional view schematically showing a cross section taken along the line II-II of FIG. 1 in a fourth modification as another embodiment, and corresponds to FIG. 5 of the second embodiment.

Although the evaporator 12 shown in FIGS. 42 and 43 has one liquid supply portion 42, the evaporator 12 may have multiple liquid supply portions 42 as shown in FIG. 45. The evaporator 12 shown in FIG. 45 specifically includes the two liquid supply portions 42, and the two liquid supply portions 42 are connected to the fluid evaporation portion 40. Therefore, the liquid-phase working fluid is supplied to the fluid evaporation portion 40 from both of the two liquid supply portions 42.

Figure 46:
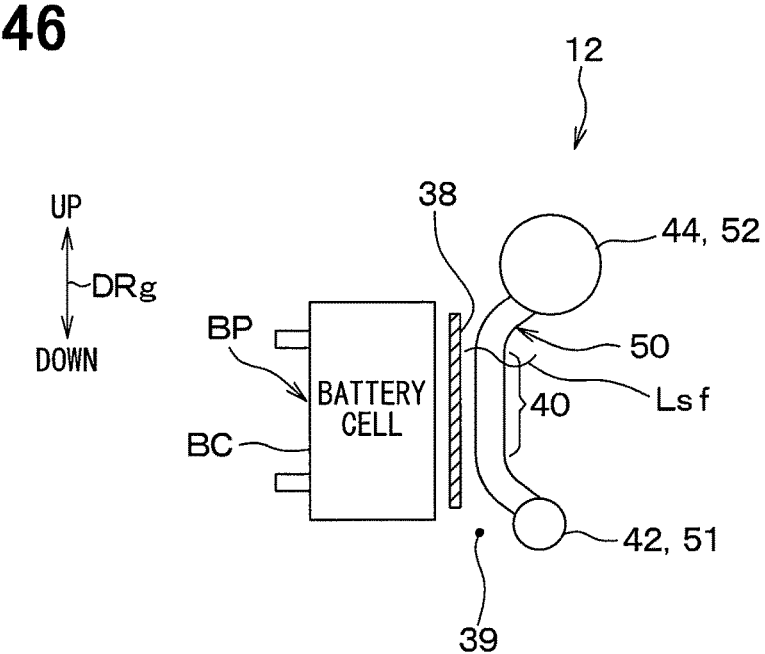
FIG. 46 is a cross-sectional view schematically showing a cross section taken along the line II-II of FIG. 1 in a fifth modification as another embodiment, and corresponds to FIG. 5 of the second embodiment.

Although the multi-hole pipe 50 included in the evaporator 12 of the second embodiment has the straight pipe shape along the vehicle vertical direction DRg as shown in FIGS. 5 and 6, the multi-hole pipe 50 may be bent as shown in FIG. 46. In the evaporator 12 shown in FIG. 46, the multi-hole pipe 50 is formed to bend, so that the liquid supply portion 42 and the fluid outflow portion 44 are disposed at positions apart from the assembled battery BP.

(10) In the embodiments described above, as shown in FIG. 1, the condenser 15 condenses the working fluid by a heat exchange between the refrigerant and the working fluid of the refrigeration cycle device 21, but this is an example. For example, the condenser 15 may include, in addition to a first heat exchanging unit for exchanging heat between the refrigerant and the working fluid, a second heat exchanging unit for condensing the working fluid by the heat exchange between the working fluid and air, such as outside air, in series or in parallel with the first heat exchanging unit. Alternatively, the condenser 15 may include the second heat exchanging unit without the provision of the first heat exchanging unit.

(11) In each of the embodiments described above, as shown in FIG. 3, all the evaporation channels 401 provided in the fluid evaporation portion 40 each have the flattened cross-sectional shape extending in the cell stacking direction DRs, but all the evaporation channels 401 do not need to have such a flattened cross-sectional shape.

(12) In each of the embodiments described above, the working fluid filled in the working fluid circuit 10 is, for example, a fluorocarbon refrigerant, but the working fluid in the working fluid circuit 10 is not limited to the CFC-based refrigerant. For example, other refrigerants, such as propane or $CO_2$, or other media having a phase change may be used as the working fluid filled in the working fluid circuit 10.

(13) In each of the embodiments described above, the device temperature control device 1 cools the assembled battery BP to perform temperature adjustment of the assembled battery BP, but the device temperature control device 1 may include a heating function for heating the assembled battery BP in addition to such a cooling function.

(14) In the fourteenth embodiment described above, as illustrated in FIG. 24, one evaporation channel 401 is provided for each stacking unit 60, but two or more evaporation channels 401 may be provided in the stacking unit 60 for each stacking unit 60. In short, at least one evaporation channel 401 of the multiple evaporation channels 401 included in the evaporator 12 may be provided in each of the multiple stacking units 60.

(15) In the fourteenth embodiment described above, as shown in FIG. 24, both the fluid inlet 422 and the fluid outlet 442 are provided on one side of the evaporator 12 in the cell stacking direction DRs, but the placement of the fluid inlet 422 and the fluid outlet 442 is not limited to the above configuration. For example, one of the fluid inlet 422 and the fluid outlet 442 may be provided on one side of the evaporator 12 in the cell stacking direction DRs, and the other may be provided on the other side of the evaporator 12 in the cell stacking direction DRs.

(16) In the fourteenth embodiment described above, the fluid outlet 442 shown in FIG. 24 is connected to the outflow channel 441 at a position closer to the upper side, but this is an example. For example, if the fluid outlet 442 is disposed above the partition communication hole 607b of FIG. 26 and coupled to the outlet channel 441, the fluid outlet 442 may not be coupled to a position upwardly of the outflow channel 441.

(17) In the fourteenth embodiment described above, as shown in FIG. 23, the liquid supply portion 42 and the fluid outflow portion 44 are disposed within a height range Hbp occupied by the assembled battery BP in the vehicle vertical direction DRg, but this is an example. For example, it is assumed that the liquid supply portion 42 is disposed outside the range Hbp downward. Alternatively, it is also envisaged that the fluid outflow portion 44 is disposed outside its range Hbp upwards.

(18) In the fourteenth embodiment described above, as shown in FIGS. 23 and 26, the assembled battery BP is disposed on both sides of the stacking unit 60 in the side normal direction DRa, but this is an example. For example, it is assumed that not two but one assembled battery BP is provided, and the assembled battery BP is provided only on one side of the stacking unit 60 in the side normal direction DRa. In this case, the upstream side channel 401d in the stacking unit 60 may be provided on the one side of the liquid supply portion 42 in the side normal direction DRa, and may not be provided on the other side where the assembled battery BP is not provided. The same also applies to the downstream side channel 401h.

(19) In the fourteenth embodiment described above, as shown in FIGS. 25 to 27, the partition portion of the evaporation channel partition wall 605 facing the evaporation channel 401 has no hole, but this is an example. The partition between the evaporation channels 401 need not be complete. For example, in order to generate a flow of the working fluid in the cell stacking direction DRs, a through hole or the like may be partially provided in the partition portion of the evaporation channel partition wall 605 to allow a flow of the working fluid in the cell stacking direction DRs to some extent.

(20) In the fourteenth embodiment described above, as shown in FIGS. 24 to 27, each of the multiple stacking units 60 has a block shape formed by brazing, but a manufacturing method of the stacking unit 60 is not limited. For example, the stacking unit 60 may be manufactured by laminating plate members as shown in FIG. 3. Alternatively, the stacking unit 60 may have a tube structure mainly manufactured by a tube formed by extrusion molding.

(21) In the fourteenth embodiment described above, as shown in FIG. 26, the supply side wall portion 606 is formed so as to separate between the pair of upstream side channels 401d and the supply channel 421, and to separate between the evaporation intermediate channel 401c and the supply channel 421, but this is an example. The supply side wall portion 606 may separate at least the upstream side channel 401d of the evaporation channel 401 and the supply channel 421.

Figure 47:
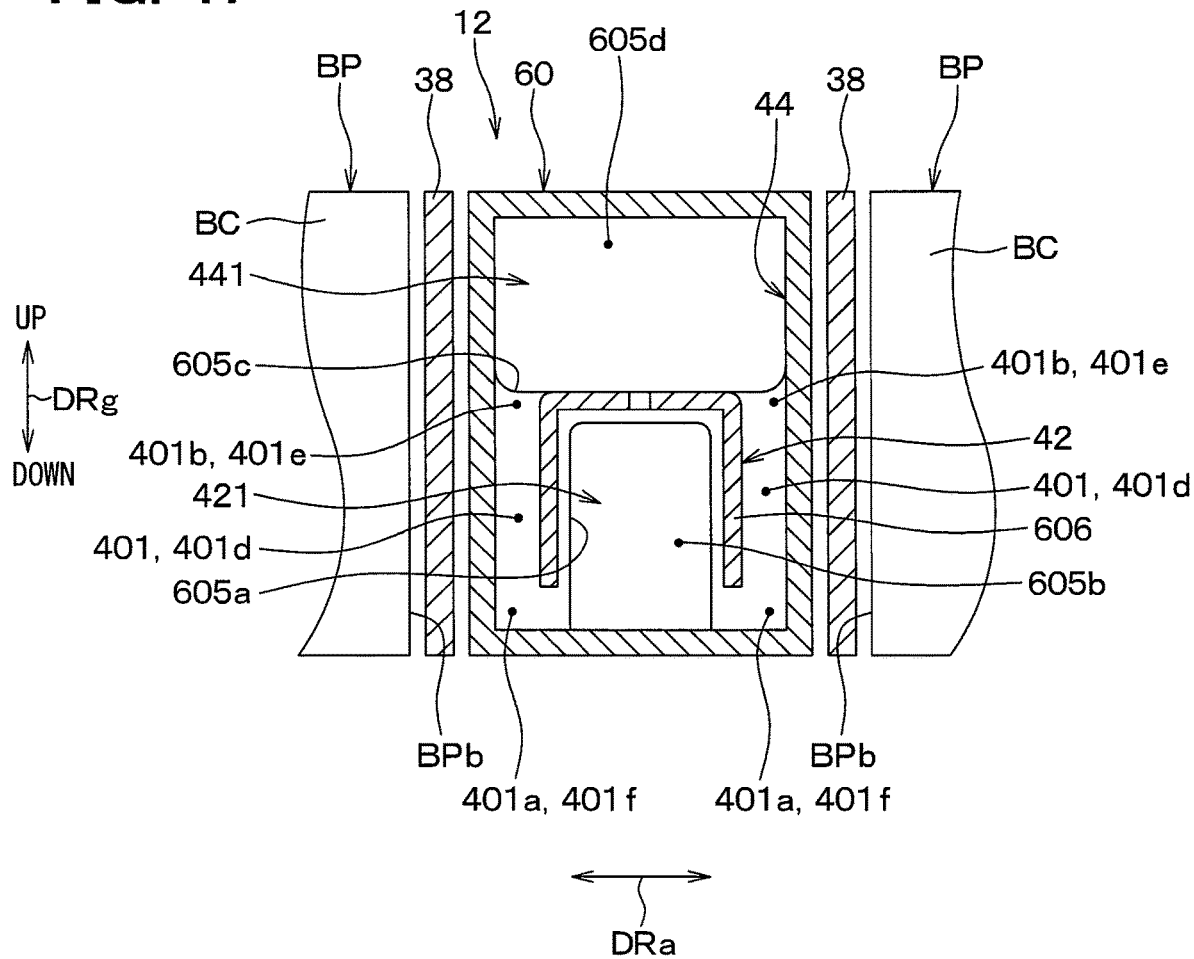
FIG. 47 is a cross-sectional view schematically showing a cross section of a stacking unit taken along a plane with a cell stacking direction as a normal direction in one modification of the fourteenth embodiment.

(22) In the fourteenth embodiment described above, as shown in FIG. 26, the evaporation channel 401 has the three channels including the evaporation intermediate channel 401c, the upstream side channel 401d, and the downstream side channel 401h, but it can also be assumed that the evaporation channel 401 does not have one or two of the three channels. For example, as shown in FIG. 47, a configuration in which the evaporation channel 401 does not have the evaporation intermediate channel 401c and the downstream side channel 401h among the above three channels, but has only the upstream side channel 401d can be assumed. In the example of FIG. 47, the upper end 401e of the upstream side channel 401d is directly connected to the outflow channel 441.

(23) In the second embodiment described above, as shown in FIG. 6, the outflow channel in the downstream side piping member 52 has a longer length in the vertical direction, a larger channel cross-sectional area, and a higher upper end as the outflow channel approaches the fluid outlet 442 along the cell stacking direction DRs. The fluid outlet 442 is connected to the upper end of the downstream side piping member 52.

Figure 48:
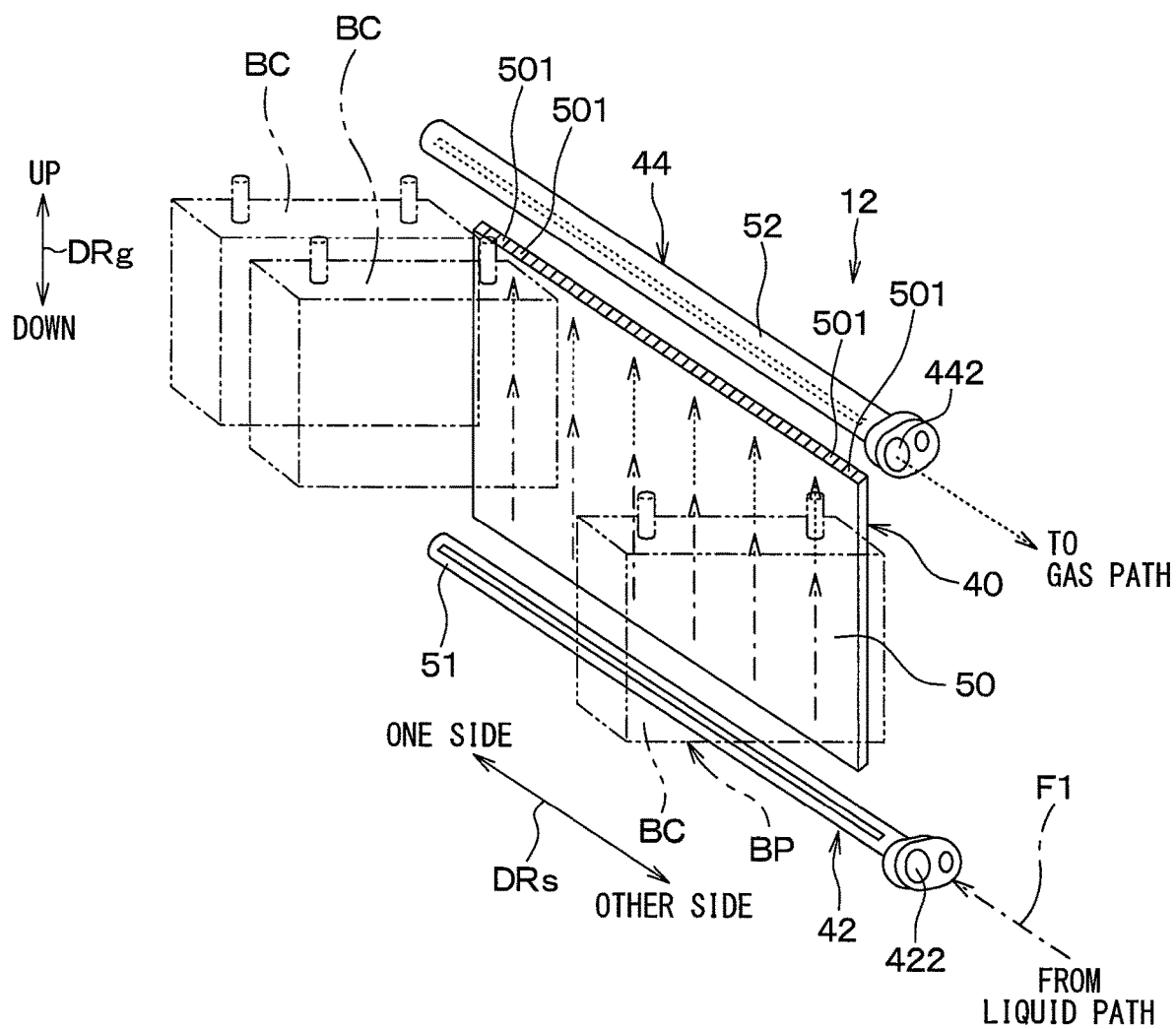
FIG. 48 is an exploded perspective view showing a schematic configuration of an evaporator according to a 23rd modification, and corresponds to FIG. 6 of the second embodiment.

However, the above configuration is not necessarily required. For example, as shown in FIG. 48, the outflow channel in the downstream side piping member 52 may have the same length in the vertical direction along the cell stacking direction DRs, a constant channel cross-sectional area, and a constant height of the upper end.

Figure 49:
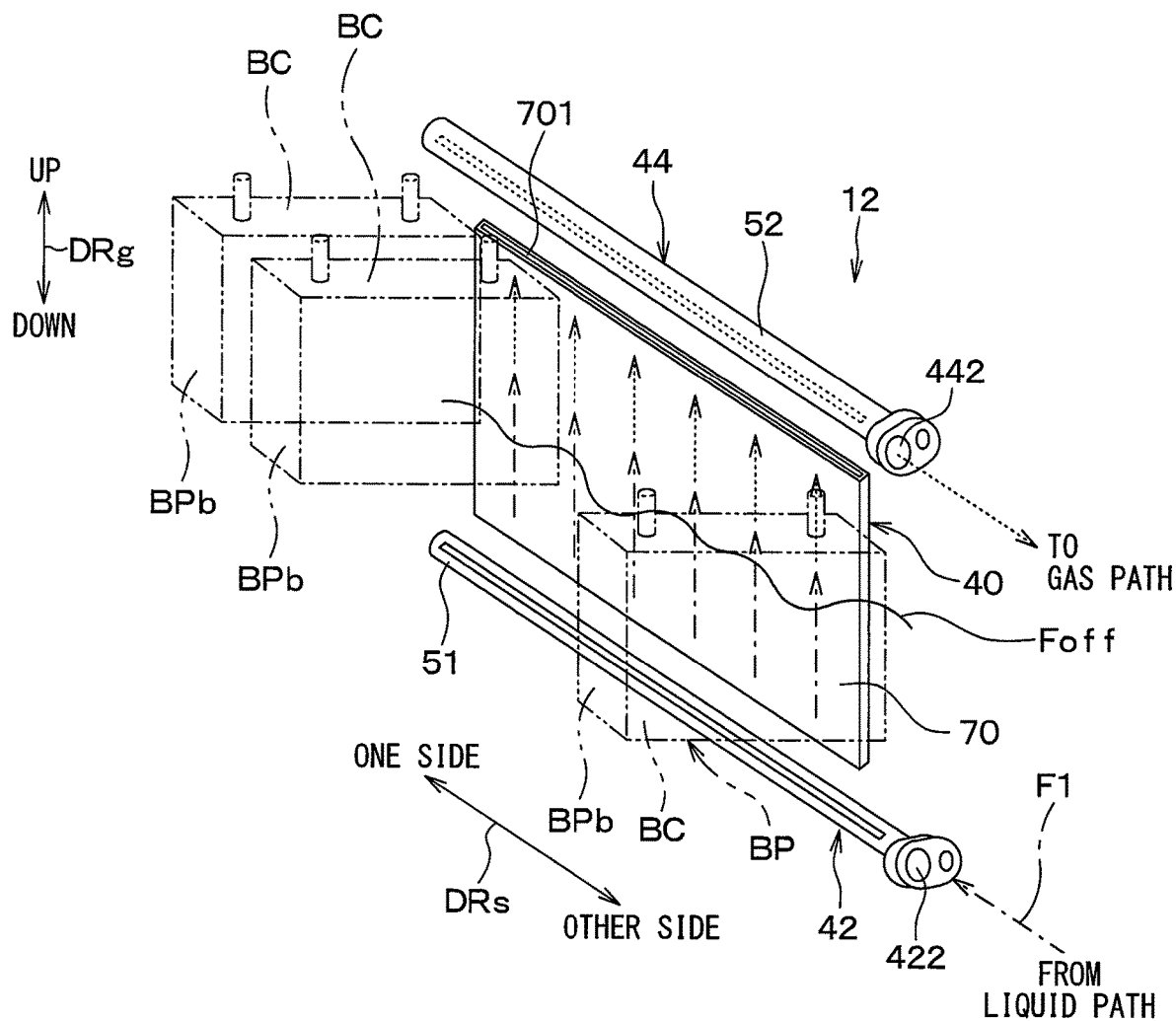
FIG. 49 is an exploded perspective view showing a schematic configuration of an evaporator according to a 24th modification, and corresponds to FIG. 6 of the second embodiment.

(24) In the second embodiment described above and Modification 23 described above, the fluid evaporation portion 40 is configured by one multi-hole pipe 50. However, the above configuration is not necessarily required. For example, as shown in FIG. 49, a pipe 70 having only one hole may be employed instead of the multi-hole pipe 50.

The pipe 70 is a flattened pipe formed by extrusion or the like. The pipe 70 is a plate member formed so as to extend in a plane shape in the vehicle vertical direction DRg and the cell stacking direction DRs, and has one end as a lower end and the other end as an upper end. Only one communication hole 701 is defined inside the pipe 70. The communication hole 701 is provided as one evaporation channel 401. The number of the communication holes 701 as the evaporation channel 401 is smaller than the number of the battery cells BC included in the assembled battery BP.

The communication hole 701 communicates from the one end to the other end of the pipe 70, and is opened at each of the one end and the other end. In short, the communication hole 701 is a through hole extending from one end to the other end of the pipe 70. The communication hole 701 has only one opening at the one end of the pipe 70, and communicates with the supply channel in the liquid supply portion 42 through the opening. The communication hole 701 has only one opening at the other end of the pipe 70, and communicates with the outflow channel in the fluid outflow portion 44 through the opening.

The communication holes 701 overlap with the battery lateral surfaces BPb of all the battery cells BC in the direction orthogonal to the plate surface. In this example, the plate surface orthogonal direction is a direction orthogonal to the plate surface of the pipe 70.

Even in the structure in which the fluid evaporation portion 40 has only one communication hole 701 as in the present example, the supply channel in the liquid supply portion 42 is provided so that the refrigerant passes in the vicinity of the battery lateral surface BPb of all the battery cells BC. More specifically, the liquid supply portion 42 located at a position where the assembled battery BP is more insulated from heat overlaps with a region directly below the battery lateral surface BPb of all the battery cells BC in the direction orthogonal to the plate surface. The above configuration is not limited to the present example, and applies to the first to thirteenth embodiments and modifications of the embodiments.

Therefore, all the battery cells BC are substantially uniformly cooled by the refrigerant passing through the pipe 70, and partial dryout is reduced. FIG. 48 shows a stopping liquid surface Foff of the working fluid when the working fluid in the communication hole 701 does not boil.

Figure 50:
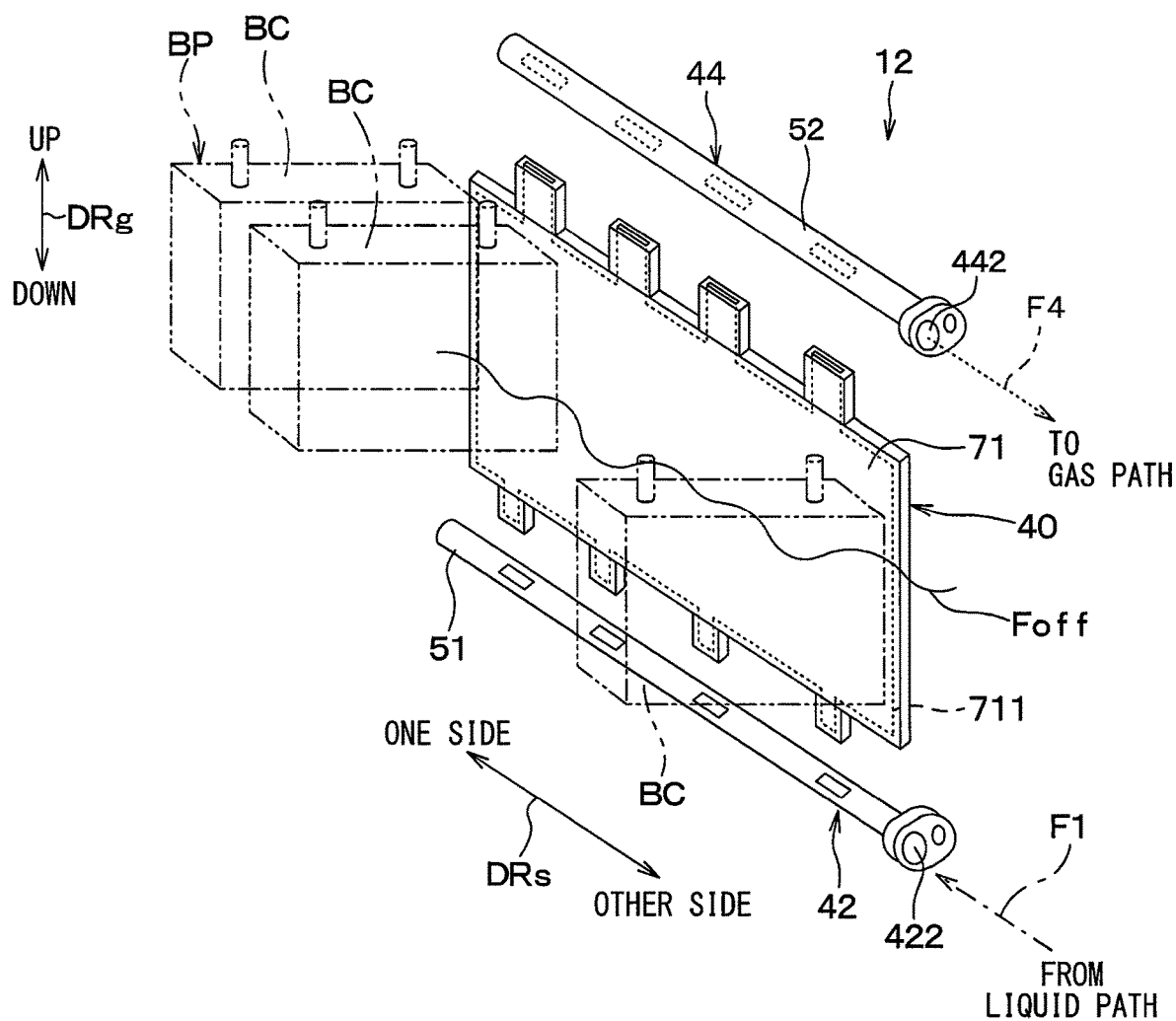
FIG. 50 is an exploded perspective view showing a schematic configuration of an evaporator according to a 25th modification, and corresponds to FIG. 6 of the second embodiment.

(25) In Modification 24 described above, the communication hole 701 provided in the pipe 70 has only one opening at each of the one end and the lower end of the pipe 70. However, the above configuration is not necessarily required. For example, as shown in FIG. 50, a pipe 71 may be employed instead of the pipe 70.

The pipe 71 is a flattened pipe formed by extrusion or the like. The pipe 71 has a rectangular plate, four upper protrusion portions extending upward from an upper end side of the rectangular shape, and four lower protrusion portions extending downward from a lower end side of the rectangular shape.

Only one communication hole 711 is defined inside the pipe 71. The communication hole 711 is provided as one evaporation channel 401. The number of the communication holes 711 as the evaporation channel 401 is smaller than the number of the battery cells BC included in the assembled battery BP.

The communication hole 711 communicates from a lower end of each of the four lower ends to the upper end of each of the upper protrusion portions, and is opened at each of the four lower ends and the four upper ends. Therefore, the communication hole 711 is a series of through holes extending from the four lower ends to the four upper ends of the pipe 71. The communication hole 711 has only one opening at each of the four lower ends of the pipe 71, and communicates with the supply channel in the liquid supply portion 42 through the four openings in total. The communication hole 711 has only one opening at each of the four upper ends of the pipe 71, and communicates with the outflow channel in the fluid outflow portion 44 through the four openings in total.

The communication holes 711 overlap with the battery lateral surfaces BPb of all the battery cells BC in the direction orthogonal to the plate surface. All the battery cells BC are substantially uniformly cooled by the refrigerant passing through the pipe 71, and partial dryout is reduced. The reason for the above operation is the same as that of Modification 24. FIG. 48 shows a stopping liquid surface Foff of the working fluid when the working fluid in the communication holes 711 does not boil.

Figure 51:
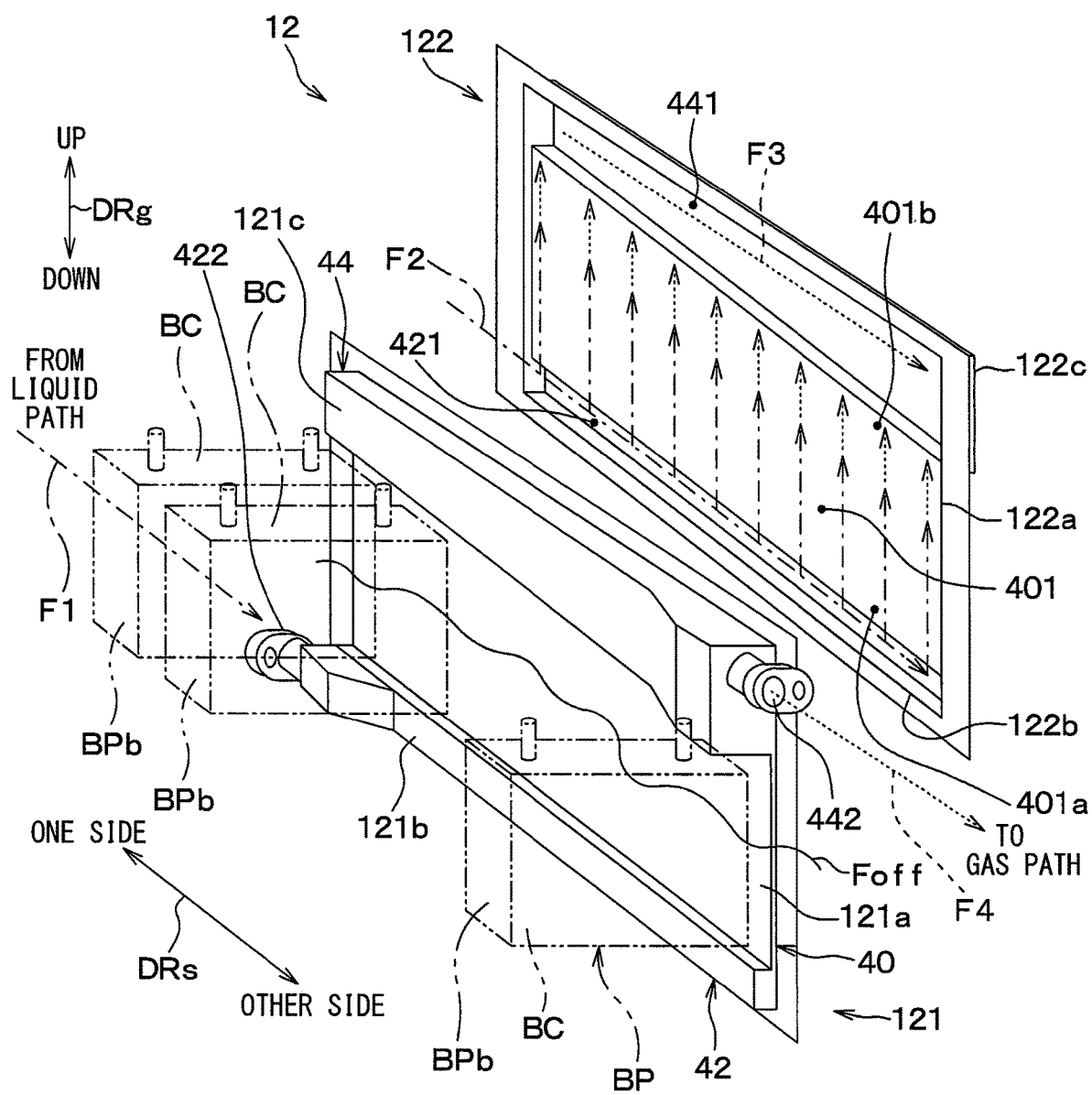
FIG. 51 is an exploded perspective view showing a schematic configuration of an evaporator according to a 26th Modification, which corresponds to FIG. 3 of the first embodiment.

(26) In the first embodiment described above, the inside of the fluid evaporation portion 40 is partitioned by the multiple protrusion portions 122d into multiple evaporation channels 401. However, the above configuration is not necessarily required. For example, as shown in FIG. 51, the evaporator 12 of the first embodiment may be modified to eliminate all of the multiple protrusion portions 122d. In this case, only one evaporation channel 401 is provided inside the fluid evaporation portion 40.

The channel cross section of the single evaporation channel 401 has a flattened cross-sectional shape extending in the cell stacking direction DRs. In addition, each evaporation channel 401 has an lower end of the evaporation channel 401 as an upstream end 401a, and an upper end of the evaporation channel 401 as a downstream end 401b. In the evaporation channel 401, the working fluid flows from its upstream end 401a to its downstream end 401b, as indicated by dashed-dotted arrows and dashed arrows in FIG. 51. That is, in the evaporation channel 401, the working fluid flows from the lower side to the upper side. The supply channel 421 is connected to the upstream end 401a of the evaporation channel 401, and the outflow channel 441 is connected to the downstream end 401b of the evaporation channel 401.

The evaporation channel 401 overlaps with the battery lateral surfaces BPb of all the battery cells BC in the direction orthogonal to the plate surface. In this example, the plate surface orthogonal direction is a direction orthogonal to the plate surface of the plate member 1220.

In addition, as in this example, even in the structure in which only a single evaporation channel 401 is provided inside the fluid evaporation portion 40, the supply channel in the liquid supply portion 42 is provided so that the refrigerant passes in the vicinity of the battery lateral surface BPb of all the battery cells BC. More specifically, the liquid supply portion 42 located at a position where the assembled battery BP is more insulated from heat overlaps with a region directly below the battery lateral surface BPb of all the battery cells BC in the direction orthogonal to the plate surface. The above configuration is not limited to the present example, and applies to the first to thirteenth embodiments and modifications of the embodiments.

Therefore, all the battery cells BC are substantially uniformly cooled by the refrigerant passing through the evaporation channel 401, and partial dryout is reduced. FIG. 51 shows a stopping liquid surface Foff of the working fluid when the working fluid in the evaporation channel 401 is not boiling.

(27) In the fourteenth to twenty-second embodiments and Modification 22 described above, the multiple stacking units 60 are disposed in the cell stacking direction DRs, but the above configuration is not necessarily required. The evaporator may have only one unit instead of the multiple stacking units 60.

Also in that case, the one unit is disposed in front of all the battery cells BC with respect to the battery lateral surface of the battery cells BC. Therefore, the evaporation channel 401 in the unit overlaps with the battery lateral surfaces BPb of all the battery cells BC in the direction orthogonal to the plate surface.

In other words, as compared with the width of each stacking unit in the cell stacking direction DRs according to the fourteenth to twenty-second embodiments and Modification 22, the width of the one stacking unit in the same direction in this example is much wider.

Like the fourteenth to twenty-second embodiments and Modification 22, the liquid supply portion 42 is formed at a position more insulated from the heat from the assembled battery BP. The supply channel in the liquid supply portion 42 is provided so that the refrigerant passes in the vicinity of the battery lateral surfaces BPb of all the battery cells BC.

With the above structure, even in a structure in which only the evaporation channel 401 in a single unit is provided inside the fluid evaporation portion 40, all the battery cells BC are substantially uniformly cooled by the refrigerant passing through the evaporation channel 401, and partial dryout is reduced.

Figure 52:
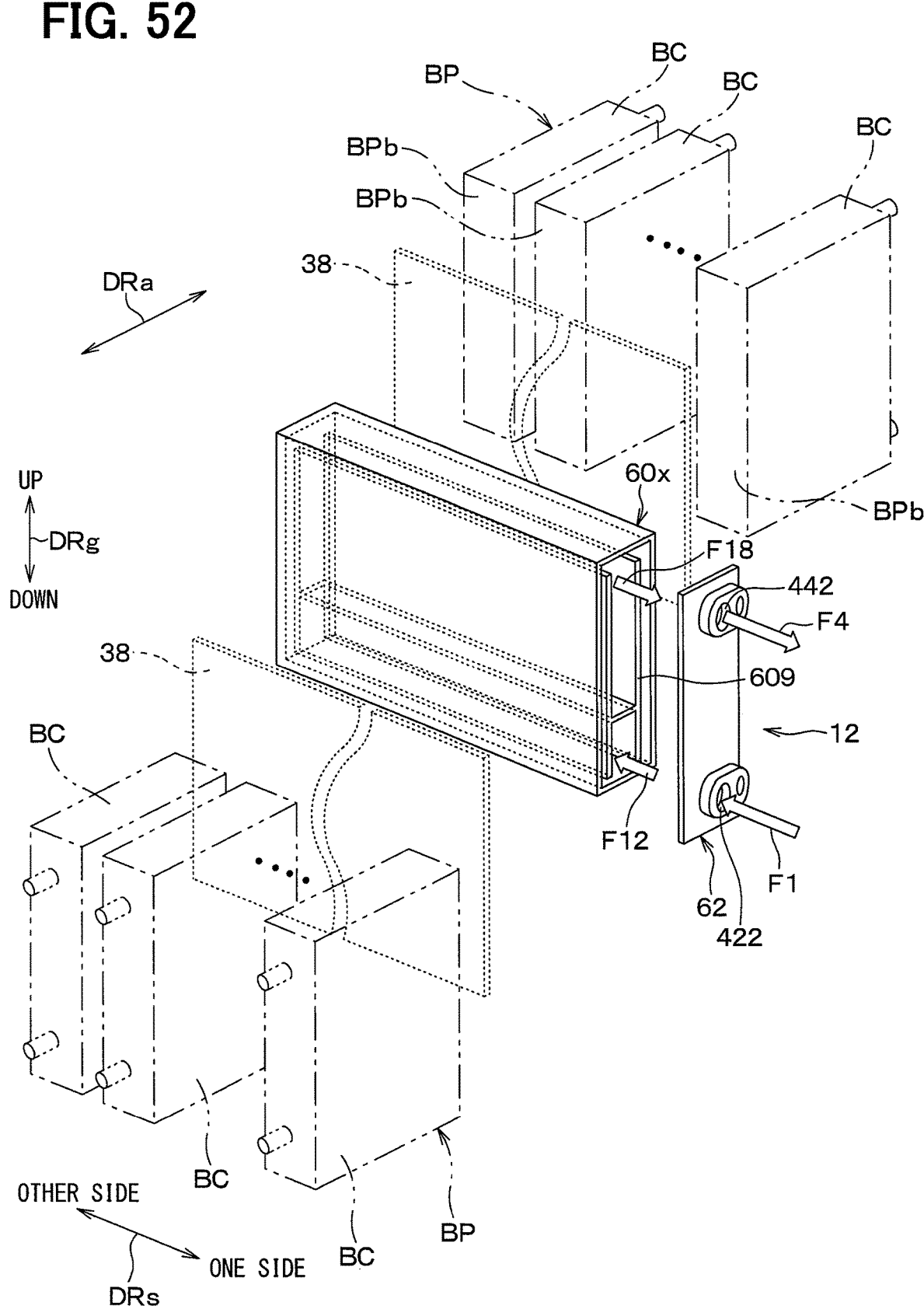
FIG. 52 is an exploded perspective view showing a schematic configuration of an evaporator according to a 27th Modification, which corresponds to FIG. 24 of the fourteenth embodiment.
Figure 53:
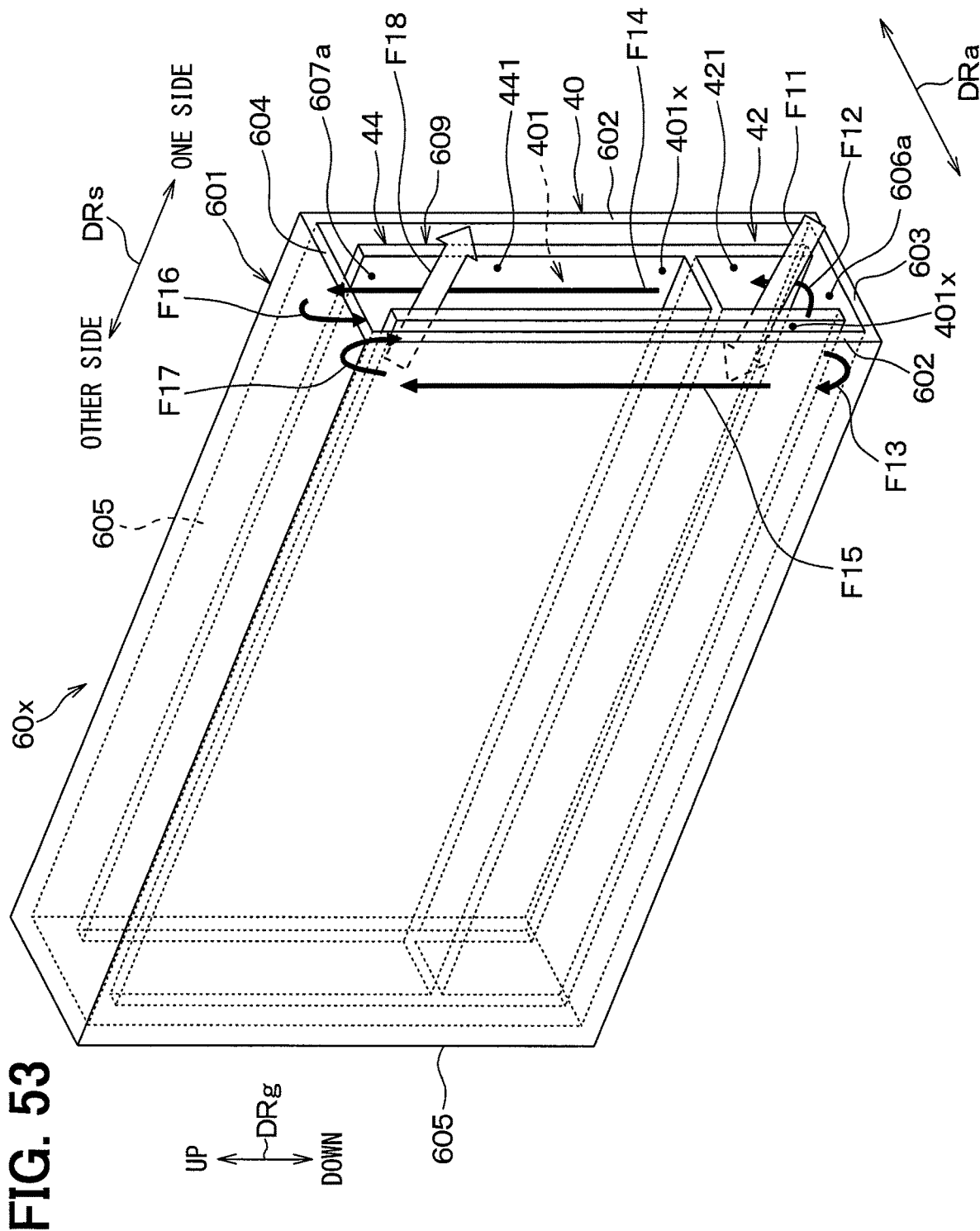
FIG. 53 is a perspective view showing an excerpt of a unit configuring the evaporator of FIG. 52, that is, a perspective view showing the unit as a single unit.
Figure 54:
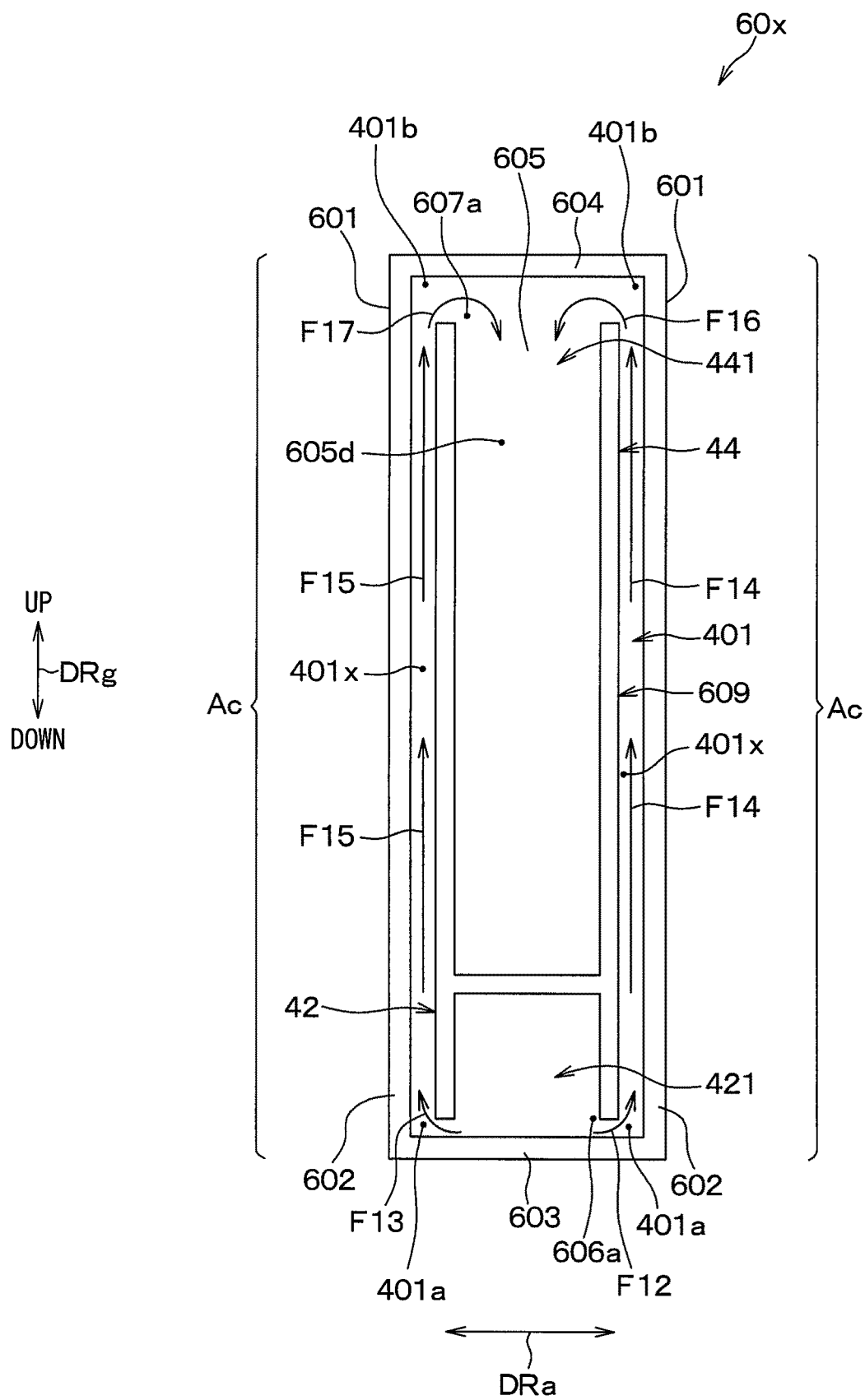
FIG. 54 is a front view of the unit of FIG. 53 as viewed from one side in the cell stacking direction.

For example, FIG. 52, FIG. 53, and FIG. 54 show an example of an evaporator in which multiple stacking units 60 in the fourteenth embodiment are replaced with a single unit 60x. This example will be described below. Hereinafter, in the stacking unit 60 and a unit 60x, elements to which the same reference numerals are allocated are equivalent elements.

As shown in FIG. 52, the unit 60x extends from the battery lateral surface BPb of the battery cell BC at one end in the cell stacking direction DRs to the battery lateral surface BPb of the battery cell BC at the other end in the cell stacking direction DRs.

At the same time, the unit 60x has a hollow rectangular parallelepiped shape formed so as to extend in the vehicle vertical direction DRg. The two unit lateral surfaces 601 of the unit 60x extend along the cell stacking direction DRs and the vehicle vertical direction DRg, but the length of the cell stacking direction DRs is much longer than that of the fourteenth embodiment. In fact, each of the two unit lateral surfaces 601 is disposed in front of all the battery cells BC disposed on the lateral surface with respect to the battery lateral surface of the battery cells BC. In other words, the unit 60x is provided so as to correspond to the multiple battery cells BC in a one-to-many manner.

The unit 60x has, as an outer wall of the unit 60x, a pair of side walls 602, a lower wall 603, an upper wall 604, and one evaporation channel partition wall 605, similarly to the fourteenth embodiment.

In the cell stacking direction DRs, one side of the unit 60x is opened, and the other side of the unit 60x is covered with an evaporation channel partition wall 605. Unlike the fourteenth embodiment, the evaporation channel partition wall 605 does not have a through hole, and the inside of the unit 60x is closed to be liquid-tight and air-tight. The open one side of the unit 60x is covered with the end plate 62.

The unit 60x has an inner wall portion 609 in which the supply side wall portion 606 and the outflow side wall portion 607 in the fourteenth embodiment are integrated together. The inner wall portion 609 is fixed to the evaporation channel partition wall 605, and is accommodated in an internal space of the stacking unit 60 surrounded by the outer walls 602, 603, 604, and 605 of the unit 60x.

The inner wall portion 609 includes a configuration of the supply side wall portion 606 and the outflow side wall portion 607 of the fourteenth embodiment. However, a top surface of the supply side wall portion 606 and a bottom surface of the outflow side wall portion 607 are integrally joined.

Therefore, the evaporation channel 401 provided in the unit 60x has a pair of sub-evaporation channels 401x separated from each other instead of the evaporation intermediate channel 401c, the pair of upstream side channels 401d, and the pair of downstream side channels 401h of the fourteenth embodiment.

The pair of sub-evaporation channels 401x are provided as supply-side interposed channels disposed so as to be interposed between the battery lateral surface BPb and the supply channel 421 and between the battery lateral surface BPb and the outflow channel 441. Each of the pair of sub-evaporation channels 401x connects the supply channel 421 and the outflow channel 441. In each of the pair of sub-evaporation channels 401x, the working fluid flows from an upstream end 401a which is a lower end of the sub-evaporation channel 401x to a downstream end 401b which is an upper end of the sub-evaporation channel 401x.

In this manner, the inner wall portion 609 is formed so as to separate the pair of sub-evaporation channels 401x, the supply channel 421, and the outflow channel 441 from each other. In this example, the partition communication hole 607b and the bubble discharge hole 606b in the fourteenth embodiment are not provided in the inner wall portion 609.

In the evaporator 12 configured as described above, similarly to the fourteenth embodiment, the working fluid flows as indicated by arrows F1, F11, F12, F13, F14, F15, F16, F17, F18, and F4 shown in FIGS. 53 and 54.

Specifically, the liquid-phase working fluid from the liquid path 18 flows from the fluid inlet 422 into the supply channel 421 as indicated by an arrow F1. The inflow working fluid flows from one side of the cell stacking direction DRs to the other side in the supply channel 421, as indicated by the arrow F11. The working fluid in the supply channel 421 flows from the supply side opening 606a to the pair of sub-evaporation channels 401x as indicated by the arrows F12 and F13, respectively.

In each sub-evaporation channel 401x, the working fluid flows from the lower side to the upper side as indicated by the arrows F14 and F15, and is boiled by the heat of the two assembled batteries BP. For that reason, in each of the sub evaporation channels 401x, the working fluid is in the gas phase only or in the gas-liquid two-phase, and flows into the outflow channel 441 from the outflow side opening 607a.

Figure 55:
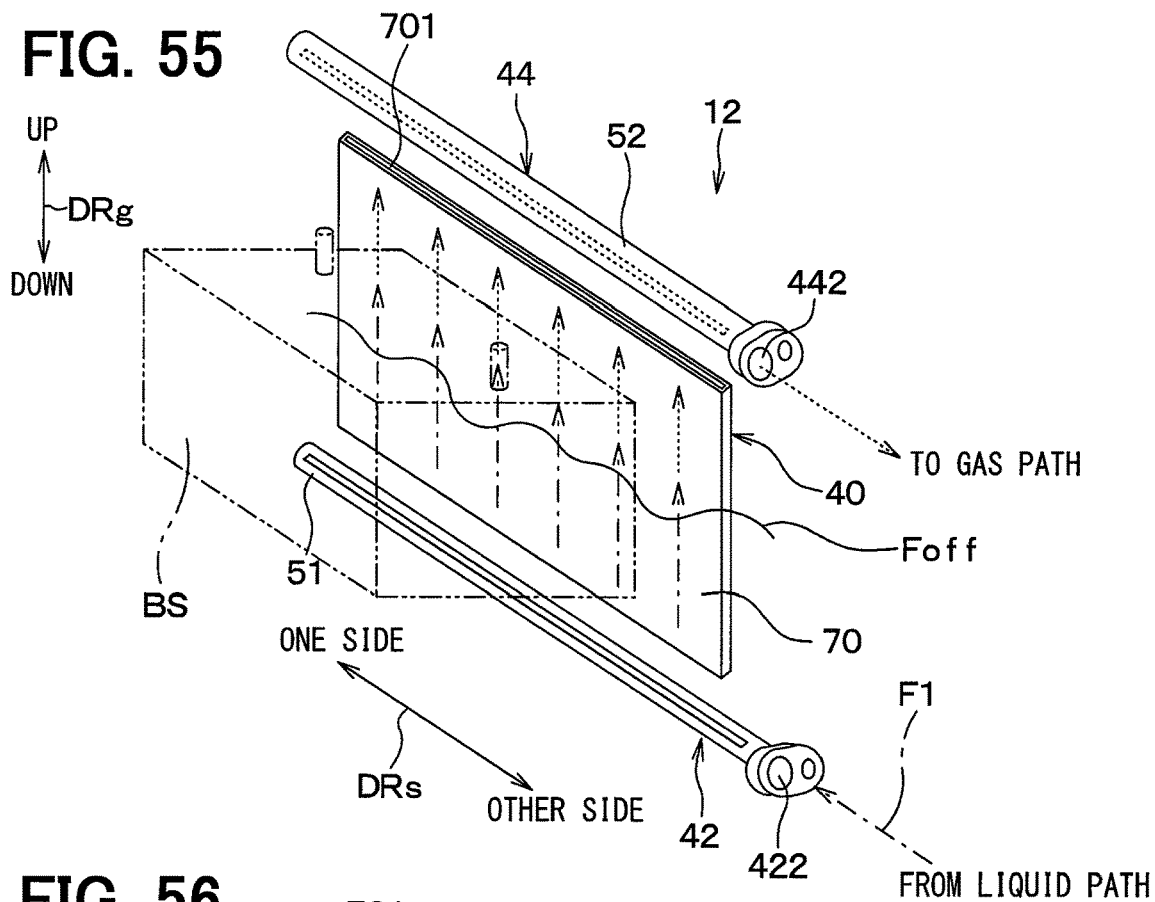
FIG. 55 is an exploded perspective view showing a schematic configuration of an evaporator according to a 28th modification, and corresponds to FIG. 6 of the second embodiment.

(28) In each of the embodiments and modifications described above, an assembled battery BP having multiple battery cells BC is exemplified as a battery cooled by a refrigerant. However, the battery to be cooled need not be an assembled battery. In each of the embodiments and modifications described above, the battery to be cooled may be replaced with a single cell having only one battery cell. FIG. 55 shows an example in which the assembled battery BP of Modification 24 is replaced with a single cell BS.

Even in such a case, the liquid supply portion is disposed at a position more insulated from the heat of the battery than the fluid evaporation portion. Therefore, the liquid-phase working fluid can be supplied to the evaporation channel while maintaining the liquid-phase working fluid in the supply channel in a state more insulated from the heat from the battery BS, and the supplied working fluid can be evaporated in the evaporation channel. As a result, the occurrence of dryout can be reduced. Further, since the liquid supply portion is disposed below the fluid outflow portion, air bubbles causing dryout can be inhibited from stagnating in the supply channel.

(29) In the first to fifth embodiments and the modifications of those embodiments described above, the surface adjacent to the surface on which the electrode is disposed among the six surfaces of each of the battery cells BC having a rectangular parallelepiped shape is closest to the fluid evaporation portion 40 and most easily exchanges heat with the refrigerant inside the fluid evaporation portion 40.

Figure 56:
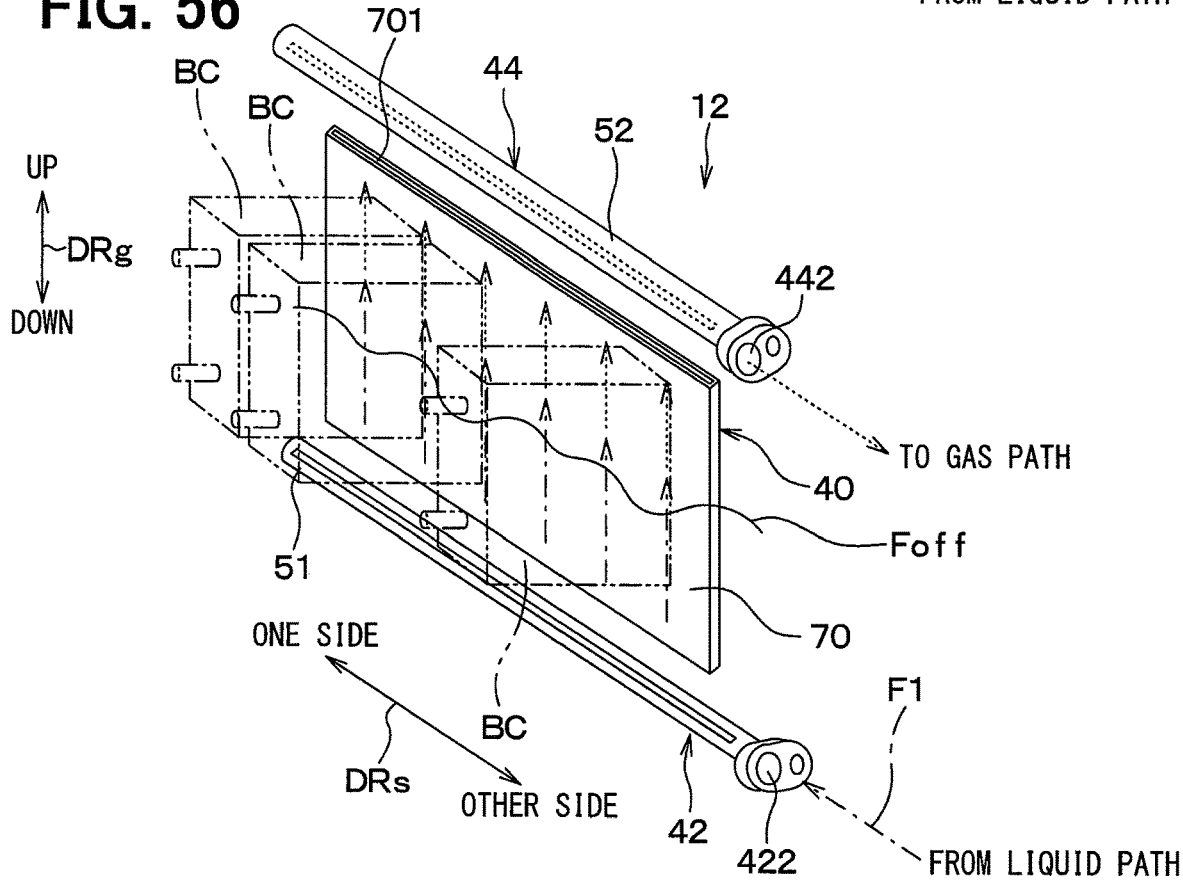
FIG. 56 is an exploded perspective view showing a schematic configuration of an evaporator according to a 29th modification, which corresponds to FIG. 6 of the second embodiment.

However, the first to fifth embodiments and the modifications of those embodiments described above may be modified so that the surface on the opposite side to the surface on which the electrodes are disposed among the six surfaces of each of the battery cells BC having a rectangular parallelepiped shape is closest to the fluid evaporation portion 40 and most easily exchanges heat with the refrigerant inside the fluid evaporation portion 40. FIG. 56 shows an example in which such a modification is made to Modification 24. In this example, the surface opposite to the surface on which the electrodes are disposed among the six surfaces of each of the battery cells BC having a rectangular parallelepiped shape is in contact with the surface of the pipe 70.

Figure 57:
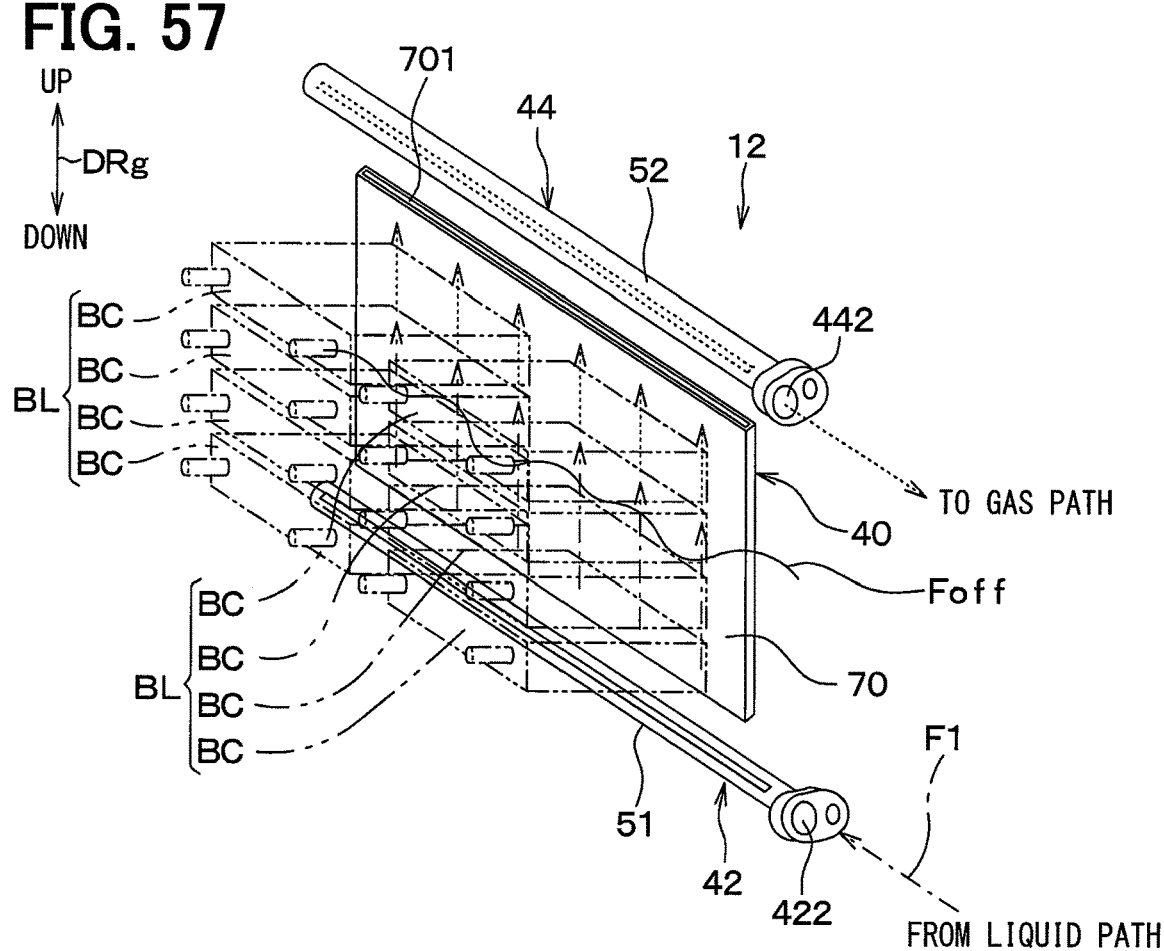
FIG. 57 is an exploded perspective view showing a schematic configuration of an evaporator in a 230th modification, and corresponds to FIG. 6 of the second embodiment.

(30) The placement of the battery cells BC may be changed as shown in FIG. 57 with respect to Modification 24 described above. In this example, the multiple battery cells BC have multiple cell rows BL. Each of the multiple cell rows BL has multiple battery cells BC stacked in a row in the vehicle vertical direction DRg. The multiple cell rows BL are disposed in a direction orthogonal to the vehicle vertical direction DRg. Therefore, in this example, the stacking direction of the battery cells is the vehicle vertical direction DRg, and is also the direction orthogonal to the vehicle vertical direction DRg. The modification as in the present example is not limited to Modification 24 described above, and can be applied to any of the first to twenty-second embodiments and Modifications 1 to 29.

(31) In each of the embodiments described above, although a wick is not provided in the evaporation channel 401, a wick may be provided in the evaporation channel 401, and the liquid-phase working fluid may be guided to the outflow channel 441 side in the evaporation channel 401 by a capillary phenomenon of the wick.

(32) In each of the embodiments described above, the evaporation channel 401 does not include an internal fin structure having internal fins that facilitate heat exchange of the working fluid, but such an internal fin structure may be included to facilitate evaporation of the working fluid flowing through the evaporation channel 401.

It should be noted that the present disclosure is not limited to the embodiments described above, and includes various modifications and variations within the same range. The above embodiments are not independent of one another, and can be appropriately combined except when the combination is obviously impossible.

Further, in each of the above-mentioned embodiments, it goes without saying that components of the embodiment are not necessarily essential except for a case in which the components are particularly clearly specified as essential components, a case in which the components are clearly considered in principle as essential components, and the like.

Further, in each of the embodiments described above, when numerical values such as the number, numerical value, quantity, range, and the like of the constituent elements of the embodiment are referred to, except in the case where the numerical values are expressly indispensable in particular, the case where the numerical values are obviously limited to a specific number in principle, and the like, the present disclosure is not limited to the specific number. In the above-described respective embodiments, when a material, a shape, and a positional relationship of the configuration elements are described, the configuration elements are not limited to the material, the shape, and the positional relationship, except when the configuration elements are particularly specified and are limited to a specific material, shape, and positional relationship in principle.

(Overview)

According to a first aspect shown in a part or whole of the above-described respective embodiments, in the evaporation channel, the working fluid flows from the upstream end to the downstream end. The liquid supply portion is disposed at a position more insulated from the heat of the battery than the fluid evaporation portion is.

According to a second aspect, the at least one battery cell is a plurality of battery cells, the battery is an assembled battery, and the at least one evaporation channel is a plurality of evaporation channels. The plurality of evaporation channels are arranged in a stacking direction (DRs) of the battery cells. The fluid evaporation portion evaporates the working fluid flowing in the plurality of evaporation channels with heat of the assembled battery. The upstream ends of the plurality of evaporation channels are connected to the supply channel. The liquid supply portion distributes and supplies the working fluid in liquid phase from the supply channel to each of the plurality of evaporation channels. The downstream ends of the plurality of evaporation channels are connected to the outflow channel. The fluid outflow portion discharges the working fluid which has flowed from each of the plurality of evaporation channels into the outflow channel.

Figure 58:
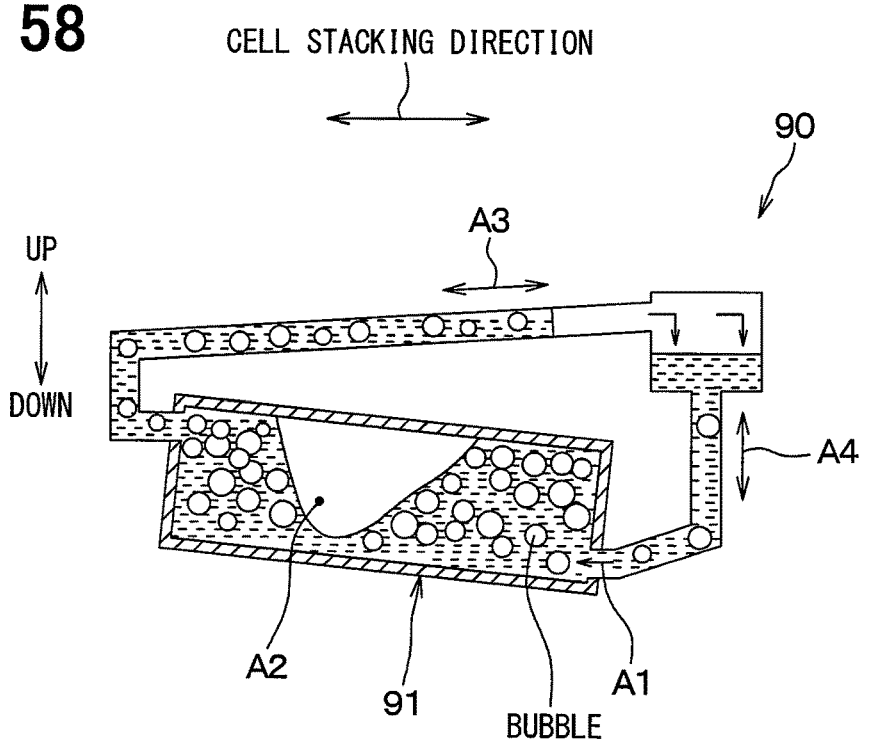
FIG. 58 is a diagram illustrating a problem to be solved by the present disclosure, and is a cross-sectional view schematically showing a cross section of a battery temperature adjusting device including an evaporator.

As shown in FIG. 58, in the evaporator 91, which is the temperature regulating unit of the battery temperature adjusting device 90 disclosed in Patent Literature 1, the liquid-phase working fluid is supplied from one end in the cell stacking direction as indicated by an arrow A1, and the working fluid flows toward the other end in the cell stacking direction. In addition, the working fluid flows in this manner while evaporating due to the heat from each battery cell. For example, in the cooling of the battery cells located on the most downstream side of the working fluid flow in the evaporator 91, the working fluid in the evaporator 91 is heated by the other battery cells in the supply path until the working fluid reaches a position where the working fluid is vaporized by the heat of the battery cells on the most downstream side.

In such a structure in which the working fluid flows in the cell stacking direction while sequentially receiving the heat from each of the battery cells, the working fluid boils violently in the evaporator 91, and dryout in which the liquid-phase working fluid does not exist may occur partially in the evaporator 91. The dryout occurs partially in the evaporator 91 due to the boiling pressure of the working fluid, and even if the dryout occurs, the circulation of the working fluid continues throughout the battery temperature adjusting device 90. In FIG. 58, a range in which dryout occurs is shown as a range A2.

In this example, although the evaporator 91 of the thermosiphon cools each battery cell, the evaporator 91 also aims at equalizing the temperature of each battery cell. As described above, when the dryout occurs in the evaporator 91, the working fluid hardly absorbs the heat in the dryout portion, and therefore, an uncooled portion or a portion hardly cooled occurs in the assembled battery. In other words, the temperature variation increases in the multiple battery cells due to the dryout. The deterioration of the battery cells in the high temperature portion of the assembled battery is promoted, as a result of which a decrease in the charge capacity of the assembled battery and a decrease in the output of the assembled battery are promoted.

It is also conceivable, but not preferred, to increase a capacity of the evaporator 91 in order to ensure that the liquid-phase working fluid is sufficiently distributed in the evaporator 91 to the downstream side of the working fluid. This is because an increase in the capacity of the evaporator 91 leads to an increase in the weight of the working fluid, an increase in the body size of the battery temperature adjusting device 90 due to an increase in the amount of the working fluid, an increase in the cost, and an increase in the abnormal noise due to the boiling flow of the working fluid. As a result of the detailed study by the present inventors, the facts described above have been found.

According to the second aspect described above, the liquid-phase working fluid in the supply channel is supplied to each of the multiple evaporation channels while maintaining the liquid-phase working fluid in a state more insulated from the heat from the assembled battery, and the supplied working fluid can be evaporated in each of the multiple evaporation channels. As a result, a phenomenon that the working fluid flows to the multiple stacked battery cells while being heated sequentially is avoided, and therefore, the occurrence of partial dryout can be reduced. Since a situation in which some of the battery cells of the assembled battery are less likely to be cooled due to the effect of the dryout, temperature variations in the multiple battery cells can be reduced.

According to a third aspect, the liquid supply portion is disposed at the position more insulated from heat of the assembled battery than the fluid evaporation portion is in a manner such that a surface area contacting the assembled battery or the heat conduction material is smaller in the liquid supply portion than in the fluid evaporation portion.

According to a fourth aspect, the liquid supply portion is disposed at the position more insulated from heat of the assembled battery than the fluid evaporation portion is in a manner such that a heat insulating portion is interposed between the liquid supply portion and the assembled battery.

According to a fifth aspect, the working fluid flows upward in the evaporation channel. Therefore, the bubbles generated in the evaporation channel are easily guided to the outflow channel. According to a sixth aspect, the supply channel extends in the stacking direction. This makes it possible to uniformly distribute the working fluid to each of the multiple evaporation channels aligned in the stacking direction.

According to a seventh aspect, a cross-sectional area of the supply channel decreases in a downstream direction in flow of the working fluid. This makes it possible to reduce the pressure loss of the working fluid flowing through the supply channel while reducing the amount of the working fluid contained in the working fluid circuit.

According to an eighth aspect, the outflow channel extends in the stacking direction. This makes it possible to collect the working fluid flowing out from each of the multiple evaporation channels aligned in the stacking direction and then flow out to the outside of the evaporator.

According to a ninth aspect, a cross-sectional area of the outflow channel increases in a downstream direction in flow of the working fluid. This makes it possible to cope with the expansion of a gas volume due to the evaporation of the working fluid without unnecessarily expanding the volume of the outflow channel.

According to a tenth aspect, the fluid evaporation portion is connected to the battery lower surface of the assembled battery in the thermally conductive manner. Each of the plurality of evaporation channels extends in a direction along the battery lower surface. Therefore, a contact load for enhancing the thermal conductivity between the assembled battery and the fluid evaporation portion can be ensured by leveraging the weight of the assembled battery.

According to an eleventh aspect, each of the plurality of evaporation channels extends along the battery lateral surface in a direction from the lateral-surface lower end to the lateral-surface upper end. Therefore, the fluid evaporation portion can be disposed so that the working fluid gas evaporated in the evaporation channel, that is, the gas-phase working fluid, can easily escape to the outflow channel.

According to a twelfth aspect, each of the plurality of evaporation channels extends in a direction oblique to the stacking direction.

According to a thirteenth aspect, a certain evaporation channel of the plurality of evaporation channels communicates with another evaporation channel next to the certain evaporation channel in a middle of the certain evaporation channel. Therefore, the internal pressure can be kept uniform between the certain evaporation channel and the other evaporation channel next to the certain evaporation channel.

According to a fourteenth aspect, a cross-sectional area of at least one of the plurality of evaporation channels increases in a downstream direction in flow of the working fluid. Therefore, the greater a volume ratio of the gas phase due to evaporation of the working fluid in the evaporation channel, the greater the channel cross-sectional area of the evaporation channel. For that reason, the gas-liquid separation property and the gas discharge property of the working fluid in the evaporation channel are improved without unnecessarily enlarging the volume of each evaporation channel.

According to a fifteenth aspect, at least one of the plurality of evaporation channels has a cross-sectional shape flattened and extended in the stacking direction. This makes it possible for the working fluid to flow in the evaporation channel so as to inhibit an increase in the flow resistance of the working fluid and make the working fluid be subjected to the heat of the assembled battery, as compared with the case where the evaporation channel is subdivided into a lot of channels.

According to a sixteenth aspect, the first plate member is stacked on and joined to the second plate member in a state where the plurality of evaporation channels are defined between the first evaporation forming portion and the second evaporation forming portion. The supply channel is defined between the first supply forming portion and the second supply forming portion, and the outflow channel is defined between the first outflow forming portion and the second outflow forming portion. The first evaporation forming portion is disposed between the second evaporation forming portion and the assembled battery. One of evaporation forming portions: the first evaporation forming portion and the second evaporation forming portion, has a protrusion portion protruding toward another of the evaporation forming portions. The protrusion portion abuts on the other evaporation forming portion to separate the plurality of evaporation channels from one another. Therefore, the evaporator can be configured with a small number of parts.

According to a seventeenth aspect, the fluid evaporation portion includes a multi-hole pipe. The multi-hole pipe includes a plurality of communication holes through which one end and another end of the multi-hole pipe communicates with each other, and the plurality of communication holes are opened at the one end and the other end of the multi-hole pipe. The plurality of communication holes are provided as the plurality of evaporation channels. Therefore, the multiple evaporation channels can be provided.

According to an eighteenth aspect, the assembled battery has a battery lateral surface extending along a vertical direction, and the fluid evaporation portion is connected to the battery lateral surface of the assembled battery in the thermally conductive manner. The supply channel faces the battery lateral surface, and each of the plurality of evaporation channels has a supply-side interposed channel interposed between the battery lateral surface and the supply channel. This makes it possible to insulate heat between the assembled battery and the supply channel by the supply-side interposed channel. At the same time, the evaporation channel can extend between the assembled battery and the supply channel. This makes it possible to prevent the area of the fluid evaporation portion receiving heat from the assembled battery from being reduced due to the provision of the liquid supply portion while limiting the height of the evaporator in the vertical direction.

According to a nineteenth aspect, the supply-side interposed channel has a lower end as the upstream end, and an upper end provided downstream of the lower end in flow of the working fluid. The lower end of the supply-side interposed channel is connected to a lower part of the supply channel. This makes it possible to make the working fluid flow in the vertical direction as long as possible while absorbing heat from the assembled battery in the supply-side interposed channel. This makes it easier for the working fluid flowing through the supply-side interposed channel to absorb heat from the assembled battery.

According to a twentieth aspect, the liquid supply portion has a supply-side partition portion having a wall shape and separating the evaporating channel from the supply channel. The supply-side partition portion separates at least the supply-side interposed channel of the evaporation channel from the supply channel. Therefore, the flow path of the working fluid between the supply channel and the supply-side interposed channel can be restricted, and the working fluid flowing from the supply channel to the supply-side interposed channel can be guided to a specific location such as the lower end of the supply-side interposed channel.

According to a twenty-first aspect, the supply-side partition portion includes a heat insulating material. Therefore, in addition to the supply-side interposed channel, the heat insulating material can also insulate heat between the assembled battery and the supply channel. As a result, the heat from the assembled battery is less likely to be transferred to the working fluid in the supply channel, and evaporation of the working fluid in the supply channel can be reduced, as compared with the case in which the heat insulating material is not provided. As a result, for example, the possibility of dryout occurring in the supply channel can be reduced as compared with the case in which there is no heat insulating material. In the evaporator, the cooling capacity for each section in the stacking direction can be equalized. In other words, variations in the cooling capacity of the evaporator in the stacking direction can be reduced.

According to a twenty-second aspect, the fluid evaporation portion has evaporation channel partition walls that partition the plurality of evaporation channels in the stacking direction. The evaporation channel partition walls have supply-side partition wall portions that separate the supply-side interposed channels from one another in the stacking direction. Each of the supply-side partition wall portions has a through hole forming portion that defines a wall through hole that penetrates through the supply-side partition wall portion in the stacking direction. The through hole forming portions are arranged in the stacking direction to constitute the liquid supply portion, and define the supply channel including the wall through holes which are aligned in the stacking direction such that the supply channel extends in the stacking direction.

Therefore, even if there is no wall or the like that separates the supply channel from the supply-side interposed channel, the liquid-phase working fluid of the supply channel can flow along the stacking direction while passing through the multiple wall through holes in order. Since the supply-side partition wall portion prevents the working fluid boiling in the supply-side interposed channel and becoming the bubble flow by the heat from the assembled battery from flowing in the stacking direction, the working fluid becoming the bubble flow flows from the lower side to the upper side along the supply-side partition wall portion in the supply-side interposed channel. As a result, the liquid-phase working fluid can flow in the stacking direction in the supply channel provided by the multiple wall through holes continuing in the stacking direction while causing the working fluid, which has become the bubble flow in the supply-side interposed channel, to function as the heat insulating layer between the assembled battery and the supply channel.

According to a twenty-third aspect and a twenty-fourth aspect, the outflow channel faces the battery lateral surface. Each of the plurality of evaporation channels has an outflow-side interposed channel, and the outflow-side interposed channel is interposed between the battery lateral surface and the outflow channel. Therefore, the evaporation channel can extend between the assembled battery and the outflow channel. As a result, the area of the fluid evaporation portion receiving heat from the assembled battery can be prevented from being reduced due to the provision of the fluid outflow portion while restricting the height of the evaporator in the vertical direction.

According to a twenty-fifth aspect, the outflow-side interposed channel has an upper end as the downstream end, and a lower end provided upstream of the upper end in flow of the working fluid. The upper end of the outflow-side interposed channel is connected to an upper part of the outflow channel. Therefore, the working fluid can be made to flow in the vertical direction as long as possible while absorbing heat from the assembled battery in the outflow-side interposed channel. This makes it easier for the working fluid flowing through the outflow-side interposed channel to absorb heat from the assembled battery.

According to a twenty-sixth aspect, each of the plurality of evaporation channels has an evaporation intermediate channel that is connected to the outflow channel through the outflow-side interposed channel and disposed between the liquid supply portion and the fluid outflow portion in the vertical direction. The fluid outflow portion has an outflow-side partition portion having a wall shape, separating the outflow-side interposed channel from the outflow channel, and separating the evaporation intermediate channel from the outflow channel. The outflow-side partition portion has a partition communication hole connected to the evaporation intermediate channel in parallel with the outflow-side interposed channel, and the outflow channel communicates with the evaporation intermediate channel through the partition communication hole. The partition communication hole is disposed below the outflow channel, and has a size such that a flow of the working fluid is more reduced when passing through the partition communication hole than when passing through the outflow-side interposed channel. This makes it possible to return the liquid-phase working fluid to the evaporation channel when the liquid-phase working fluid temporarily accumulates in the outflow channel due to severe boiling or the like in the evaporation channel. In addition, the working fluid, which has become the bubble flow in the evaporation channel, can be prevented from flowing into the outflow channel through the partition communication hole.

According to a twenty-seventh aspect, the evaporator includes a plurality of stacking units, and each of the plurality of stacking units includes a part of the fluid evaporation portion, a part of the liquid supply portion, and a part of the fluid outflow portion, and extends in a vertical direction. The plurality of stacking units has a unit lateral surface extending along the vertical direction. The unit lateral surface faces the battery lateral surface and is connected to the battery lateral surface of the assembled battery in the thermally conductive manner. The plurality of stacking units are stacked in the stacking direction and joined to one another in a manner such that the plurality of stacking units forms the fluid evaporation portion, the liquid supply portion, and the fluid outflow portion. This makes it possible to configure an evaporator adapted to the body size of the assembled battery by determining the number of stacking units according to the number of stacked battery cells included in the assembled battery.

COMPARATIVE EXAMPLE

A comparative example will be described. A battery temperature adjusting device, such as a thermosiphon cooling device, includes a heat medium cooling unit as a condenser, and a temperature adjusting unit as an evaporator. The heat medium cooling unit and the temperature adjusting unit are connected to each other in a circuit by piping, and the battery temperature adjusting device is configured such that a heat medium (that is, a working fluid) circulates between the heat medium cooling unit and the temperature adjusting unit.

The temperature adjusting unit is disposed so as to be in contact with lateral surfaces of multiple battery cells constituting an assembled battery, and cools the assembled battery by evaporation of a heat medium.

The temperature adjusting unit extends in a stacking direction of the battery cells, i.e. cell stacking direction. The heat medium from the heat medium cooling unit flows into the temperature adjusting unit from one end of the temperature adjusting unit in the cell stacking direction. Then, the heat medium in the temperature adjusting unit flows from the one end to the other end in the cell stacking direction, and then flows out from the other end toward the heat medium cooling unit.

In the evaporator, which is the temperature adjusting unit of the battery temperature adjusting device, the entire temperature adjusting unit is disposed so as to be in contact with the lateral surface of the battery cell. According to the inventors' study, in such a structure, the working fluid boils violently in the evaporator, and dryout which is a state in which the liquid-phase working fluid does not exist may occur in the evaporator.

In contrast to the comparative example, the present disclosure provides an evaporator included in a thermosiphon heat pipe, which is capable of reducing the occurrence of dryout.

According to an aspect of the present disclosure, an evaporator constitutes a part of a thermosiphon heat pipe in which a working fluid circulates and evaporates by absorbing heat from a battery having at least one battery cell, and the evaporator includes: a fluid evaporation portion including at least one evaporation channel having an upstream end and a downstream end, the fluid evaporation portion being connected to the battery in a thermally conductive manner and evaporating the working fluid flowing in the at least one evaporation channel by heat of the battery; a liquid supply portion including a supply channel connected to the upstream end of the at least one evaporation channel, the liquid supply portion supplying the working fluid in liquid phase from the supply channel to the at least one evaporation channel; and a fluid outflow portion including an outflow channel connected to the downstream end of the at least one evaporation channel, the fluid outflow portion discharging the working fluid which has flowed from the at least one evaporation channel into the outflow channel.

The working fluid flows from the upstream end to the downstream end in the evaporation channel. The fluid outflow portion is disposed above the liquid supply portion. The liquid supply portion is disposed at a position more insulated from the heat of the battery than the fluid evaporation portion is.

In this manner, the liquid supply portion is disposed at a position more insulated from heat of the assembled battery than the fluid evaporation portion is. Therefore, the liquid-phase working fluid can be supplied to the evaporation channel while maintaining the liquid-phase working fluid in the supply channel in a state of being unlikely to receive heat from the battery, and to evaporate the supplied working fluid in the evaporation channel. As a result, the occurrence of dryout can be reduced. Further, since the liquid supply portion is disposed below the fluid outflow portion, air bubbles causing dryout can be inhibited from stagnating in the supply channel.

What is claimed is:

1. An evaporator constituting a part of a thermosiphon heat pipe in which a working fluid circulates and evaporates by absorbing heat from a battery having at least one battery cell, the evaporator comprising:
    a fluid evaporation portion including at least one evaporation channel having an upstream end and a downstream end, the fluid evaporation portion being connected to the battery in a thermally conductive manner and evaporating the working fluid flowing in the at least one evaporation channel by heat of the battery;
    a liquid supply portion including a supply channel connected to the upstream end of the at least one evaporation channel, the liquid supply portion supplying the working fluid in liquid phase from the supply channel to the at least one evaporation channel; and
    a fluid outflow portion including an outflow channel connected to the downstream end of the at least one evaporation channel, the fluid outflow portion discharging the working fluid which has flowed from the at least one evaporation channel into the outflow channel, wherein
    the working fluid flows from the upstream end to the downstream end in the evaporation channel,
    the fluid outflow portion is disposed above the liquid supply portion,
    the liquid supply portion is disposed at a position more insulated from the heat of the battery than the fluid evaporation portion is,
    the at least one battery cell is a plurality of battery cells, the battery is an assembled battery,
    the at least one evaporation channel is a plurality of evaporation channels,
    the plurality of evaporation channels are arranged in a stacking direction of the battery cells,
    the fluid evaporation portion evaporates the working fluid flowing in the plurality of evaporation channels with heat of the assembled battery,
    the upstream ends of the plurality of evaporation channels are connected to the supply channel,
    the liquid supply portion distributes and supplies the working fluid in liquid phase from the supply channel to each of the plurality of evaporation channels,
    the downstream ends of the plurality of evaporation channels are connected to the outflow channel,
    the fluid outflow portion discharges the working fluid which has flowed from each of the plurality of evaporation channels into the outflow channel,
    the assembled battery has a battery lateral surface extending along a vertical direction,
    the fluid evaporation portion is connected to the battery lateral surface of the assembled battery in the thermally conductive manner, the supply channel faces the battery lateral surface, and
    each of the plurality of evaporation channels has a supply-side interposed channel interposed between the battery lateral surface and the supply channel.

2. The evaporator according to claim 1, wherein
    the supply-side interposed channel has a lower end as the upstream end, and an upper end provided downstream of the lower end in flow of the working fluid, and
    the lower end of the supply-side interposed channel is connected to a lower part of the supply channel.

3. The evaporator according to claim 1, wherein
    the liquid supply portion has a supply-side partition portion having a wall shape and separating the evaporating channel from the supply channel, and
    the supply-side partition portion separates at least the supply-side interposed channel of the evaporation channel from the supply channel.

4. The evaporator according to claim 3, wherein the supply-side partition portion includes a heat insulating material.

5. The evaporator according to claim 1, wherein
    the fluid evaporation portion has evaporation channel partition walls that partition the plurality of evaporation channels in the stacking direction,
    the evaporation channel partition walls have supply-side partition wall portions that separate the supply-side interposed channels from one another in the stacking direction,
    each of the supply-side partition wall portions has a through hole forming portion that defines a wall through hole that penetrates through the supply-side partition wall portion in the stacking direction, and
    the through hole forming portions are arranged in the stacking direction to constitute the liquid supply portion, and define the supply channel including the wall through holes which are aligned in the stacking direction such that the supply channel extends in the stacking direction.

6. The evaporator according to claim 1, wherein
    the outflow channel faces the battery lateral surface,
    each of the plurality of evaporation channels has an outflow-side interposed channel disposed downstream of the supply-side interposed channel in flow of the working fluid, and
    the outflow-side interposed channel is interposed between the battery lateral surface and the outflow channel.

7. The evaporator according to claim 6, wherein
the outflow-side interposed channel has an upper end as the downstream end, and a lower end provided upstream of the upper end in flow of the working fluid, and
the upper end of the outflow-side interposed channel is connected to an upper part of the outflow channel.

8. The evaporator according to claim 7, wherein
each of the plurality of evaporation channels has an evaporation intermediate channel that is connected to the outflow channel through the outflow-side interposed channel and disposed between the liquid supply portion and the fluid outflow portion in the vertical direction,
the fluid outflow portion has an outflow-side partition portion having a wall shape, separating the outflow-side interposed channel from the outflow channel, and separating the evaporation intermediate channel from the outflow channel,
the outflow-side partition portion has a partition communication hole connected to the evaporation intermediate channel in parallel with the outflow-side interposed channel, the outflow channel communicating with the evaporation intermediate channel through the partition communication hole, and
the partition communication hole is disposed below the outflow channel, and has a size such that a flow of the working fluid is more reduced when passing through the partition communication hole than when passing through the outflow-side interposed channel.

9. An evaporator constituting a part of a thermosiphon heat pipe in which a working fluid circulates and evaporates by absorbing heat from a battery having at least one battery cell, the evaporator comprising:
a fluid evaporation portion including at least one evaporation channel having an upstream end and a downstream end, the fluid evaporation portion being connected to the battery in a thermally conductive manner and evaporating the working fluid flowing in the at least one evaporation channel by heat of the battery;
a liquid supply portion including a supply channel connected to the upstream end of the at least one evaporation channel, the liquid supply portion supplying the working fluid in liquid phase from the supply channel to the at least one evaporation channel; and
a fluid outflow portion including an outflow channel connected to the downstream end of the at least one evaporation channel, the fluid outflow portion discharging the working fluid which has flowed from the at least one evaporation channel into the outflow channel, wherein
the working fluid flows from the upstream end to the downstream end in the evaporation channel,
the fluid outflow portion is disposed above the liquid supply portion,
the liquid supply portion is disposed at a position more insulated from the heat of the battery than the fluid evaporation portion is,
the at least one battery cell is a plurality of battery cells,
the battery is an assembled battery,
the at least one evaporation channel is a plurality of evaporation channels,
the plurality of evaporation channels are arranged in a stacking direction of the battery cells,
the fluid evaporation portion evaporates the working fluid flowing in the plurality of evaporation channels with heat of the assembled battery,
the upstream ends of the plurality of evaporation channels are connected to the supply channel,
the liquid supply portion distributes and supplies the working fluid in liquid phase from the supply channel to each of the plurality of evaporation channels,
the downstream ends of the plurality of evaporation channels are connected to the outflow channel,
the fluid outflow portion discharges the working fluid which has flowed from each of the plurality of evaporation channels into the outflow channel,
the assembled battery has a battery lateral surface extending along a vertical direction,
the fluid evaporation portion is connected to the battery lateral surface of the assembled battery in the thermally conductive manner,
the outflow channel faces the battery lateral surface, and
each of the plurality of evaporation channels has an outflow-side interposed channel interposed between the battery lateral surface and the outflow channel.

10. The evaporator according to claim 9, wherein
the outflow-side interposed channel has an upper end as the downstream end, and a lower end provided upstream of the upper end in flow of the working fluid, and
the upper end of the outflow-side interposed channel is connected to an upper part of the outflow channel.

11. The evaporator according to claim 10, wherein
each of the plurality of evaporation channels has an evaporation intermediate channel that is connected to the outflow channel through the outflow-side interposed channel and disposed between the liquid supply portion and the fluid outflow portion in the vertical direction,
the fluid outflow portion has an outflow-side partition portion having a wall shape, separating the outflow-side interposed channel from the outflow channel, and separating the evaporation intermediate channel from the outflow channel,
the outflow-side partition portion has a partition communication hole connected to the evaporation intermediate channel in parallel with the outflow-side interposed channel, the outflow channel communicating with the evaporation intermediate channel through the partition communication hole, and
the partition communication hole is disposed below the outflow channel, and has a size such that a flow of the working fluid is more reduced when passing through the partition communication hole than when passing through the outflow-side interposed channel.

12. The evaporator according to claim 1, wherein the supply channel extends in the stacking direction.

13. The evaporator according to claim 12, wherein a cross-sectional area of the supply channel decreases in a downstream direction in flow of the working fluid.

14. The evaporator according to claim 1, wherein the outflow channel extends in the stacking direction.

15. The evaporator according to claim 14, wherein a cross-sectional area of the outflow channel increases in a downstream direction in flow of the working fluid.

16. An evaporator constituting a part of a thermosiphon heat pipe in which a working fluid circulates and evaporates by absorbing heat from a battery having at least one battery cell, the evaporator comprising:
a fluid evaporation portion including at least one evaporation channel having an upstream end and a downstream end, the fluid evaporation portion being connected to the battery in a thermally conductive manner and evaporating the working fluid flowing in the at least one evaporation channel by heat of the battery;

a liquid supply portion including a supply channel connected to the upstream end of the at least one evaporation channel, the liquid supply portion supplying the working fluid in liquid phase from the supply channel to the at least one evaporation channel; and a fluid outflow portion including an outflow channel connected to the downstream end of the at least one evaporation channel, the fluid outflow portion discharging the working fluid which has flowed from the at least one evaporation channel into the outflow channel, a plurality of stacking units each of which includes a part of the fluid evaporation portion, a part of the liquid supply portion, and a part of the fluid outflow portion, extends in a vertical direction, and has a unit lateral surface extending along the vertical direction, wherein the working fluid flows from the upstream end to the downstream end in the evaporation channel, the fluid outflow portion is disposed above the liquid supply portion, the liquid supply portion is disposed at a position more insulated from the heat of the battery than the fluid evaporation portion is, the at least one battery cell is a plurality of battery cells, the battery is an assembled battery, the at least one evaporation channel is a plurality of evaporation channels, the plurality of evaporation channels are arranged in a stacking direction of the battery cells, the fluid evaporation portion evaporates the working fluid flowing in the plurality of evaporation channels with heat of the assembled battery, the upstream ends of the plurality of evaporation channels are connected to the supply channel, the liquid supply portion distributes and supplies the working fluid in liquid phase from the supply channel to each of the plurality of evaporation channels, the downstream ends of the plurality of evaporation channels are connected to the outflow channel, the fluid outflow portion discharges the working fluid which has flowed from each of the plurality of evaporation channels into the outflow channel, the assembled battery has a battery lateral surface extending along the vertical direction, the unit lateral surface faces the battery lateral surface and is connected to the battery lateral surface of the assembled battery in the thermally conductive manner, the plurality of stacking units are stacked in the stacking direction and joined to one another in a manner such that the plurality of stacking units forms the fluid evaporation portion, the liquid supply portion, and the fluid outflow portion, the supply channel and the outflow channel face the battery lateral surface, each of the plurality of stacking units has at least one of the plurality of evaporation channels, the evaporation channel of each of the plurality of stacking units includes a supply-side interposed channel interposed between the battery lateral surface and the supply channel, and an outflow-side interposed channel disposed downstream of the supply-side interposed channel in flow of the work fluid and interposed between the battery lateral surface and the outflow channel, the supply-side interposed channel has a lower end as the upstream end, and an upper end disposed downstream of the lower end in flow of the working fluid, the outflow-side interposed channel has an upper end as the downstream end, and a lower end disposed upstream of the upper end in flow of the working fluid, the lower end of the supply-side interposed channel is connected to a lower part of the supply channel, the upper end of the outflow-side interposed channel is connected to an upper part of the outflow channel, each of the plurality of stacking units includes an evaporation channel partition wall that separates the plurality of evaporation channels from one another in the stacking direction, the evaporation channel partition wall includes a first through hole forming portion which defines a first wall through hole penetrating through the evaporation channel partitioning wall in the stacking direction and is included in the liquid supply portion, and a second through hole forming portion which defines a second wall through hole penetrating through the evaporation channel partitioning wall in the stacking direction and is included in the fluid outflow portion, the supply channel includes the first wall through hole, penetrates through the evaporation channel partition wall, and extends in the stacking direction, and the outflow channel includes the second wall through hole, penetrates through the evaporation channel partition wall, and extends in the stacking direction.

17. The evaporator according to claim 1, wherein the fluid evaporation portion is connected to the assembled battery in the thermally conductive manner such that the fluid evaporation portion contacts the assembled battery or contacts a heat conduction material having thermal conductivity and interposed between the fluid evaporation portion and the assembled battery, and the liquid supply portion is disposed at the position more insulated from heat of the assembled battery than the fluid evaporation portion is in a manner such that a surface area contacting the assembled battery or the heat conduction material is smaller in the liquid supply portion than in the fluid evaporation portion.

18. The evaporator according to claim 1, wherein the liquid supply portion is disposed at the position more insulated from heat of the assembled battery than the fluid evaporation portion is in a manner such that a heat insulating portion is interposed between the liquid supply portion and the assembled battery.

19. The evaporator according to claim 1, wherein the working fluid flows upward in the evaporation channel.

* * * * *